(12) United States Patent
Kataoka et al.

(10) Patent No.: US 11,251,721 B2
(45) Date of Patent: *Feb. 15, 2022

(54) POWER SUPPLY DEVICE, DRIVING DEVICE, CONTROL METHOD, AND STORAGE MEDIUM

(71) Applicant: NIDEC CORPORATION, Kyoto (JP)

(72) Inventors: Kotaro Kataoka, Kyoto (JP); Hiroshi Iwata, Kyoto (JP); Takamitsu Suzuki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 61 days.

This patent is subject to a terminal disclaimer.

(21) Appl. No.: 16/632,389

(22) PCT Filed: Jul. 25, 2018

(86) PCT No.: PCT/JP2018/027932
§ 371 (c)(1),
(2) Date: Jan. 20, 2020

(87) PCT Pub. No.: WO2019/026729
PCT Pub. Date: Feb. 7, 2019

(65) Prior Publication Data
US 2020/0235677 A1  Jul. 23, 2020

(30) Foreign Application Priority Data
Jul. 31, 2017  (JP) .............................. JP2017-148434

(51) Int. Cl.
*H02M 7/5387* (2007.01)
*H02M 7/06* (2006.01)
*H02P 27/08* (2006.01)

(52) U.S. Cl.
CPC ......... *H02M 7/53871* (2013.01); *H02M 7/06* (2013.01); *H02P 27/08* (2013.01)

(58) Field of Classification Search
CPC ...... H02M 7/53871; H02M 7/06; H02M 1/32; H02M 7/5395; H02M 2001/007; H02P 27/08
See application file for complete search history.

(56) References Cited

U.S. PATENT DOCUMENTS

| | | | | |
|---|---|---|---|---|
| 1,442,126 A | * | 1/1923 | Cadden | .................... B07C 3/082 |
| | | | | 198/352 |
| 1,571,547 A | * | 2/1926 | Hagar | ...................... G08G 1/09 |
| | | | | 362/168 |

(Continued)

FOREIGN PATENT DOCUMENTS

| | | |
|---|---|---|
| JP | H11179559 | 7/1999 |
| JP | 2004120812 | 4/2004 |

(Continued)

OTHER PUBLICATIONS

"International Search Report (Form PCT/ISA/210) of PCT/JP2018/027932," dated Aug. 28, 2018, with English translation thereof, pp. 1-2.

*Primary Examiner* — Muhammad S Islam
*Assistant Examiner* — Devon A Joseph
(74) *Attorney, Agent, or Firm* — JCIPRNET

(57) ABSTRACT

A power supply device is provided with an output unit, an input unit, a rectifier circuit, a switching circuit, and a controller. The input unit inputs an AC input. The rectifier circuit has a smoothing capacitor and converts the AC input into a rectified output. The switching circuit switches between an ON-state in which input impedance is low and an OFF-state in which input impedance is higher than that in the ON-state. The controller sets a modulation ratio such that, when controlling the switching circuit to switch between the ON-state and the OFF-state, at least a portion of a period, in which the modulation width of the modulation duty ratio becomes maximum, is included in a period from (Continued)

a time when an input current inputted to the smoothing capacitor is generated to a time when the voltage of the smoothing capacitor reaches a maximum value.

32 Claims, 31 Drawing Sheets

(56) References Cited

U.S. PATENT DOCUMENTS

| | | | | |
|---|---|---|---|---|
| 2,200,166 | A * | 5/1940 | Gardner | H01J 29/023 313/379 |
| 2,275,941 | A * | 3/1942 | Bostwick | H02H 7/262 361/64 |
| 2,606,351 | A * | 8/1952 | Hermannwende | A44B 19/267 24/400 |
| 2,660,044 | A * | 11/1953 | Williams | D06F 13/02 68/23.7 |
| 2,948,659 | A * | 8/1960 | Shoemaker | C12P 7/60 435/138 |
| 3,932,132 | A * | 1/1976 | Hijikata | G01N 35/00029 422/404 |
| 5,416,686 | A * | 5/1995 | Azuma | H02M 5/458 363/37 |
| 5,623,192 | A * | 4/1997 | Yamamoto | H02M 7/53875 318/811 |
| 5,680,040 | A * | 10/1997 | Kawai | G01R 29/18 324/521 |
| 5,949,663 | A * | 9/1999 | Endo | H02M 7/53873 363/37 |
| 6,362,985 | B1 * | 3/2002 | Haneda | H02M 7/53871 363/98 |
| 6,671,191 | B2 * | 12/2003 | Hanaoka | H02J 9/062 363/37 |
| 6,940,734 | B2 * | 9/2005 | Okuma | H02J 3/1814 363/37 |
| 6,961,253 | B1 * | 11/2005 | Cohen | H02M 1/08 363/89 |
| 7,049,771 | B2 * | 5/2006 | Katanaya | H02M 7/53875 318/400.13 |
| 7,049,778 | B2 * | 5/2006 | Katanaya | H02M 7/53873 318/400.04 |
| 7,105,948 | B2 * | 9/2006 | Steimer | H02J 3/1814 307/46 |
| 7,482,710 | B2 * | 1/2009 | Ichinose | H02J 9/08 307/67 |
| 7,710,747 | B2 * | 5/2010 | Matsumoto | H02M 5/458 363/35 |
| 7,872,362 | B2 * | 1/2011 | Kato | H02P 9/48 290/40 C |
| 8,154,229 | B2 * | 4/2012 | Yamada | H02P 27/12 318/400.01 |
| 8,390,972 | B2 * | 3/2013 | Simper | H02H 3/087 361/93.1 |
| 9,312,781 | B2 * | 4/2016 | Li | H02J 9/062 |
| 9,595,890 | B2 * | 3/2017 | Kondo | H02M 3/1588 |
| 9,647,526 | B1 * | 5/2017 | Alexander | H02M 3/33507 |
| 9,906,164 | B2 * | 2/2018 | Tamura | B60L 3/003 |
| 10,033,291 | B2 * | 7/2018 | Mizutani | H02M 5/458 |
| 10,270,355 | B1 * | 4/2019 | Xiong | H02M 3/158 |
| 2004/0079922 | A1 * | 4/2004 | Yokokouji | C09K 19/3048 252/299.64 |
| 2018/0074009 | A1 * | 3/2018 | Okamoto | G01N 27/4076 |

FOREIGN PATENT DOCUMENTS

| | | |
|---|---|---|
| JP | 2011193704 | 9/2011 |
| WO | 2015068533 | 5/2015 |

* cited by examiner

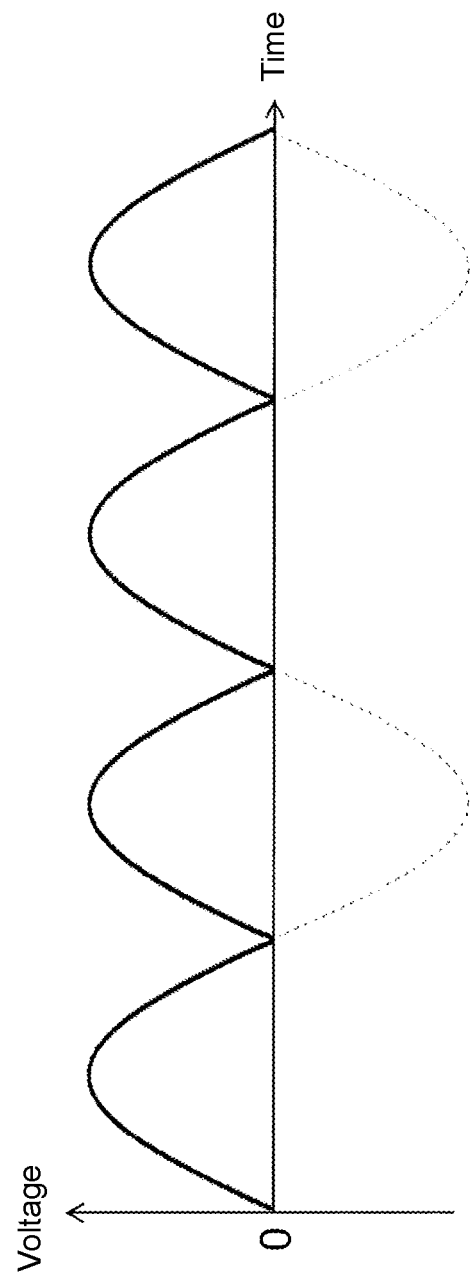

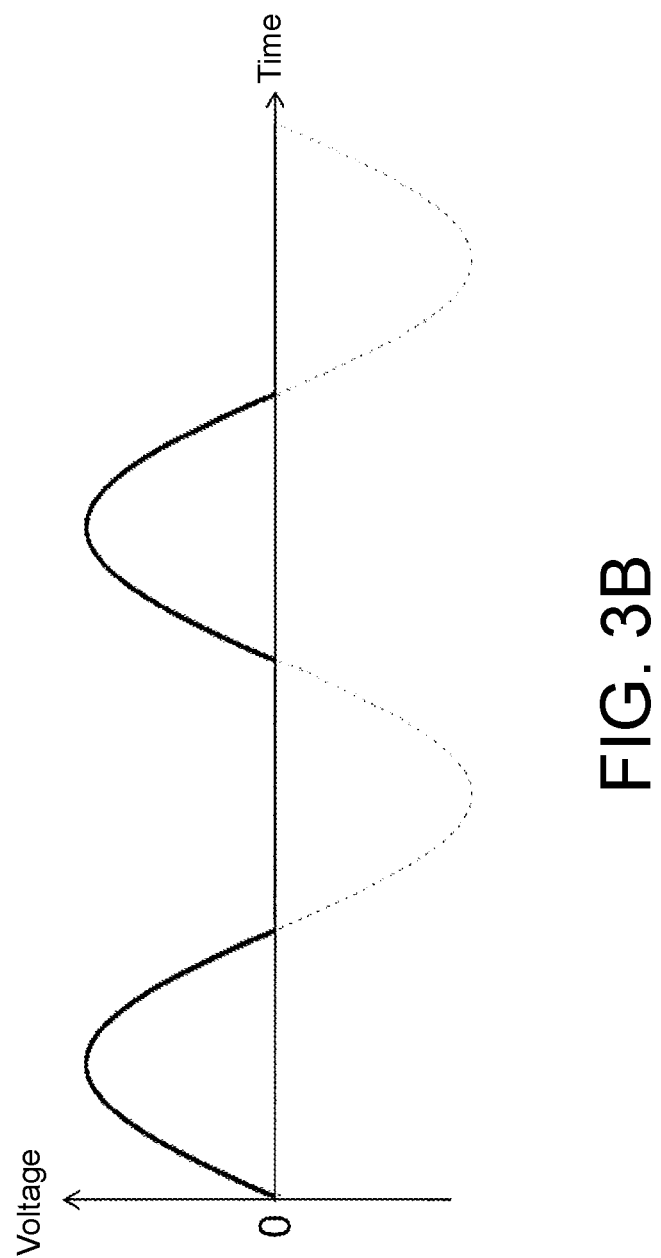

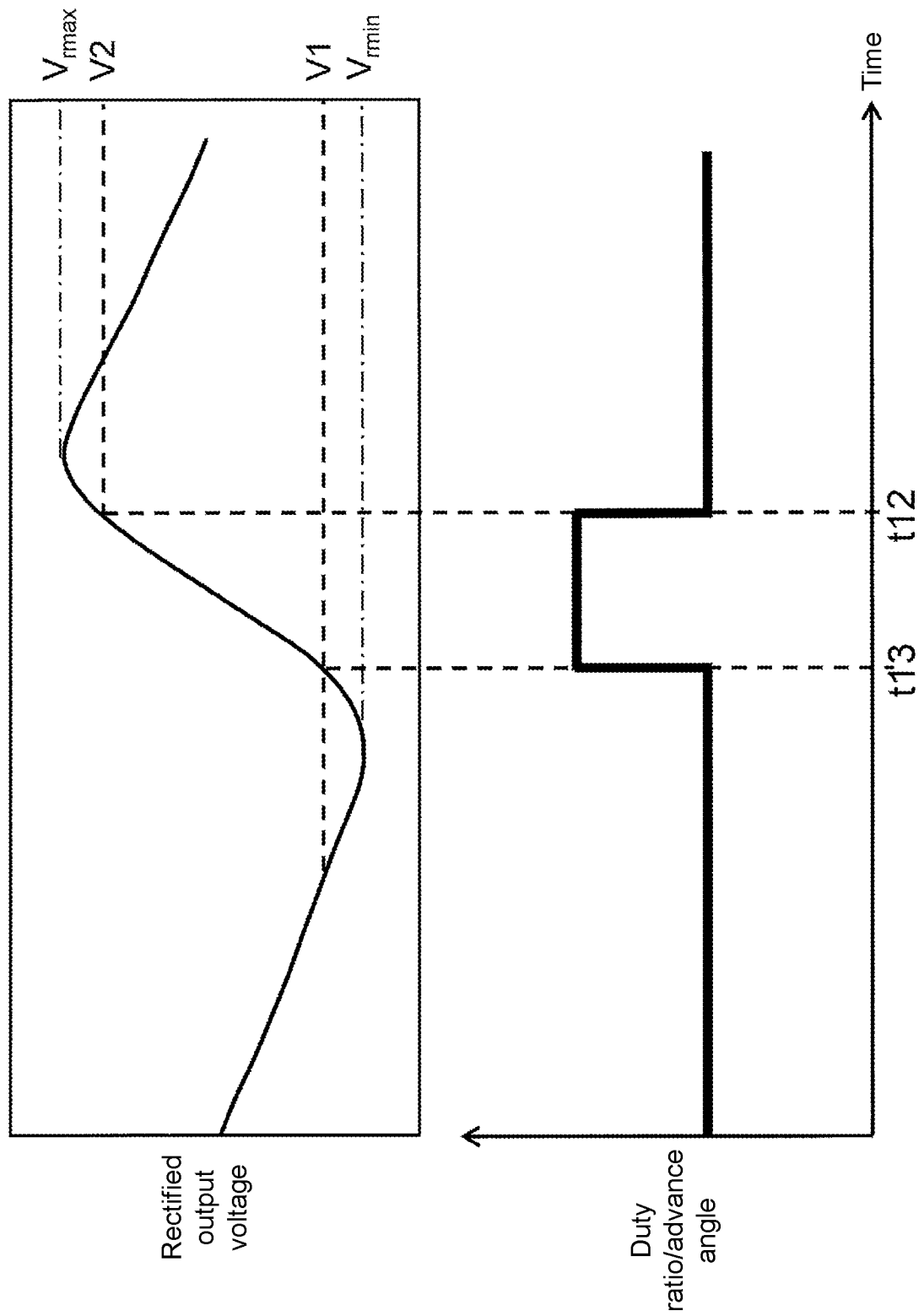

POWER SUPPLY DEVICE, DRIVING DEVICE, CONTROL METHOD, AND STORAGE MEDIUM

CROSS-REFERENCE TO RELATED APPLICATION

This application is a 371 application of the International PCT application serial no. PCT/JP2018/027932, filed on Jul. 25, 2018, which claims the priority benefits of Japan Patent Application No. 2017-148434, filed on Jul. 31, 2017. The entirety of each of the above-mentioned patent applications is hereby incorporated by reference herein and made a part of this specification.

TECHNICAL FIELD

The present invention relates to a power supply device converting an AC input into a predetermined output and outputting the predetermined output to a load, a driving device using a motor as the load of the power supply device, a control method for the power supply device, and a program causing a computer to perform the control method.

BACKGROUND ART

In the related art, power supply devices that convert AC inputs into DC outputs and output the DC outputs are known. The power supply devices include a switching element that switches between an ON-state and an OFF-state at a predetermined period and can adjust the power of an DC output to be supplied to a load driven by the power supply device by adjusting a ratio (referred to as a duty ratio) of a period in which the switching element is in the ON-state (or the OFF-state) with respect to the predetermined period. A power supply device converting an AC input into a DC output includes a capacitor maintaining a DC output at a constant voltage (referred to as a smoothing capacitor) (for example, see Patent Literature 1).

CITATION LIST

Patent Literature

[Patent Literature 1]
Japanese Patent Laid-Open No. H11-179559

SUMMARY OF INVENTION

Technical Problem

In the power supply device, for example, when a current is not supplied from a rectifier circuit to the smoothing capacitor and the smoothing capacitor is not charged, the smoothing capacitor is discharged, and thus a voltage of a DC output is lowered. On the other hand, when a current is supplied from the rectifier circuit to the smoothing capacitor, the smoothing capacitor is charged. Thus, the voltage of the DC output lowered due to the discharging can be raised again.

That is, in the power supply device, the voltage (an average of the voltages) of the DC output can be constant when discharging and charging of the smoothing capacitor is periodically repeated.

On the other hand, the repeated discharging and charging of the smoothing capacitor during running of the power supply device means that a current always flows in the smoothing capacitor during running of the power supply device. As a result, the smoothing capacitor deteriorates whenever the power supply device is used and the deterioration of the smoothing capacitor causes shortening of a lifespan of the power supply device.

An objective of the present invention is to suppress deterioration of a smoothing capacitor provided in a power supply device.

Solution to Problem

According to an exemplary embodiment of the present specification, a power supply device includes an output unit, an input unit, a rectifier circuit, a switching circuit, and a controller. The output unit connects a load. The input unit inputs an AC input varying at a predetermined period between a positive voltage and a negative voltage. The rectifier circuit is a circuit that converts the AC input from the input unit into a rectified output which is one of the positive voltage and the negative voltage and includes a smoothing capacitor that smoothes the rectified output. The switching circuit connects the smoothing capacitor as an input, connects the output unit as an output, and switches between an ON-state in which input impedance viewed from the smoothing capacitor is low and an OFF-state in which the input impedance is higher than the input impedance in the ON-state at a switching period shorter than the predetermined period of the AC input.

The controller sets a modulation duty ratio such that at least a portion of a period in which a modulation width of the modulation duty ratio becomes a maximum value is included in a period from a time at which an input current input to the smoothing capacitor is generated to a time at which a voltage of the smoothing capacitor becomes a maximum when the switching circuit is controlled to switch between the ON-state and the OFF-state while outputting a modulation duty ratio at which a duty ratio which is a ratio of a period in which the ON-state is maintained to the switching period is modulated in accordance with a variation in the rectified output.

Advantageous Effects of Invention

In the power supply device according to an exemplary embodiment of the present specification, by further lengthening a state in which input impedance viewed from the smoothing capacitor is low within a period from a time at which an input current input to the smoothing capacitor is generated to a time at which the voltage in the smoothing capacitor becomes a maximum, that is, a period in which the smoothing capacitor is charged, it is possible to reduce a current amount flowing in the smoothing capacitor and suppress deterioration of the smoothing capacitor.

BRIEF DESCRIPTION OF DRAWINGS

FIG. 3A is a diagram schematically illustrating full-wave rectification.

FIG. 3B is a diagram schematically illustrating half-wave rectification.

FIG. 30 is a diagram illustrating another embodiment (part 3) of the method of calculating the duty ratio/advance angle.

DESCRIPTION OF EMBODIMENTS

Hereinafter, embodiments of the present invention will be described with reference to the drawings. The scope of the present invention is not limited to the following embodiments and can be arbitrarily changed within the scope of the technical spirit of the present invention.

In the following description "a switching element being ON" means that both ends of a switching element are electrically connected to each other or a switching element is in a low impedance state. On the other hand, "a switching element being OFF" means that both ends of a switching element are electrically disconnected from each other or a switching element is in a high impedance state.

First Embodiment 1-1. Configuration of Driving Device

Figure 1:
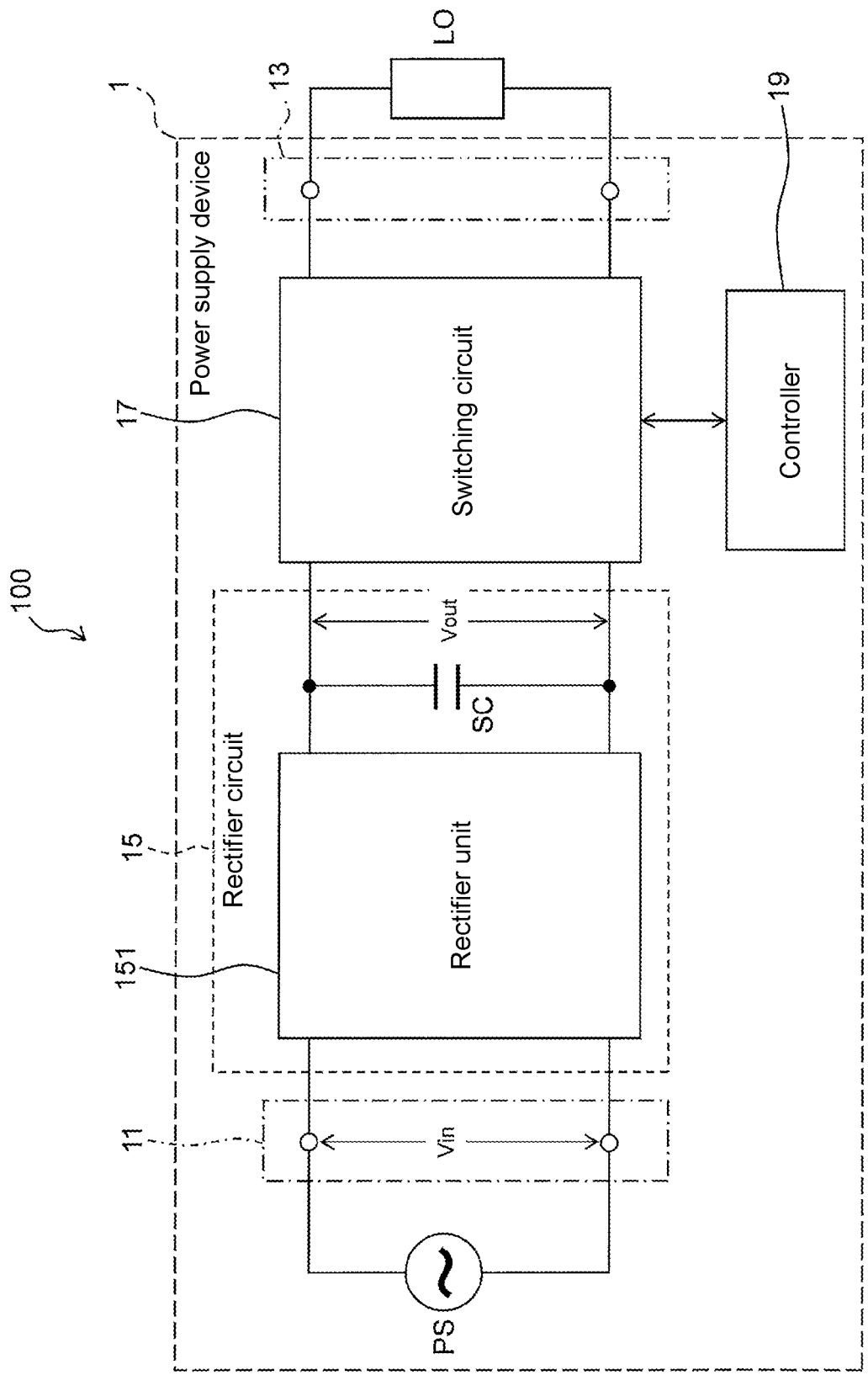
FIG. 1 is a diagram illustrating a configuration of a driving device according to a first embodiment.

FIG. 1 is a diagram illustrating a configuration of a driving device 100 according to a first embodiment. The driving device 100 includes a power supply device 1 and a load LO. The power supply device 1 converts AC power into a predetermined electrical output (a high-frequency output) and outputs the electrical output to the load LO. The load LO is, for example, a motor, an induction heating (IH) device, or the like. The motor is, for example, a brushless motor such as a synchronous motor or an induction motor.

The driving device 100 using the load LO as a motor can be used as, for example, a suction device of a cleaner, a driving device of an electric tool, a driving device of a vehicle, or the like. The driving device 100 using the load LO as an induction heating device can be, for example, a driving device or like of an IH cooker.

1-2. Overall Configuration of Power Supply Device

As illustrated in FIG. 1, the power supply device 1 includes an input unit 11, an output unit 13, a rectifier circuit 15, a switching circuit 17, and a controller 19.

Figure 2:
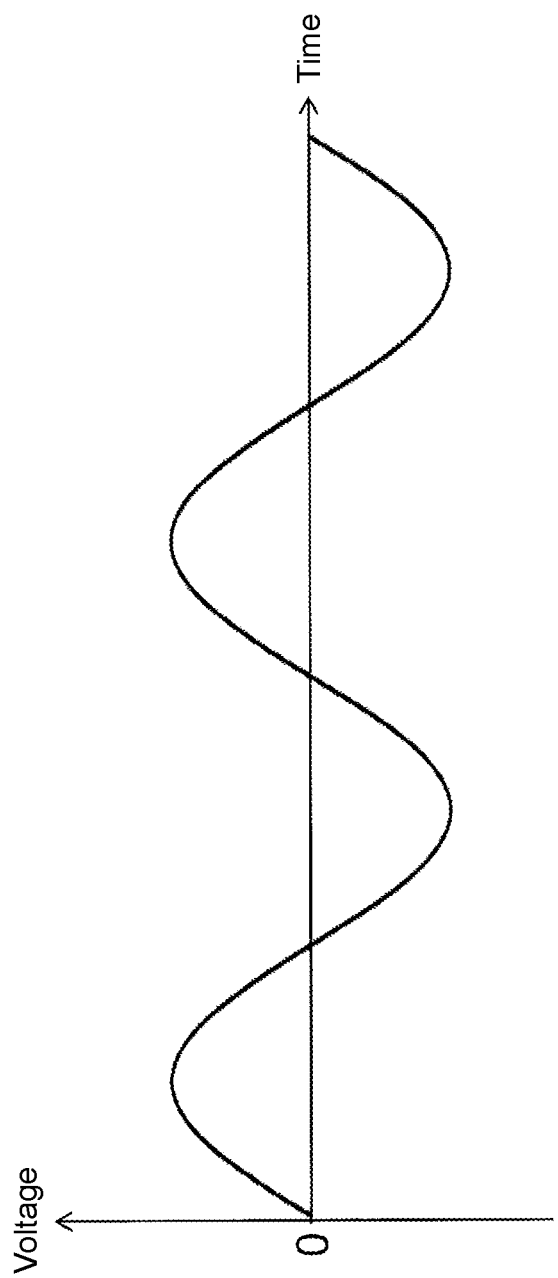
FIG. 2 is a diagram illustrating an example of a voltage waveform of an AC input.

The input unit 11 is a connection terminal connecting an AC power supply PS to the rectifier circuit 15. In the embodiment, the AC power supply PS is a single-phase AC power supply that has two poles. The AC power supply PS outputs an AC input $V_{in}$ varying in a sinusoidal waveform at a predetermined frequency between positive and negative voltages, as illustrated in FIG. 2. When the AC power supply PS is a commercial power supply, the predetermined frequency is, for example, 50 Hz or 60 Hz.

The AC power supply PS connected to the input unit 11 is, for example, a generally supplied household or commercial AC power supply, inverter power supply, an AC generator, or the like. The input unit 11 may connect the AC power supply PS via a transformer (not illustrated). In this case, the input unit 11 inputs an AC input $V_{in}$ lower or higher than a voltage output from the AC power supply PS.

The output unit 13 is a connection terminal connecting the load LO driven in the driving device 100 to the switching circuit 17.

The rectifier circuit 15 includes a rectifier unit 151 and a smoothing capacitor SC. The rectifier unit 151 is a circuit that converts the AC input $V_{in}$ input from the input unit 11 into a rectified output $V_{out}$ which is one of positive and negative voltages. As will be described below, the rectifier unit 151 mainly includes rectifier elements.

As will be described below, the rectifier unit 151 according to the embodiment is a full-wave rectifier circuit that passes a positive-side voltage of the AC input $V_{in}$ and inverts a negative-side voltage into a positive-side voltage and passes the inverted positive-side voltage, as illustrated in FIG. 3A. Thus, the rectifier unit 151 outputs a rectified output $V_{out}$ that has a positive voltage across a period of an AC period (a predetermined period) of the AC input $V_{in}$.

In another embodiment, conversely, the rectifier unit 151 may be a full-wave rectifier circuit that passes a negative-side voltage of the AC input $V_{in}$ and inverts a positive-side voltage into a negative-side voltage and passes the inverted negative-side voltage. In this case, the rectifier unit 151 outputs a rectified output $V_{out}$ that has a negative voltage across a period of an AC period (a predetermined period) of the AC input $V_{in}$.

In still another embodiment, the rectifier unit 151 may be a half-wave rectifier circuit that passes one of a positive-side voltage and a negative-side voltage of the AC input $V_{in}$ and does not pass the other voltage, as illustrated in FIG. 3B. Thus, the rectifier unit 151 outputs a rectified output $V_{out}$ that has positive or negative voltage during only half of a period of the AC period of the AC input $V_{in}$.

Figure 4:
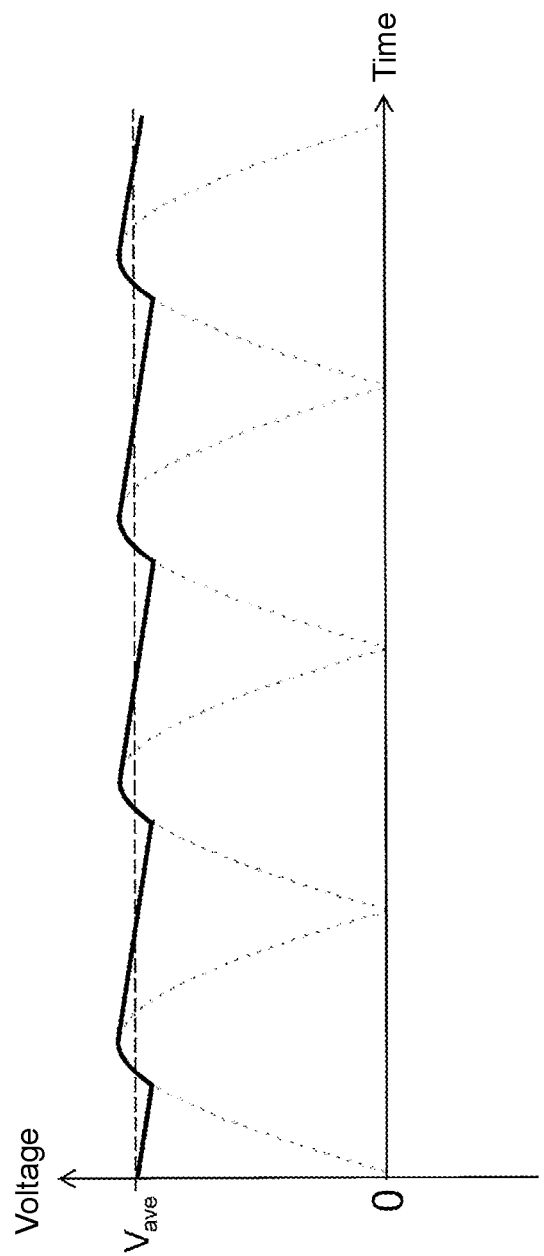
FIG. 4 is a diagram illustrating an example of a voltage waveform of a rectified output.

The smoothing capacitor SC is a capacitor that "smoothes" the rectified output $V_{out}$. Specifically, for example, the smoothing capacitor SC sets a voltage output obtained by rectifying the AC input $V_{in}$, as illustrated in FIG. 3A, to the positive side of the voltage as the rectified output $V_{out}$ that has an average voltage $V_{ave}$ and periodically varies near the average voltage $V_{ave}$, as illustrated in FIG. 4. A voltage periodically varying near the average voltage $V_{ave}$ is also called a "ripple voltage". A voltage of the smoothing capacitor SC corresponds to the rectified output $V_{out}$.

The "ripple voltage" is mainly produced by repeating charging and discharging of the smooth capacitor SC and a variation width is determined in accordance with a time constant that the smoothing capacitor SC particularly has. Accordingly, a capacitor that has large capacitance (a large time constant) such as an electrolytic capacitor is used as, for example, the smoothing capacitor SC. Thus, a variation width of the "ripple voltage" decreases and the rectified output $V_{out}$ that has an almost constant voltage at the average voltage $V_{ave}$ can be output.

An input of the switching circuit 17 is connected in parallel to the smoothing capacitor SC. The switching circuit 17 is mainly a circuit that includes a switching element of which ON and OFF is controlled by the controller 19. By controlling ON and OFF of the switching element, the switching circuit 17 switches between an ON-state in which input impedance is low when viewed from the smoothing capacitor SC and an OFF-state in which the input impedance is higher than in the ON-state.

The input impedance is defined as impedance from the smoothing capacitor SC that includes the switching circuit 17, the output unit 13 connecting an output of the switching circuit 17, and the load LO connected to the output unit 13.

The switching circuit 17 switches between an ON-state and an OFF-state at a switching period shorter than an AC period of the AC input $V_{in}$. As will be described below, the switching circuit 17 according to the embodiment is an inverter that outputs an AC output that has power with any frequency and any magnitude to the load LO by appropriately adjusting a switching pattern of the ON-state and the OFF-state.

In another embodiment, the switching circuit 17 may be, for example, a boosting chopper type converter, a step-down chopper type converter, an LLC converter, a pseudo-resonant flyback converter, or the like. In the switching circuit 17, power to be input to the switching circuit 17 can be adjusted in accordance with a frequency of pulse width modulation (PWM) control of turning ON and OFF of the switching element included in such a circuit.

The controller 19 is a system that controls the power supply device 1. The controller 19 particularly controls switching between the ON-state and the OFF-state of the switching circuit 17. Accordingly, the controller 19 can be configured as hardware including a PWM signal generation circuit, a potential measurement circuit, and/or a current measurement circuit.

Alternatively, the controller 19 may be a computer system that includes a CPU (central processing unit), a storage element such as a RAM (random access memory) or a ROM (read only memory), an A/D interface (analog/digital interface), and a D/A interface (digital/analog interface). In this case, a program that is stored in the storage element or the like and can be executed by the controller 19 may realize control of the power supply device 1 performed by the controller 19.

Additionally, a system on chip (SoC), an application specific integrated circuit (ASIC), or the like in which the PWM signal generation circuit, the potential measurement circuit, and/or the current measurement circuit are formed on one chip can be used as the controller 19.

1-3. Detailed Configuration of Driving Device

Figure 5:
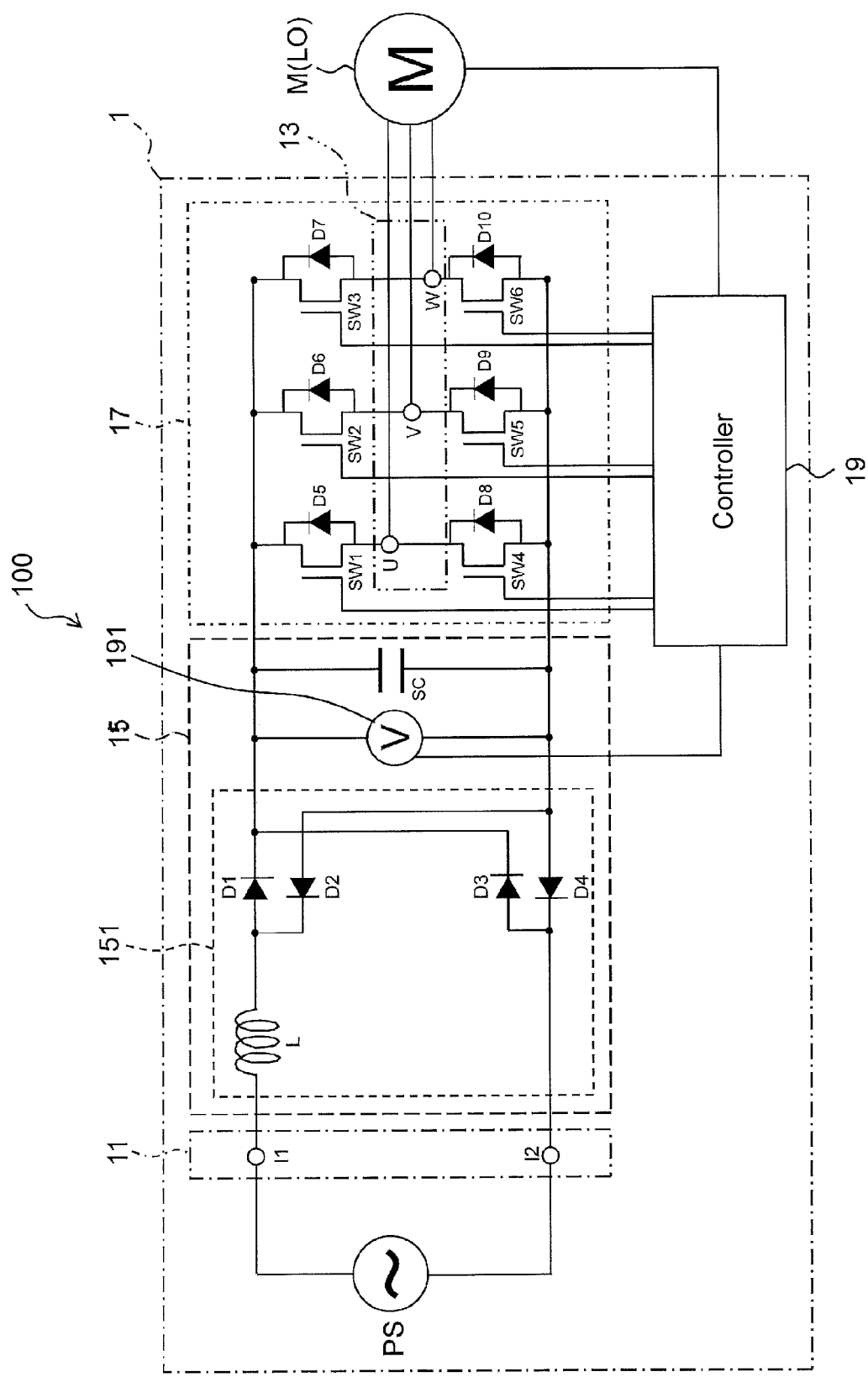
FIG. 5 is a diagram illustrating a detailed configuration of the driving device.

Hereinafter, a detailed configuration of the driving device 100 according to the first embodiment will be described with reference to FIG. 5. The driving device 100 according to the first embodiment is the driving device 100 in which a three-phase brushless motor M is used as the load LO, as illustrated in FIG. 5. The three-phase brushless motor M has three phases which are U, V, and W phases.

Accordingly, in the driving device 100 according to the first embodiment, three terminals connected to the respective phases of the three-phase brushless motor M form the output unit 13. Hereinafter, a detailed configuration of the switching circuit 17 and the rectifier unit 151 of the rectifier circuit 15 will be described.

1-3-1. Detailed Configuration of Rectifier Unit

In the first embodiment described above, the rectifier unit 151 is a full-wave rectifier circuit. Specifically, as illustrated in FIG. 5, the rectifier unit 151 includes four rectifier elements D1 to D4 and an inductor element L.

The four rectifier elements D1 to D4 form a bridge circuit. Specifically, the rectifier element D1 connects an anode side to a first input terminal I1 of the input unit 11 via the inductor element L and connects a cathode side to one end of the smoothing capacitor SC. The rectifier element D2 connects the cathode side to the first input terminal I1 via the inductor element L and connects the anode side to the other end of the smoothing capacitor SC. The other end of the smoothing capacitor SC is an opposite side to the one end to which the cathode side of the rectifier element D1 is connected.

The rectifier element D3 connects the anode side to a second input terminal I2 and connects the cathode side to one end of the smoothing capacitor SC. The rectifier element D4 connects the cathode side to the second input terminal I2 and connects the anode side to the other end of the smoothing capacitor SC.

In the bridge circuit formed by the four rectifier elements D1 to D4, the rectifier elements D1 and D4 are in a conductive state and the rectifier element D2 and D3 are in a nonconductive state when the voltage of the AC input $V_{in}$ is positive and the absolute value of the voltage exceeds a voltage of the smoothing capacitor SC. In the embodiment, the voltage of the AC input $V_{in}$ is assumed to be positive when a potential of the first input terminal I1 is higher than a potential of the second input terminal I2.

As a result, a voltage of the smoothing capacitor SC is a positive voltage. That is, the one end of the smoothing capacitor SC has a positive potential and the other side has a negative potential (0 potential).

On the other hand, the rectifier elements D2 and D3 are in a conductive state and the rectifier elements D1 and D4 are in a nonconductive state when the voltage of the AC input $V_{in}$ is negative and the absolute value of the voltage exceeds the voltage of the smoothing capacitor SC. As a result, one end of the smoothing capacitor SC has a positive potential and the other end has a negative potential (0 potential). That is, the voltage of the smoothing capacitor SC is a positive voltage.

For example, diodes such as PN diodes or Schottky diodes can be used as the rectifier elements D1 to D4.

The inductor element L is, for example, an example, an inductance component such as a coil. The inductor element L connects one end to the first input terminal I1 and connects the other end to the anode side of the rectifier element D1 or the cathode side of the rectifier element D2. The inductor element L connected in this way forms a passive power factor improvement circuit along with the smoothing capacitor SC and suppresses occurrence of harmonics in an input current from the AC power supply PS.

In the foregoing example, the inductor element L is provided between the first input terminal I1 and the rectifier elements D1 and D2, but the present invention is not limited thereto. For example, the inductor element L may be provided between the second input terminal I2 and the rectifier elements D3 and D4 or may be provided in both thereof. The rectifier elements may be disposed on the side of the input unit 11 with respect to the inductor element L.

1-3-2. Detailed Configuration of Switching Circuit

Since the load LO of the driving device 100 is the three-phase brushless motor M, the switching circuit 17 (an example of a motor control circuit) is an inverter circuit. Specifically, the switching circuit 17 includes six switching elements SW1 to SW6 and six rectifier elements D5 to D10 corresponding to the switching elements SW1 to SW6.

The switching element SW1 connects one end to one end of the smoothing capacitor SC and connects the other end to a U terminal of the output unit 13. A control pole (gate pole) of the switching element SW1 is connected to the controller 19. Thus, the switching element SW1 connects or disconnects the one end of the smoothing capacitor SC to or from the U terminal under the control of the controller 19.

The rectifier element D5 corresponding to the switching element SW1 connects one end of the anode side to the U terminal and connects the other end of the cathode side to one end of the smoothing capacitor SC.

The switching element SW2 connects one end to one end of the smoothing capacitor SC and connects the other end to a V terminal of the output unit 13. A control pole of the switching element SW2 is connected to the controller 19. Thus, the switching element SW2 connects or disconnects the one end of the smoothing capacitor SC to or from the V terminal under the control of the controller 19.

The rectifier element D6 corresponding to the switching element SW2 connects one end of the anode side to the V terminal and connects the other end of the cathode side to one end of the smoothing capacitor SC.

The switching element SW3 connects one end to one end of the smoothing capacitor SC and connects the other end to a W terminal of the output unit 13. A control pole of the switching element SW3 is connected to the controller 19. Thus, the switching element SW3 connects or disconnects the one end of the smoothing capacitor SC to or from the W terminal under the control of the controller 19.

The rectifier element D7 corresponding to the switching element SW3 connects one end of the anode side to the W terminal and connects the other end of the cathode side to one end of the smoothing capacitor SC.

The switching element SW4 connects one end to the U terminal of the output unit 13 and connects the other end to the other end of the smoothing capacitor SC. A control pole of the switching element SW4 is connected to the controller 19. Thus, the switching element SW4 connects or disconnects the other end of the smoothing capacitor SC to or from the U terminal under the control of the controller 19.

The rectifier element D8 corresponding to the switching element SW4 connects one end of the anode side to the other end of the smoothing capacitor SC and connects the other end of the cathode side to the U terminal.

The switching element SW5 connects one end to the V terminal of the output unit 13 and connects the other end to the other end of the smoothing capacitor SC. A control pole of the switching element SW5 is connected to the controller 19. Thus, the switching element SW5 connects or disconnects the other end of the smoothing capacitor SC to or from the V terminal under the control of the controller 19.

The rectifier element D9 corresponding to the switching element SW5 connects one end of the anode side to the other end of the smoothing capacitor SC and connects the other end of the cathode side to the V terminal.

The switching element SW6 connects one end to the W terminal of the output unit 13 and connects the other end to the other end of the smoothing capacitor SC. A control pole of the switching element SW6 is connected to the controller 19. Thus, the switching element SW6 connects or disconnects the other end of the smoothing capacitor SC to or from the W terminal under the control of the controller 19.

The rectifier element D10 corresponding to the switching element SW6 connects one end of the anode side to the other end of the smoothing capacitor SC and connects the other end of the cathode side to the W terminal.

Since the ON-state and the OFF-state are switched at a high speed in the switching circuit 17, the switching elements SW1 to SW6 included in the switching circuit 17 are preferably elements capable of performing a switching operation at a high speed.

Accordingly, in the embodiment, the switching elements SW1 to SW6 are, for example, metal oxide semiconductor field effect transistors (MOSFETs). Additionally, for example, semiconductor elements that have switching characteristics, such as field effect transistors, bipolar transistors, insulated gate bipolar transistors (IGBTs), or thyristors other than MOSFETs can be used. For the switching elements SW1 to SW6, a configuration of a combination of these semiconductor elements may be used.

The rectifier elements D5 to D10 are, for example, diodes such as PN diodes or Schottky diodes. Additionally, the rectifier elements D5 to D10 may be rectifier elements formed in the corresponding switching elements SW1 to SW6. The rectifier elements formed in the switching elements SW1 to SW6 are called body diodes, parasitic diodes, or the like.

Thus, in the switching circuit 17, the rectifier elements D5 to D10 may not be separate components from the switching elements SW1 to SW6. As a result, the number of components of the switching circuit 17 can be reduced.

In the switching circuit 17 that has the foregoing configuration, the controller 19 switches each of the switching elements SW1 to SW6 between ON and OFF by applying an ON signal and an OFF signal of each of the switching elements SW1 to SW6 to the control pole of each of the switching elements SW1 to SW6. The ON signal is, for example, a positive voltage signal. On the other hand, the OFF signal is, for example, a zero voltage signal.

In the embodiment, a switching timing of each of the switching elements SW1 to SW6 is determined based on 120-degree conduction scheme (to be described below). Specifically, for example, as illustrated in FIG. 6, PWM control is performed on the switching elements SW1 to SW3 which are high-side switches.

Hereinafter, the three-phase brushless motor M serving as the load LO includes, for example, a U-phase rotor detection element disposed between a W-phase winding and a U-phase winding, a V-phase rotor detection element disposed between the U-phase winding and a V-phase winding, and a W-phase rotor detection element disposed between the V-phase winding and the W-phase winding (none of which is illustrated). The controller 19 can detect where the rotor of the three-phase brushless motor M is from output signals of the rotor detection elements.

As the rotor detection elements, for example, Hall elements detecting magnetic fields which the rotors have can be used.

Figure 6:
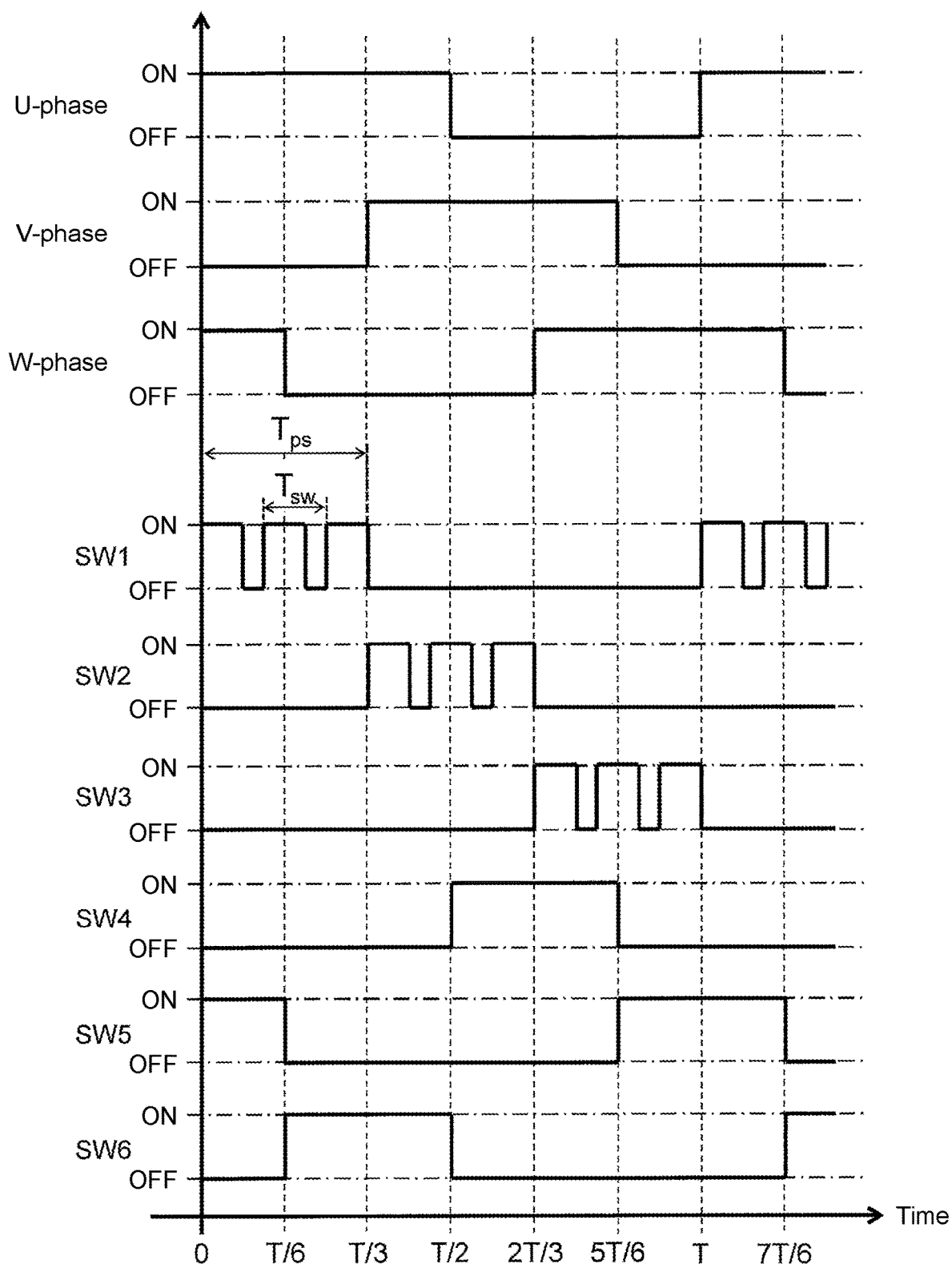
FIG. 6 is a diagram illustrating an example of a time chart illustrating an operation of each switching element of a switching circuit.

In the example illustrated in FIG. 6, a timing at which the U-phase rotor detection element detects passage of the rotor (in FIG. 6, a "U-phase" is turned on) is time 0 and a rotation period of the rotor is T. A voltage of the rectified output $V_{out}$ is assumed to be positive. That is, a potential of a side connected to the switching element SW1 of the smoothing capacitor SC is assumed to be higher than a potential of a side connected to the switching element SW4.

During a time from 0 to T/6, the controller 19 turns on the switching elements SW1 and SW5 and turns off the other switching elements. At this time, the impedance of the switching element SW1, the U-phase, the V-phase, and the switching element SW5, from one end of the smoothing capacitor SC to the other end of the smoothing capacitor SC is lowered.

As a result, the input impedance viewed from the smoothing capacitor SC is lowered and the rectified output $V_{out}$ is supplied between the U-phase and the V-phase of the three-phase brushless motor M from the rectifier circuit 15.

On the other hand, the impedance between one end of the smoothing capacitor SC, and the U-phase, the V-phase and the W-phase is raised by turning off the switching element SW1 within that time range. As a result, the input impedance viewed from the smoothing capacitor SC is raised and the supply of the rectified output $V_{out}$ between the U-phase and the V-phase from the rectifier circuit 15 is stopped. On the other hand, a reflux current flows along a path of the rectifier element D8, the U-phase, the V-phase, and the switching element SW5.

During a time from T/6 to 2T/6 (=T/3), the controller 19 turns on the switching elements SW1 and SW6 and turns off the other switching elements. At this time, the impedance of the switching element SW1, the U-phase, the W-phase, and the switching element SW6, from one end of the smoothing capacitor SC to the other end of the smoothing capacitor SC is lowered.

Thus, the input impedance viewed from the smoothing capacitor SC is lowered and the rectified output $V_{out}$ is supplied between the U-phase and the W-phase of the three-phase brushless motor M from the rectifier circuit 15.

On the other hand, the impedance between one end of the smoothing capacitor SC, and the U-phase, the V-phase and the W-phase is raised by turning off the switching element SW1 within that time range. As a result, the input impedance viewed from the smoothing capacitor SC is raised and the supply of the rectified output $V_{out}$ between the U-phase and the W-phase from the rectifier circuit 15 is stopped. On the other hand, a reflux current flows along a path of the rectifier element D8, the U-phase, the W-phase, and the switching element SW6.

From T/3 to 3T/6 (=T/2) which is a timing at which the V-phase rotor detection element is turned on, the controller 19 turns on the switching elements SW2 and SW6 and turns off the other switching elements. At this time, the impedance of the switching element SW2, the V-phase, the W-phase, and the switching element SW6, from one end of the smoothing capacitor SC to the other end of the smoothing capacitor SC is lowered.

As a result, the input impedance viewed from the smoothing capacitor SC is lowered and the rectified output $V_{out}$ is supplied between the V-phase and the W-phase of the three-phase brushless motor M from the rectifier circuit 15.

On the other hand, the impedance between one end of the smoothing capacitor SC, and the U-phase, the V-phase, and the W-phase is raised by turning off the switching element SW2 within that time range. As a result, the input impedance viewed from the smoothing capacitor SC is raised and the supply of the rectified output $V_{out}$ between the V-phase and the W-phase from the rectifier circuit 15 is stopped. On the other hand, a reflux current flows along a path of the rectifier element D9, the V-phase, the W-phase, and the switching element SW6.

During a time from T/2 to 4T/6 (=2T/3), the controller 19 turns on the switching elements SW2 and SW4 and turns off the other switching elements. At this time, the impedance of the switching element SW2, the V-phase, the U-phase, and the switching element SW4, from one end of the smoothing capacitor SC to the other end of the smoothing capacitor SC is lowered.

As a result, the input impedance viewed from the smoothing capacitor SC is lowered and the rectified output $V_{out}$ is supplied between the V-phase and the U-phase of the three-phase brushless motor M from the rectifier circuit 15.

On the other hand, the impedance between one end of the smoothing capacitor SC, and the U-phase, the V-phase, and the W-phase is raised by turning off the switching element SW2 within that time range. As a result, the input impedance viewed from the smoothing capacitor SC is raised and the supply of the rectified output $V_{out}$ between the V-phase and the U-phase from the rectifier circuit 15 is stopped. On the other hand, a reflux current flows along a path of the rectifier element D9, the V-phase, the U-phase, and the switching element SW4.

From 2T/3 to 5T/6 which is a timing at which the W-phase rotor detection element is turned on, the controller 19 turns on the switching elements SW3 and SW4 and turns off the other switching elements. At this time, the impedance of the switching element SW3, the W-phase, the U-phase, and the switching element SW4, from one end of the smoothing capacitor SC to the other end of the smoothing capacitor SC is lowered.

As a result, the input impedance viewed from the smoothing capacitor SC is lowered and the rectified output $V_{out}$ is supplied between the W-phase and the U-phase of the three-phase brushless motor M from the rectifier circuit 15.

On the other hand, the impedance between one end of the smoothing capacitor SC, and the U-phase, the V-phase, and the W-phase is raised by turning off the switching element SW3 within that time range. As a result, the input impedance viewed from the smoothing capacitor SC is raised and the supply of the rectified output $V_{out}$ between the W-phase and the U-phase from the rectifier circuit 15 is stopped. On the other hand, a reflux current flows along a path of the rectifier element D10, the W-phase, the U-phase, and the switching element SW4.

During a time from 5T/6 to T, the controller 19 turns on the switching elements SW3 and SW5 and turns off the other switching elements. At this time, the impedance of the switching element SW3, the W-phase, the V-phase, and the switching element SW5, from one end of the smoothing capacitor SC to the other end of the smoothing capacitor SC is lowered.

As a result, the input impedance viewed from the smoothing capacitor SC is lowered and the rectified output $V_{out}$ is supplied between the W-phase and the V-phase of the three-phase brushless motor M from the rectifier circuit 15.

On the other hand, the impedance between one end of the smoothing capacitor SC, and the U-phase, the V-phase, and the W-phase is raised by turning off the switching element SW3 within that time range. As a result, the input impedance viewed from the smoothing capacitor SC is raised and the supply of the rectified output $V_{out}$ between the W-phase and the V-phase from the rectifier circuit 15 is stopped. On the other hand, a reflux current flows along a path of the rectifier element D10, the W-phase, the V-phase, and the switching element SW5.

By combining turning ON and OFF of the switching elements SW1 to SW6, as described above, the switching circuit 17 can switch between an ON-state which is a state in which the input impedance viewed from the smoothing capacitor SC is low and an OFF-state which is a state in which the input impedance is high.

By causing the switching circuit 17 to switch between the ON-state and the OFF-state, it is possible to switch between a state in which the rectified output $V_{out}$ is output from the rectifier circuit 15 to the three-phase brushless motor M and a state in which an output of the rectified output $V_{out}$ to the three-phase brushless motor M stops, and rotate the rotor of the three-phase brushless motor M.

A time in which the switching elements SW1 to SW3 are turned on, turned off, and turned on again in the switching operation of the switching element SW1 during the time of 0 to T/3, the switching operation of the switching element SW2 during the time of T/3 to 2T/3, and the switching operation of the switching element SW3 during the time of 2T3 to T is referred to as a "switching period $T_{sw}$" (see FIG. 6).

In a switching operation, a ratio of the length of a time in which each of the switching element SW1 to SW3 is turned on to the switching period $T_{sw}$ is defined as a "duty ratio." Further, a period in which each of the switching elements SW1 to SW3 performs a switching operation is referred to as a "power supply period $T_{ps}$".

As described above, a period in which each of the switching elements SW1 to SW3 performs a switching operation, that is, the "power supply period $T_{ps}$", is a period of T/3. That is, the power supply period $T_{ps}$ is a time of ⅓ of the rotation period of the rotor. In this way, a conduction scheme in which the power supply period $T_{ps}$ is a time of ⅓ of the rotation period of the rotor is generally referred to as a "120-degree conduction scheme".

The controller 19 inputs a signal in which an ON signal and an OFF signal are switched at a high speed at the switching period $T_{sw}$ shorter than an AC period of the AC input $V_{in}$ to the control pole of each of the switching elements SW1 to SW3 of the switching circuit 17 during the power supply period $T_{ps}$. Thus, the switching circuit 17 can switch between the ON-state in which the input impedance viewed from the smoothing capacitor SC is low and the OFF-state in which the input impedance is high at a high speed at the switching period $T_{sw}$ during the power supply period $T_{ps}$ under the control of the controller 19.

In addition, the controller 19 determines the duty ratio of each of the switching elements SW1 to SW3 of the switching circuit 17 which is an inverter circuit based on a predetermined condition and adjusts a ratio during the switching period $T_{sw}$ of the ON signal and the OFF signal input to the control poles of the switching elements SW1 to SW3 based on the determined duty ratio (PWM control).

As will be described below, in the embodiment, the duty ratio is modulated in accordance with a variation of a voltage of the smoothing capacitor SC (the rectified output $V_{out}$). Accordingly, hereinafter, a finally calculated duty ratio is referred to as a "modulation duty ratio DR". A specific calculation method for the modulation duty ratio DR will be described in detail later.

By adjusting the modulation duty ratio DR in the switching circuit 17, it is possible to adjust an output time of the rectified output $V_{out}$ to the load LO at the switching period $T_{sw}$. That is, it is possible to adjust a sum of the output times of the rectified output $V_{out}$ during the power supply period $T_{ps}$ and adjust an average value of currents and voltages supplied during the power supply period $T_{ps}$.

In the embodiment, the controller 19 includes a measurement unit 191 connected in parallel to the smoothing capacitor SC. The measurement unit 191 is a voltmeter that measures the voltage (the rectified output $V_{out}$) of the smoothing capacitor SC.

The measurement unit 191 is configured as, for example, a circuit in which a plurality of resistive elements dividing the voltage of the smoothing capacitor SC are connected in series.

In this case, the controller 19 connects any one of the plurality of resistive elements connected in series to an A/D converter included in the controller 19. Thus, the controller 19 can monitor the voltage of the smoothing capacitor SC.

1-4. Control Method for Driving Device in First Embodiment

Figure 7:
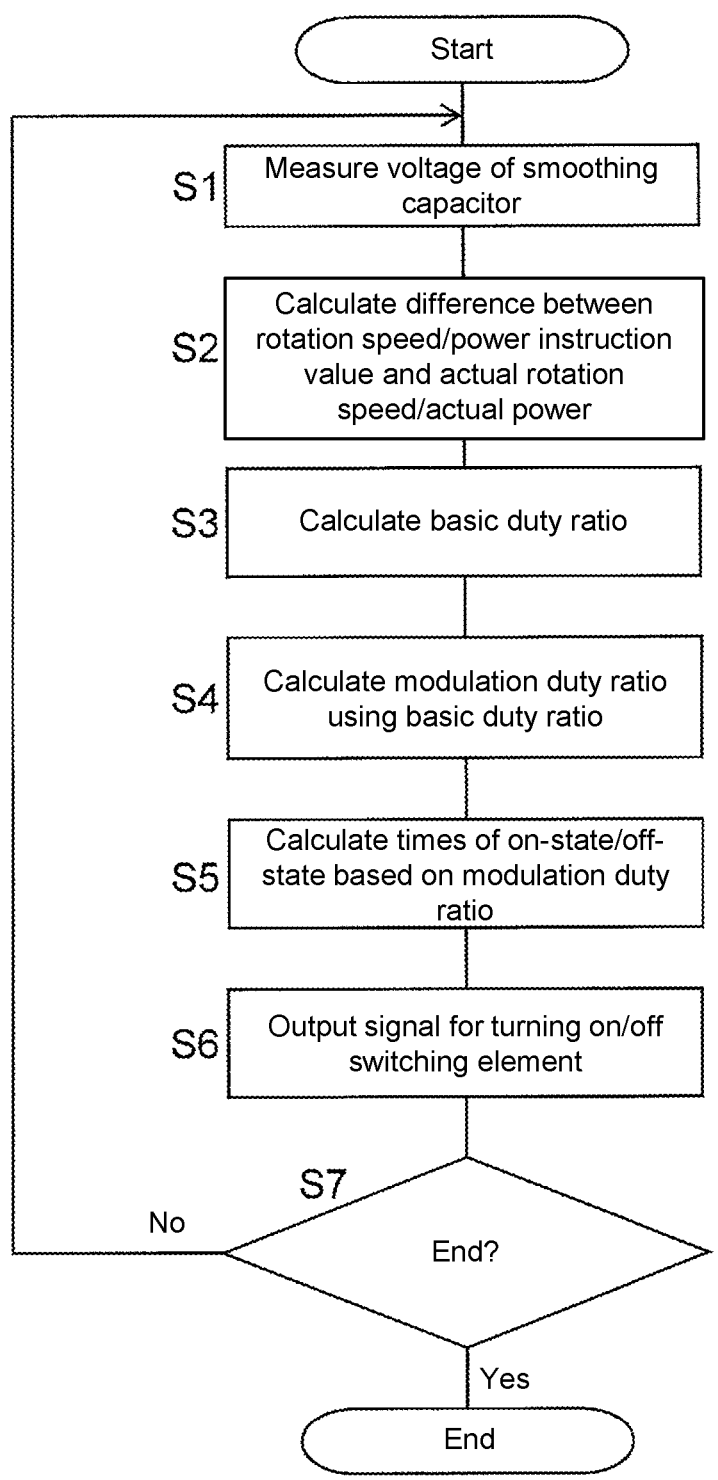
FIG. 7 is a flowchart illustrating a control method for the driving device (power source device) according to a first embodiment.

Hereinafter, a control method for the driving device 100 according to the embodiment will be described with reference to FIG. 7. FIG. 7 is a flowchart illustrating the control method for the driving device.

When the driving device 100 starts controlling the three-phase brushless motor M, the controller 19 measures a current voltage of the smoothing capacitor SC from the measurement unit 191 (step S1).

As will be described below, a current voltage measurement value of the smoothing capacitor SC is used to calculate a future modulation duty ratio DR. Accordingly, the controller 19 stores the voltage measurement value of the smoothing capacitor SC in association with a time at which the voltage measurement value is measured in a storage region of the storage element of the controller 19.

In another embodiment, the controller 19 may store the voltage measurement value of the smoothing capacitor SC in association with a number indicating at which time the voltage measurement value of the smoothing capacitor SC is measured after start of the measurement.

Subsequently, the controller 19 calculates a difference between an instruction value of a rotation speed of the three-phase brushless motor M set in the controller 19 or in an external device by a user and a current actual rotation speed of the rotor of the three-phase brushless motor M (step S2). The instruction value of the rotation speed of the three-phase brushless motor M is referred to as a target rotation speed.

For example, the rotation speed of the rotor of the three-phase brushless motor M can measure the rotation speed based on the number of pulses per unit time input from an encoder (not illustrated) provided in an output rotation shaft of the rotor. Alternatively, for example, the controller 19 can measure the rotation speed of the rotor based on a length of time of being ON or OFF in the rotor detection element or a length of one period of being ON and OFF.

After the controller 19 calculates the difference between the target rotation speed and the actual rotation speed of the rotor, the controller 19 calculates a duty ratio before the modulation of each of the switching elements SW1 to SW3 based on the difference (step S3). The duty ratio before the modulation calculated in step S3 is set independently from the variation in the rectified output $V_{out}$, and thus referred to as a "basic duty ratio $DR_B$".

In addition, in the embodiment, each of the switching elements SW1 to SW3 performs a switching operation in accordance with the 120-degree conduction scheme. Therefore, the basic duty ratio $DR_B$ of each of the switching elements SW1 to SW3 has a different phase. The basic duty ratio $DR_B$ is set independently from the rectified output $V_{out}$. Further, the sum is a constant value independent from a time other than a variation based on a target rotation speed or the like.

For example, when the target rotation speed is greater than the actual rotation speed of the rotor, the controller 19 increases the currently set basic duty ratio $DR_B$ and calculates the basic duty ratio $DR_B$. Conversely, when the target rotation speed is less than the actual rotation speed of the rotor, the controller 19 decreases the currently set basic duty ratio $DR_B$ and calculates the basic duty ratio $DR_B$.

In step S2 described above, the user may set the power instruction value to be output to the three-phase brushless motor M. The power instruction value to be output to the three-phase brushless motor M is referred to as target power. In this case, the controller 19 may calculate the difference between the target power and an actually measured value of the power actually input to the three-phase brushless motor M.

The power to be input to the three-phase brushless motor M can be calculated, for example, when the controller 19 multiplies a current value obtained by providing a detection mechanism (not illustrated) for a current flowing from the rectifier circuit 15 to the switching circuit 17 by the voltage of the smoothing capacitor SC detected by the measurement unit 191.

The detection mechanism for the current can be realized, for example, by providing current detection resistors along a path from the switching elements SW4 to SW6 to a surface lower end of the smoothing capacitor SC. The controller 19 can measure a current flowing to the switching circuit 17 based on a measured value of a difference between voltages of both ends of the resistors.

In this case, in step S3 described above, when the target power is greater than the power actually input to the three-phase brushless motor M, the controller 19 calculates the basic duty ratio $DR_B$ by increasing the currently set basic duty ratio $DR_B$. Conversely, when the target power is less than the power actually input to the three-phase brushless motor M, the controller 19 calculates the basic duty ratio $DR_B$ by decreasing the currently set basic duty ratio $DR_B$.

After the basic duty ratio $DR_B$ is calculated in this way, the controller 19 calculates the modulation duty ratio DR modulated in accordance with a variation in the voltage of the smoothing capacitor SC in each of the switching elements SW1 to SW3 using the basic duty ratio $DR_B$ (step S4).

In the embodiment, the controller 19 calculates the modulation duty ratio DR to be set by reading the previous voltage measurement value of the smoothing capacitor SC measured in step S1 a predetermined time before from the storage region and correcting the basic duty ratio $DR_B$ based on a reciprocal of an absolute value of the voltage measurement value.

For example, the controller 19 calculates the modulation duty ratio DR(t) to be set at current time t by the following expression:

$$DR(t) = \{(A^* V_{ave})/V(t-t')\}^* DR_B(t) + (1-A)^* DR_B(t)$$

(A: a positive constant equal to or less than 1, $V_{ave}$: an average value of voltages of the smoothing capacitor SC, V(t−t'): a voltage measurement value of the smoothing capacitor SC time t' previously, and $DR_B(t)$: the basic duty ratio $DR_B$ at time t).

The modulation duty ratio DR(t) is further rewritten as follows:

$$DR(t) = [\{(A^* V_{ave})/V(t-t')\} + (1-A)]^* DR_B(t)$$

That is, the modulation duty ratio DR(t) is a multiple of $[\{(A^*V_{ave})/V(t-t')\}+(1-A)]$ which is a value obtained by varying the basic duty ratio $DR_B(t)$ in accordance with the voltage measurement value of the smoothing capacitor SC. Accordingly, a value expressed as $[\{(A^*V_{ave})/V(t-t')\}+(1-A)]$ is called a modulation width of the modulation duty ratio DR(t).

A value of the positive constant A equal to or less than 1 and included in the expression for calculating the modulation duty ratio DR(t) at time t can be appropriately determined in accordance with the magnitude or the like of a ripple voltage included in the rectified output $V_{out}$. The average voltage $V_{ave}$ of voltages of the smoothing capacitor SC can be calculated, for example, by averaging the voltage measurement values of the smoothing capacitor SC.

The previous voltage measurement value of the smoothing capacitor SC used in the above expression may be, for example, a voltage measurement value a predetermined number of values previous to the current voltage measurement value among the voltage measurement values stored in the storage region when the voltage measurement value is measured at each of predetermined times.

After the modulation duty ratio DR is calculated in this way, the controller 19 calculates times of the ON-state and the OFF-state of the switching circuit 17 at the switching period $T_{sw}$ based on the calculated modulation duty ratio DR (step S5).

For example, the controller 19 can calculate a time at which the switching circuit 17 enters the ON-state as $T_{sw}*DR$ ($T_{sw}$: a switching period and DR: a calculated modulation duty ratio) and can calculate a time at which the switching circuit 17 enters the OFF-state as $T_{sw}*(1-DR)$.

Thereafter, during the power supply period $T_{ps}$, the controller 19 repeatedly outputs an ON-signal for causing the switching circuit 17 to enter the ON-state by a time of $T_{sw}*DR$ and outputs an OFF-signal for causing the switching circuit 17 to enter the OFF-state by a time of $T_{sw}*(1-DR)$ in the switching period $T_{sw}$ in any of the switching elements SW1 to SW3 (step S6).

According to the time chart illustrated in FIG. 6, a switching element to which the signal is output can be determined among the switching elements SW1 to SW3, for example, by confirming the ON-state and the OFF-state of the rotor detection element.

By performing steps S5 and S6 described above, the controller 19 can control switching between the ON-state and the OFF-state of the switching circuit 17 by adjusting a length in which the ON-state is maintained and a length in which the OFF-state is maintained in accordance with the set modulation duty ratio DR.

For example, the controller 19 receives an instruction to stop an operation of the driving device 100 or detects abnormality of the driving device 100 and repeatedly performs steps S1 to S6 as long as it is determined that the control of the driving device 100 does not end (as long as "No" in step S7). That is, the control of the driving device 100 continues.

Conversely, when it is determined that the control of the driving device 100 ends (the case of "Yes" in step S7), the controller 19 stops the control of the driving device 100 after appropriately performing end sequence control as necessary.

Figure 8:
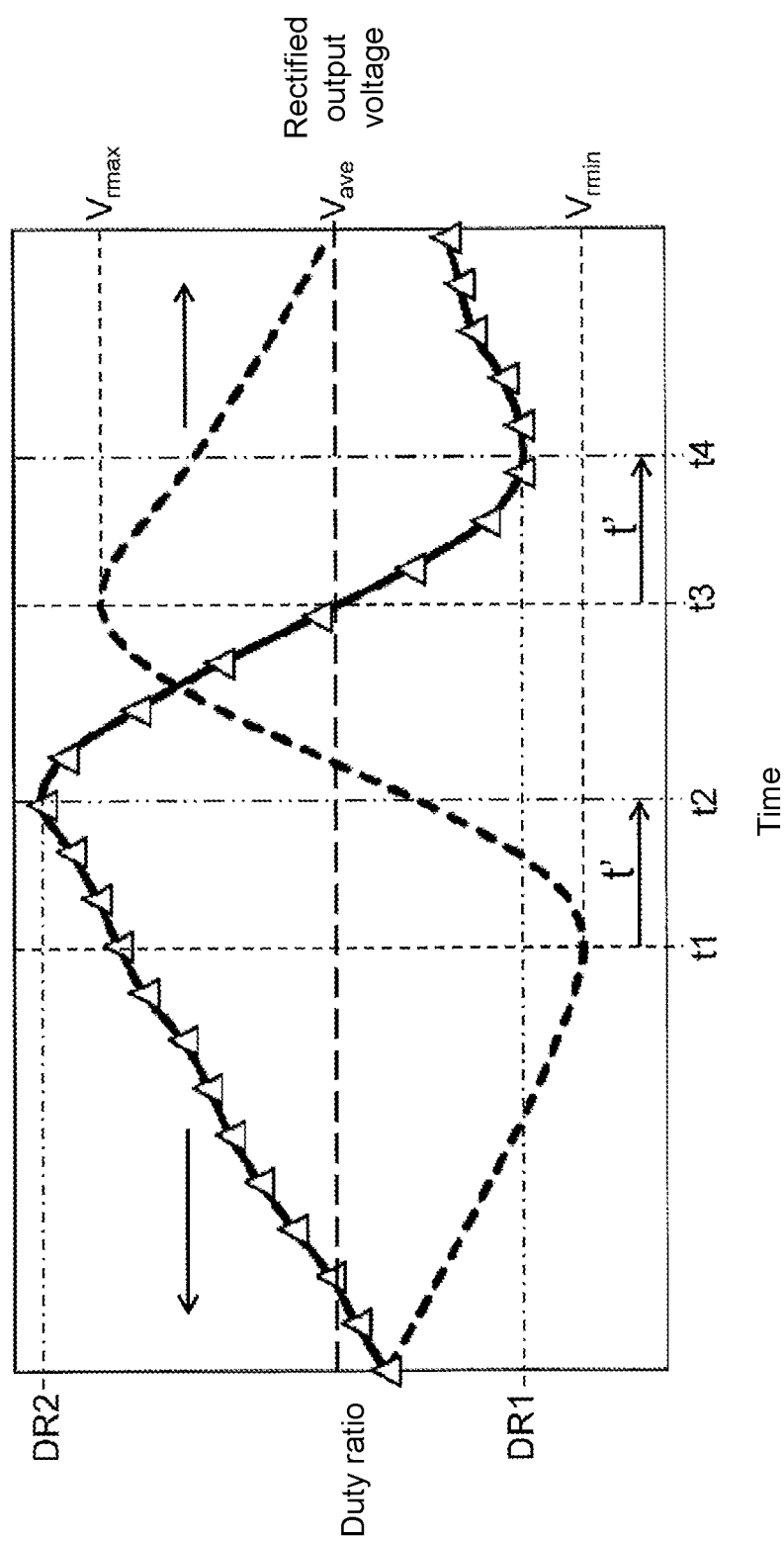
FIG. 8 is a diagram illustrating an example of a variation in a modulation duty ratio set in the driving device.

By repeatedly performing steps S1 to S6 described above, the modulation duty ratio DR set in the controller 19 varies, as illustrated in FIG. 8. FIG. 8 is a diagram illustrating an example of a variation in a modulation duty ratio set in the driving device.

In FIG. 8, the rectified output $V_{out}$ is indicated by a dotted line. On the other hand, the modulation duty ratio DR set at each time is indicated by white triangles and a solid line. FIG. 8 illustrates a set value of the modulation duty ratio DR corresponding to almost one period of a variation in the rectified output $V_{out}$, and the variation in the set value of the modulation duty ratio DR illustrated in FIG. 8 continues during an operation of the driving device 100.

As illustrated in FIG. 8, the modulation duty ratio DR calculated in this way varies periodically between a first duty ratio DR1 and a second duty ratio DR2 greater than the first duty ratio DR1 to correspond to a periodic voltage variation of the rectified output $V_{out}$. The magnitudes of the first duty ratio DR1 and the second duty ratio DR2 can be determined in accordance with, for example, the constant A in the foregoing expression for calculating the duty ratio. The second duty ratio DR2 may be a maximum duty ratio which can be set in the power supply device 1.

Here, a direction of the variation in the modulation duty ratio DR is opposite to that of the variation in the voltage of the rectified output $V_{out}$. This is because the modulation duty ratio DR in the embodiment is calculated based on the reciprocal of the voltage measurement value of the smoothing capacitor SC.

The periodic variation in the modulation duty ratio DR deviates from the periodic variation in the rectified output $V_{out}$ by a predetermined time. Specifically, a timing t2 at which the modulation duty ratio DR becomes the second duty ratio DR2 is delayed by a time t2 from a timing t1 at which the rectified output $V_{out}$ becomes a minimum value $V_{min}$ in FIG. 8.

A timing t4 at which the modulation duty ratio DR becomes the first duty ratio DR1 is also delayed by the time t' from a timing t3 at which the rectified output $V_{out}$ becomes a maximum value $V_{rmax}$.

A delay width (time t') of the variation in the modulation duty ratio DR with respect to the variation in the rectified output $V_{out}$ can be determined in accordance with, for example, V(t–t') in the foregoing expression for calculating the modulation duty ratio DR. That is, the duty ratio DR can be determined in accordance with a certain previous voltage measurement value used to calculate the modulation duty ratio DR among the voltage measurement values of the smoothing capacitor SC.

The rectified output $V_{out}$ varies to correspond to the frequency of the AC input $V_{in}$. Specifically, for example, when the frequency of the AC input $V_{in}$ increases, the period of the variation in the rectified output $V_{out}$ is also shortened. Accordingly, the controller 19 may determine the time t' which is a specific deviation width between the variation in the modulation duty ratio DR and the variation in the rectified output $V_{out}$ based on an AC period of the AC input $V_{in}$.

For example, when the AC period of the AC input $V_{in}$ is shortened, the controller 19 selects a voltage measurement value measured at a time closer to the present than a previous voltage measurement value of the smoothing capacitor SC selected before a decrease in the AC period and calculates the modulation duty ratio DR. That is, the time t' in the foregoing expression is set to be small.

Thus, even when the AC period of the AC input $V_{in}$ varies, the deviation in the variation in the modulation duty ratio DR with respect to the variation of the rectified output $V_{out}$ can be maintained as an optimum value. Specifically, for example, it is possible to constantly maintain the deviation between a phase of the variation in the rectified output $V_{out}$ and a phase of the variation in the modulation duty ratio DR.

When the timing at which the modulation duty ratio DR becomes the second duty ratio DR2 deviates by the predetermined time t' from the timing at which the voltage of the rectified output $V_{out}$ becomes the minimum value $V_{rmin}$, as illustrated in FIG. 8, the timing at which the modulation duty ratio DR becomes the second duty ratio DR2, that is, a timing at which the modulation width of the modulation duty ratio DR becomes a maximum value, is included in a period in which the voltage of the rectified output $V_{out}$ increases from the minimum value $V_{rmin}$ to the maximum value $V_{rmax}$.

By including the timing at which the modulation duty ratio DR becomes the second duty ratio DR2 in the period in which the voltage of the rectified output $V_{out}$ increases from the minimum value $V_{rmin}$ to the maximum value $V_{rmax}$, it is possible to maintain a state in which the modulation duty ratio DR is large within the period.

Within the period in which the voltage of the rectified output $V_{out}$ increases from the minimum value $V_{rmin}$ to the maximum value $V_{rmax}$, an input current with which the smoothing capacitor SC is charged flows in the smoothing capacitor SC.

Accordingly, by including the timing at which the modulation duty ratio DR becomes the second duty ratio DR2 in the period in which the voltage of the rectified output $V_{out}$ increases from the minimum value $V_{rmin}$ to the maximum value $V_{rmax}$, that is, a period from a time at which the input current is generated to a time at which the voltage of the smoothing capacitor SC becomes the maximum value $V_{rmax}$ and increasing the modulation duty ratio DR during the charging period of the smoothing capacitor SC, it is possible to supply more power from the rectifier circuit 15 to the load LO.

On the other hand, in a period other than the period in which the voltage of the rectified output $V_{out}$ increases from the minimum value $V_{rmin}$ to the maximum value $V_{rmax}$, in particular, in a period in which the voltage of the rectified output $V_{out}$ decreases from the maximum value $V_{rmax}$, the modulation duty ratio DR is set to a relatively small set value.

The decrease in the voltage of the rectified output $V_{out}$ in the period means that power is supplied to the load LO by discharging the smoothing capacitor SC. Accordingly, by setting the modulation duty ratio DR in the period in which the voltage of the rectified output $V_{out}$ decreases to a small set value, it is possible to reduce a power supply amount to the load LO in the period and reduce a discharge amount of the smoothing capacitor SC.

By reducing the discharge amount of the smoothing capacitor SC, it is possible to reduce a charge amount for setting the voltage of the smoothing capacitor SC to the maximum value $V_{rmax}$.

By reducing the discharge amount and the charge amount of the smoothing capacitor SC in this way, it is possible to reduce outflow and inflow of a current of the smoothing capacitor SC and suppress deterioration of the smoothing capacitor SC over time. When an electrolytic capacitor is used as the smoothing capacitor SC, a lifespan of the electrolytic capacitor is considerably affected by temperature, but the electrolytic capacitor has relatively large internal resistance. Therefore, when a current flowing in and out of the smoothing capacitor SC, a so-called ripple current, is large, heating is caused inside the smoothing capacitor SC and the lifespan is reduced.

In the embodiment, since the ripple current can be reduced, deterioration of the smoothing capacitor SC due to the heating can be suppressed and reliability of the circuit can be improved. Since an electrolytic capacitor that has capacitance less as the ripple current is smaller can be used, it is possible to reduce manufacturing cost of the circuit.

Additionally, as described above, even when an amount of power varying over time is supplied to the load LO during driving of the load LO, in particular, when the load LO has a large inertia moment such as in the rotor of the three-phase brushless motor M or reactivity to supply power to the load LO is bad, pulsation does not occur in the driving of the load LO and the load LO can be stably driven in accordance with an average value of a given power amount.

1-5. Experiment Results

Hereinafter, experiment results for verifying an effect of delaying the variation in the modulation duty ratio DR by a predetermined time with respect to the variation in the voltage of the smoothing capacitor SC will be described.

To verify the effect, a load current flowing in the U-phase of the three-phase brushless motor was measured when the delay width (time t') of the timing at which the modulation duty ratio DR becomes the second duty ratio DR2 with respect to the timing at which the voltage of the smoothing capacitor SC becomes the minimum value $V_{rmin}$ was set variously and the driving device 100 was operated.

First, how the load current changes depending on whether a variation in the modulation duty ratio DR is delayed with respect to a variation in the voltage of the smoothing capacitor SC will be described with reference to FIG. 9.

Figure 9:
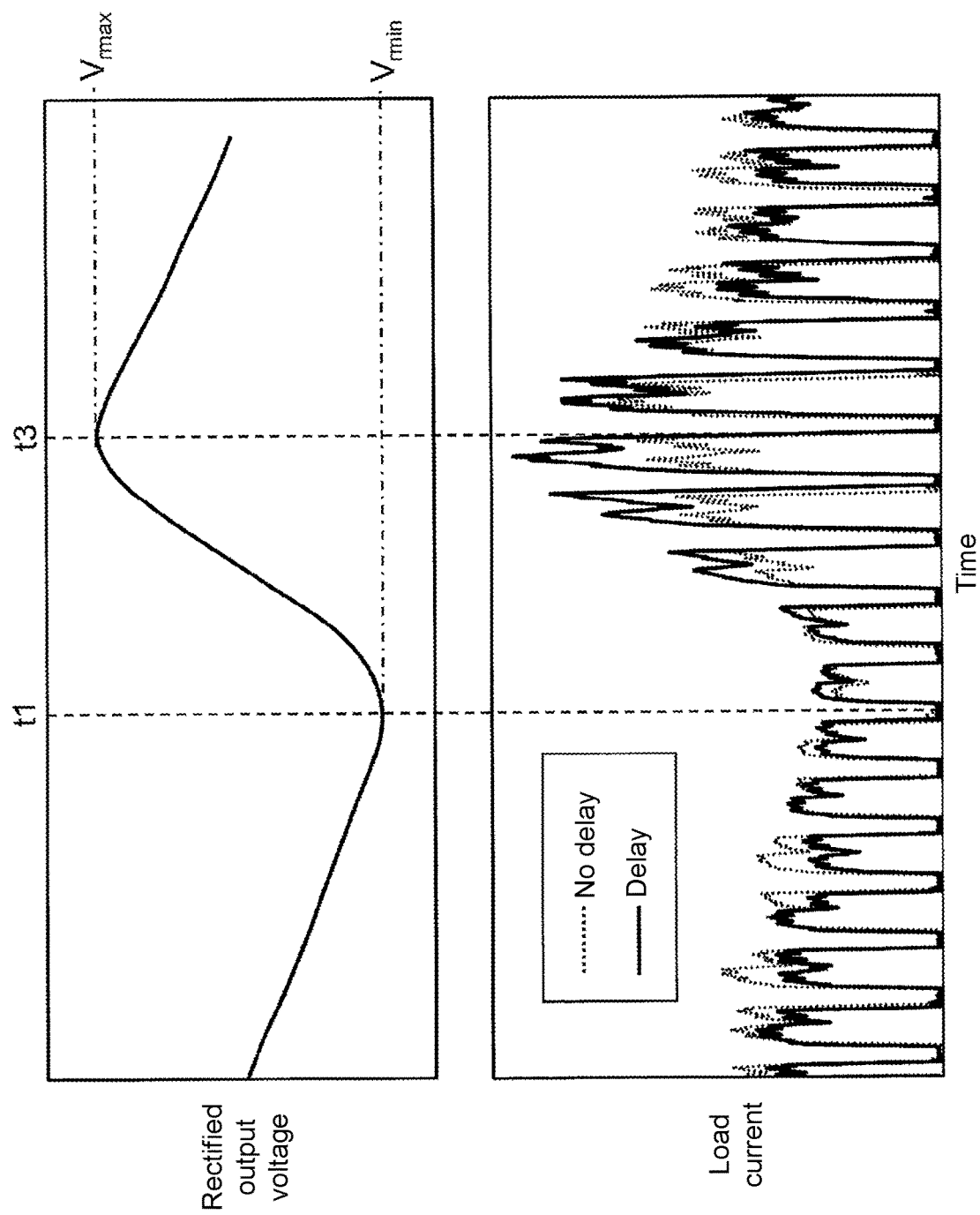
FIG. 9 is a diagram illustrating an example of a load current in accordance with presence or absence of delay of the modulation duty ratio.

In the lower drawing of FIG. 9, a plot of a solid line indicates an absolute value of a load current when there is a delay (time t'=t2'). On the other hand, a plot of a dotted line indicates an absolute value of a load current when there is no delay (time t'=0).

As illustrated in FIG. 9, by delaying the variation in the modulation duty ratio DR with respect to the variation in the voltage of the smoothing capacitor SC within a period in which the voltage of the smoothing capacitor SC increases from the minimum value $V_{rmin}$ to the maximum value $V_{rmax}$, a larger current flows in the U-phase of the three-phase brushless motor than when the variation in the modulation duty ratio DR is not delayed. That is, by delaying the variation in the duty ratio with respect to the variation in the voltage of the smoothing capacitor SC, a current can flow to the U-phase of the three-phase brushless motor more actively while the smoothing capacitor SC is charged.

On the other hand, by delaying the variation in the modulation duty ratio DR with respect to the variation in the voltage of the smoothing capacitor SC within a period in which the voltage of the smoothing capacitor SC decreases, a smaller current flows in the U-phase of the three-phase brushless motor than when the variation in the modulation duty ratio DR is not delayed. That is, by delaying the variation in the duty ratio with respect to the variation in the voltage of the smoothing capacitor SC, the current flowing in the U-phase of a three-shape brushless motor is reduced during discharging of the smoothing capacitor SC.

Next, how a variation width of the voltage of the smoothing capacitor SC (a ripple voltage) and a current flowing in and out of the smoothing capacitor SC (a charging current and a discharging current: a so-called ripple current) are changed at the time of variously changing the time t' by which the variation in the modulation duty ratio DR is delayed with respect to the variation in the voltage of the smoothing capacitor SC will be described with reference to FIG. 10.

Figure 10:
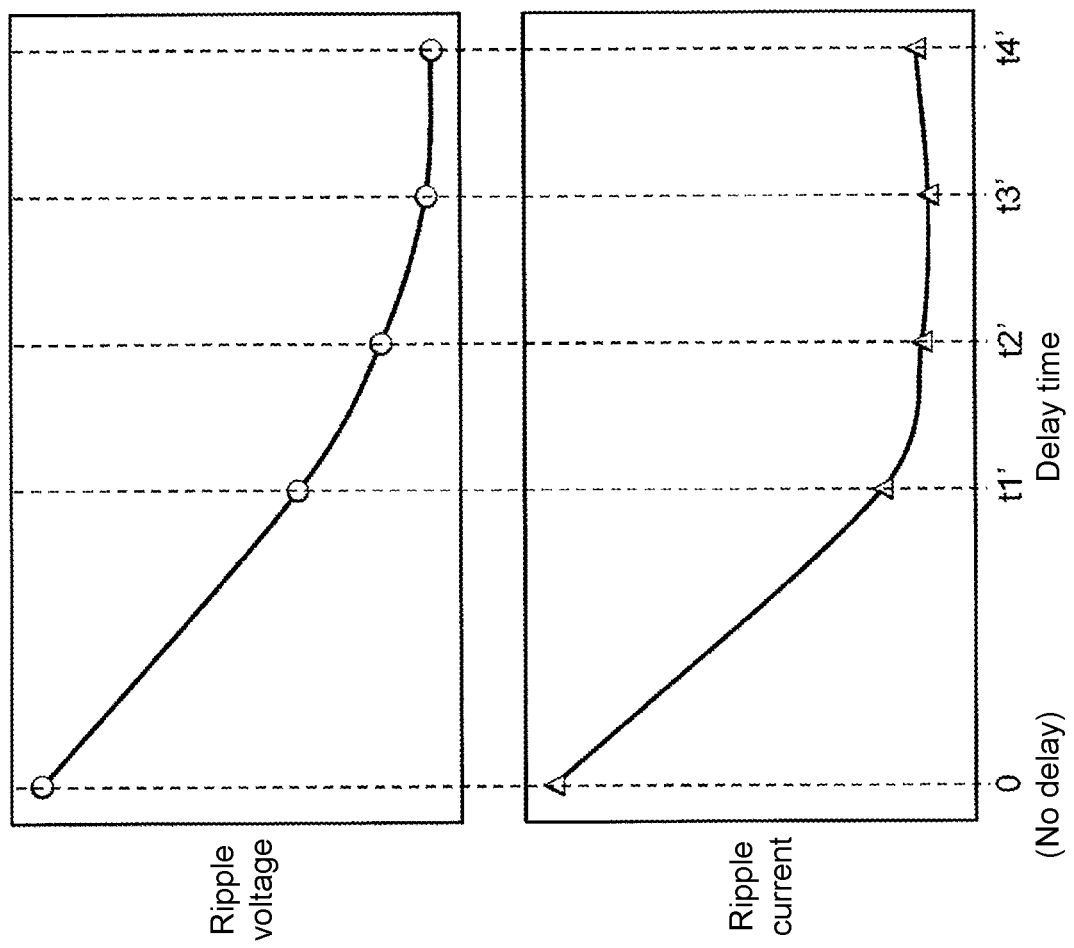
FIG. 10 is a diagram illustrating an example of dependency of a delay time of the modulation duty ratio of a ripple voltage and a ripple current.

In a verification result illustrated in FIG. 10, the time t' by which the variation in the modulation duty ratio DR is delayed with respect to the variation in the voltage of the smoothing capacitor SC was set to 0 (no delay), t1', t2', t3', and t4' (where t1'<t2'<t3'<t4'). The ripple voltage was set to a difference between the maximum value $V_{rmax}$ and the minimum value $V_{rmin}$ of the rectified output $V_{out}$. Further, the ripple current was set to a root mean square (RMS) value of currents flowing in and out of the smoothing capacitor SC.

As illustrated in FIG. 10, by delaying the variation in the modulation duty ratio DR with respect to the variation in the voltage of the smoothing capacitor SC, both the ripple voltage and the ripple current are considerably decreased more than when there is no delay. That is, by delaying the variation in the modulation duty ratio DR with respect to the variation in the voltage of the smoothing capacitor SC, a current amount flowing in and out of the smoothing capacitor SC is considerably reduced.

In addition, by delaying the variation in the modulation duty ratio DR with respect to the variation in the voltage of the smoothing capacitor SC, the ripple voltage is decreased and the rectified output $V_{out}$ of which a voltage is more stable and a ripple ratio is less is output.

Further, as illustrated in FIG. 10, the ripple voltage and the ripple current are more decreased as the length of the time t' by which the variation in the modulation duty ratio DR is delayed with respect to the variation in the voltage of the smoothing capacitor SC is larger. By decreasing the ripple current, it is possible to obtain the effect of improving reliability of the circuit by suppressing deterioration of the smoothing capacitor SC or the effect of reducing cost by using a capacitor with lower capacitance as the smoothing capacitor SC.

Figure 11:
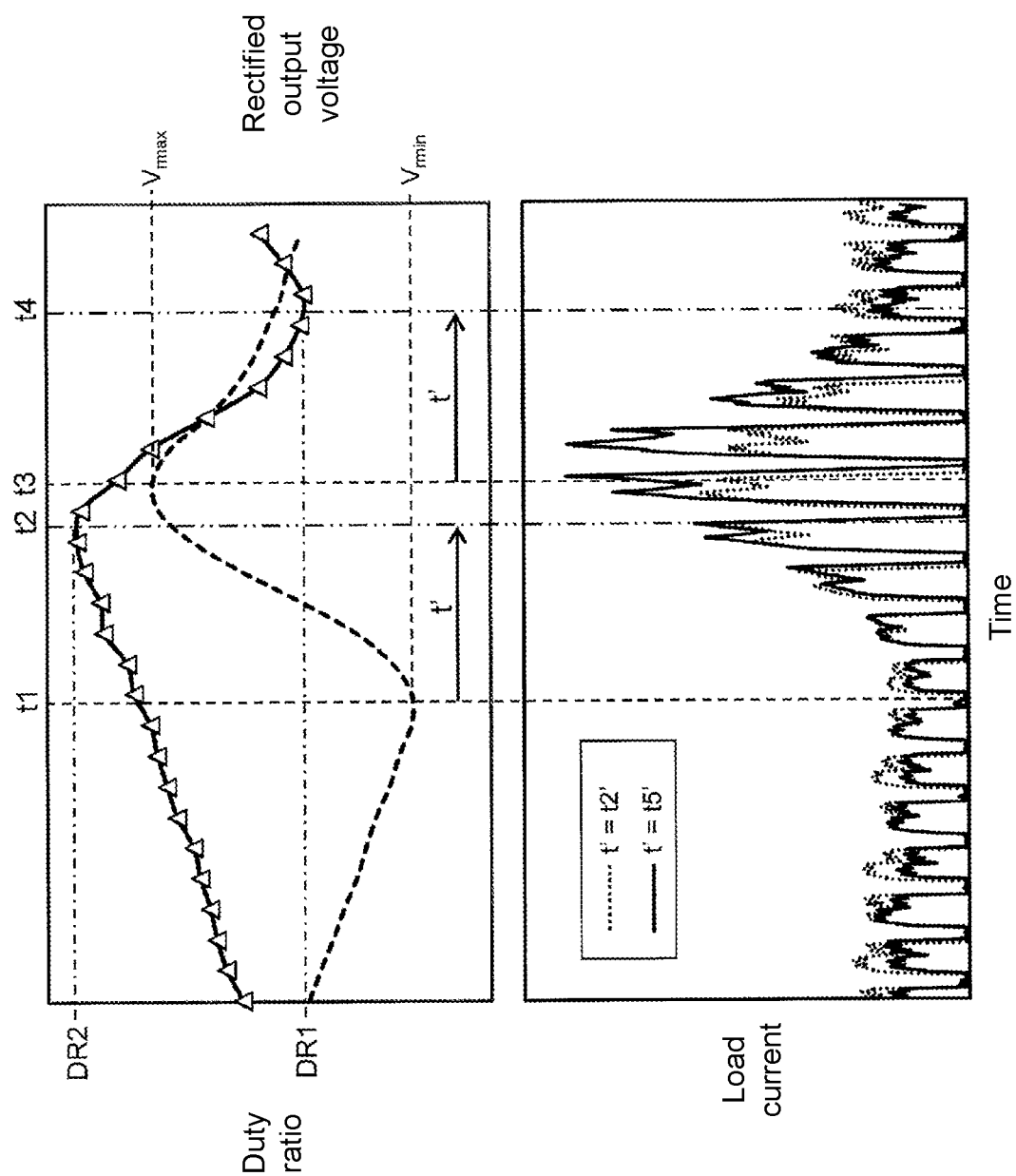
FIG. 11 is a diagram illustrating an example of a variation in the modulation duty ratio and a load current when an excessive delay time is set.

Here, it is preferable not to excessively increase the time t' by which the variation in the modulation duty ratio DR is delayed with respect to the variation in the voltage of the smoothing capacitor SC. In a result obtained by setting excessively long time t' by which the variation in the modulation duty ratio DR is delayed, for example, as illustrated in FIG. 11, the timing t2 at which the modulation duty ratio DR becomes the second duty ratio DR2 is assumed to arrive at a time near the timing t3 at which the voltage of the smoothing capacitor SC becomes the maximum value $V_{rmax}$. In the example illustrated in FIG. 11, t5' is set as the time t' by which the variation in the modulation duty ratio DR is delayed with respect to the variation in the voltage of the smoothing capacitor SC.

In the foregoing case, as illustrated in FIG. 11, a load current to the load LO indicated by a solid line in the lower drawing of FIG. 11 is excessive, in particular, in a time range in which the voltage of the smoothing capacitor SC is near the maximum value $V_{rmax}$. A plot indicated by a dotted line in the lower drawing of FIG. 11 is an absolute value of a load current when t2' is set as the time t' by which the variation in the modulation duty ratio DR is delayed with respect to the variation in the voltage of the smoothing capacitor SC.

This is because the modulation duty ratio DR increases when the voltage of the smoothing capacitor SC is near the maximum value $V_{rmax}$ in a case where the timing t2 at which the modulation duty ratio DR becomes the second duty ratio DR2 is near the timing t3 at which the voltage of the smoothing capacitor SC is the maximum $V_{rmax}$. That is, this is because a current is actively supplied to the load LO when the voltage of the rectified output $V_{out}$ is large.

When an excessive current flows in the load LO, a conduction loss in each element or the like included in the rectifier circuit 15 and the switching circuit 17 is large. As a result, energy efficiency degrades and/or the power supply device 1 overheats due to the large conduction loss. As a result, the power supply device 1 operates abnormally or breaks down.

When an excessive current flows in the load LO, for example, it is necessary to use switching elements that have large current capacity and operate at a high speed as the switching elements SW1 to SW6 of the switching circuit 17, and thus high cost of the driving device 100 may be caused.

Second Embodiment 2-1. Overview of Second Embodiment

In the foregoing first embodiment, the basic duty ratio $DR_B$ of each of the switching elements SW1 to SW3 is a constant value independent from a time other than the variation in accordance with the target rotation speed, the target power, or the like. The present invention is not limited thereto and the basic duty ratio $DR_B$ of each of the switching elements SW1 to SW3 may also vary over time other than the variation in accordance with the target rotation speed, the target power, or the like. That is, the basic duty ratio $DR_B$ may be expressed as a function of a time.

2-2. Example 1

Figure 12:
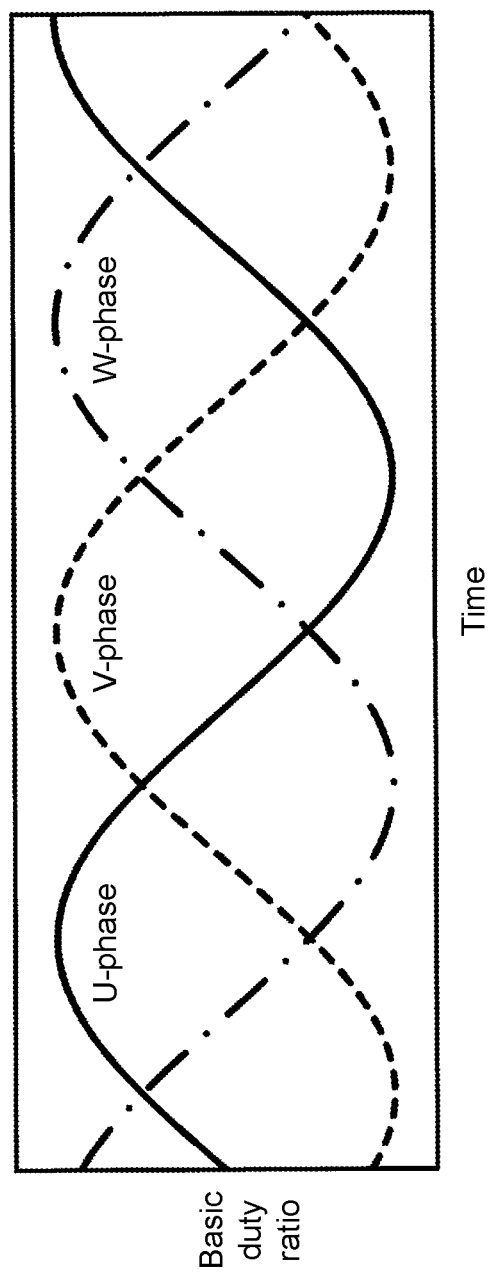
FIG. 12 is a diagram illustrating an example of a basic duty ratio set in each switching element.
Figure 13:
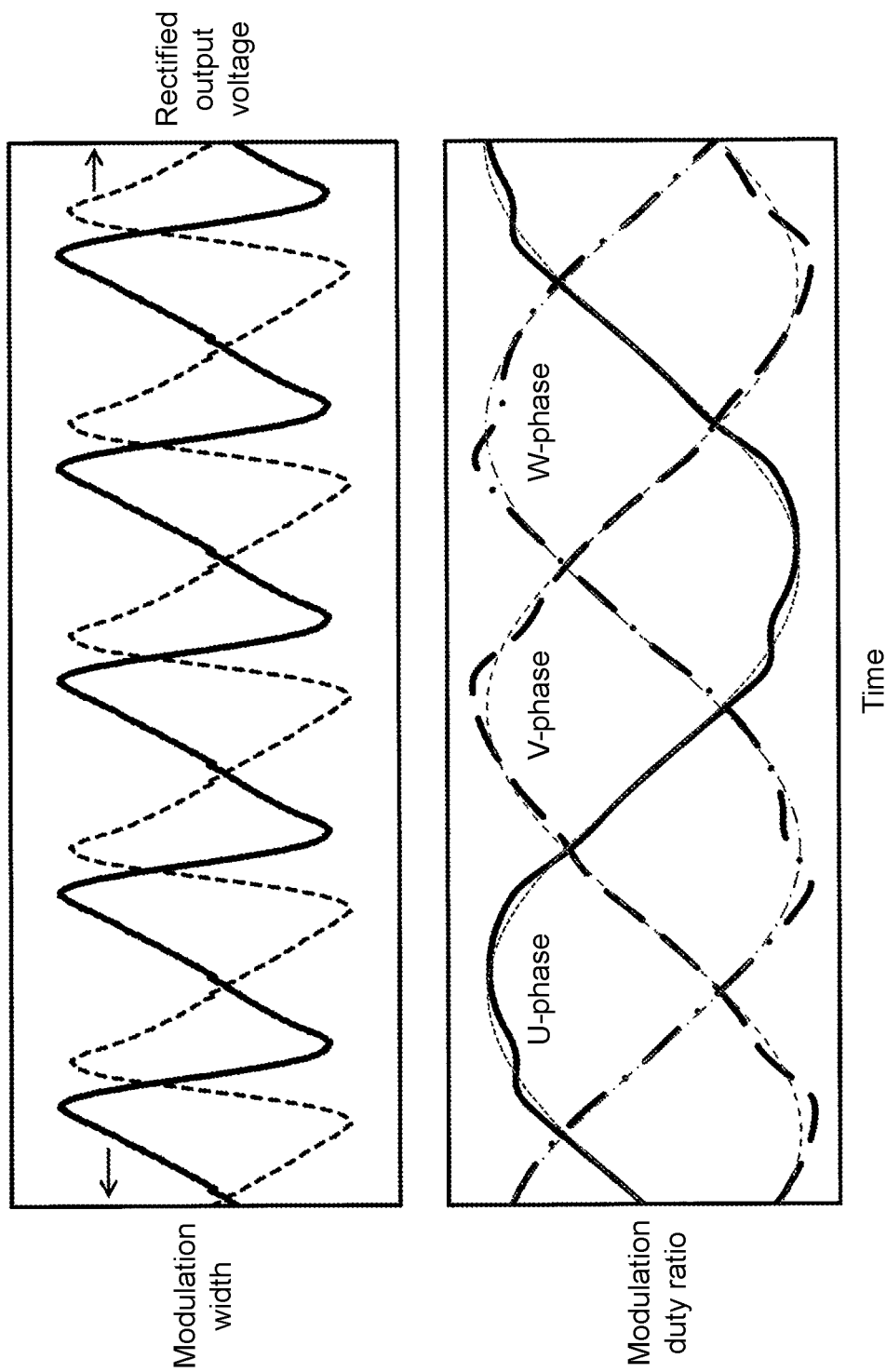
FIG. 13 is a diagram illustrating an example of a modulation duty ratio of each switching element.
Figure 14:
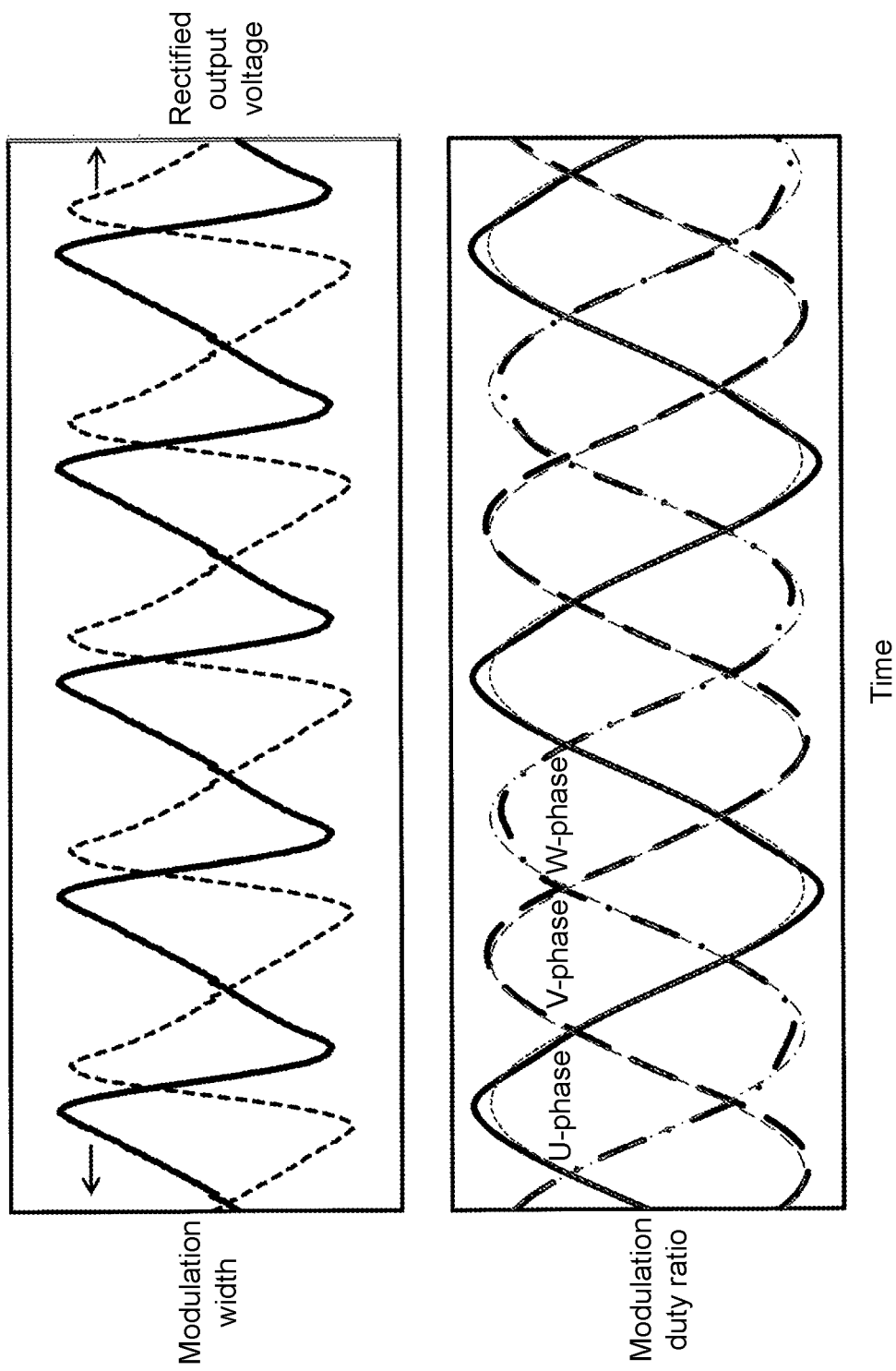
FIG. 14 is a diagram illustrating an example of a modulation duty ratio when a variation frequency of the basic duty ratio is more increased.
Figure 15:
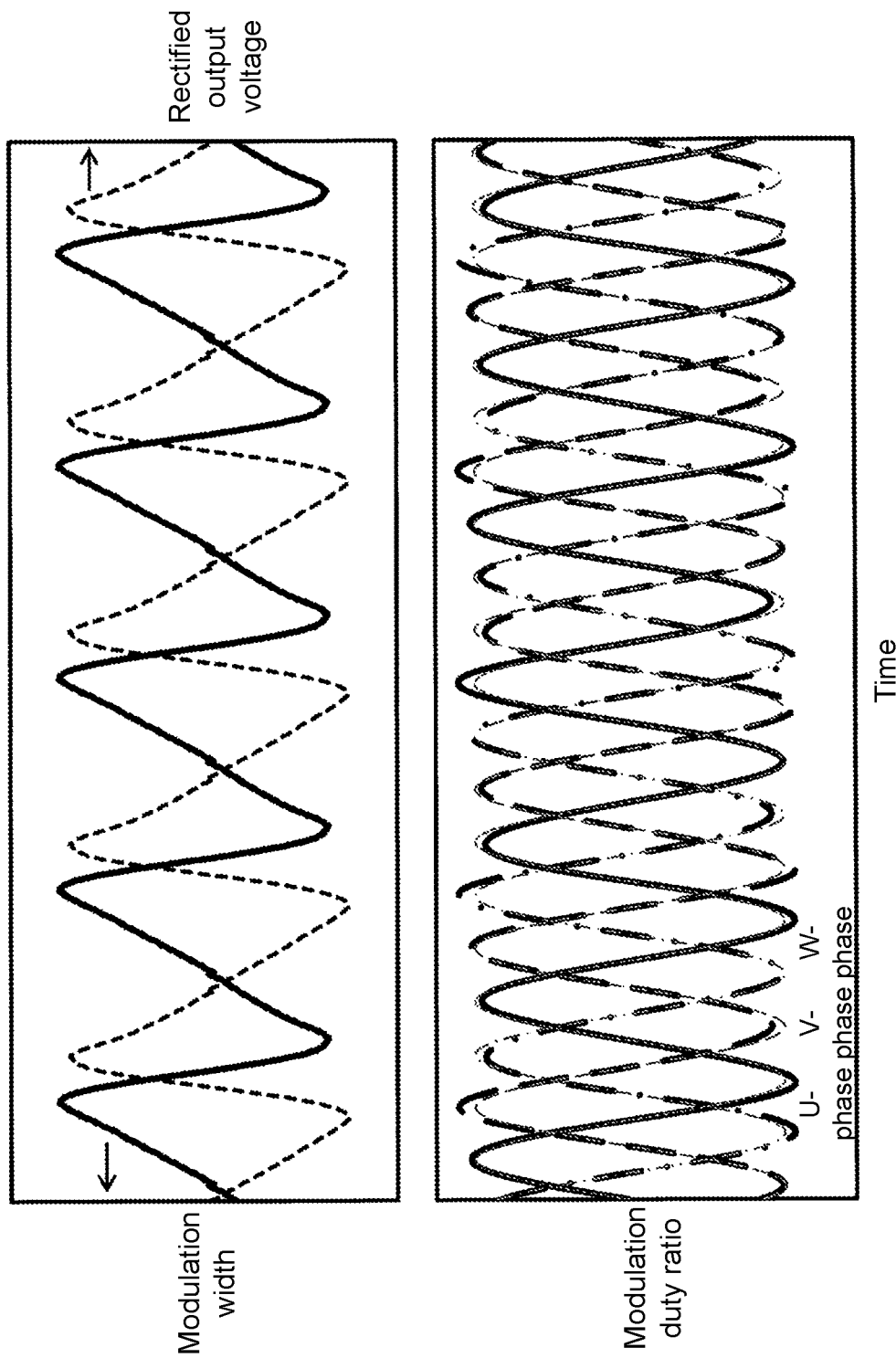
FIG. 15 is a diagram illustrating an example of a modulation duty ratio when a variation frequency of the basic duty ratio is further more increased.

Hereinafter, Example 1 in which the basic duty ratio $DR_B$ of each of the switching elements SW1 to SW6 is set as a sinusoidal waveform varying at a predetermined period with a different phase from that of the basic duty ratio $DR_B$ of the other switching elements SW1 to SW6 will be described with reference to FIG. 12 to FIG. 15. FIG. 12 is a diagram illustrating an example of a basic duty ratio set in each switching element. FIG. 13 is a diagram illustrating an example of a modulation duty ratio of each switching element. FIG. 14 is a diagram illustrating an example of a modulation duty ratio when a variation frequency of the basic duty ratio is more increased. FIG. 15 is a diagram illustrating an example of a modulation duty ratio when a variation frequency of the basic duty ratio is further more increased.

In FIG. 12 to FIG. 15, the basic duty ratio $DR_B$ and the modulation duty ratio DR indicated by a thick solid line are a U-phase duty ratio. The basic duty ratio $DR_B$ and the modulation duty ratio DR indicated by a thick dotted line are a V-phase duty ratio. The basic duty ratio $DR_B$ and the modulation duty ratio DR indicated by a thick one-dot chain line are a W-phase duty ratio. In the graphs of FIG. 12 to FIG. 15, a modulation width is indicated by a thick solid line and a value of the rectified output $V_{out}$ is indicated by a thick dotted line.

In Example 1, a high side of the switching circuit 17, that is, the duty ratios of the switching elements SW1 to SW3, varies in a sinusoidal waveform. The switching elements SW4 to SW6 on the low side vary the duty ratios complementarily with the corresponding switching elements SW1 to SW3. In the following drawings, the duty ratio of the switching element SW1 is referred to as a "U-phase", the duty ratio of the switching element SW2 is referred to as a "V-phase", and the duty ratio of the switching element SW3 is referred to as a "W-phase".

As illustrated in FIG. 12, in Example 1, when the U-phase basic duty ratio $DR_B$ varies in a sinusoidal waveform and the U-phase serves as a reference, the V-phase basic duty ratio $DR_B$ varies in a sinusoidal waveform with a phase delayed by 120 degrees and the W-phase basic duty ratio $DR_B$ varies in a sinusoidal waveform with a phase delayed by 240 degrees. That is, the basic duty ratio $DR_B$ of each phase has a mutually different phase.

Accordingly, the basic duty ratio $DR_B$ of each phase is expressed as the following expression. In the following expressions, C is an amplitude of the basic duty ratio which varies in accordance with a target rotation speed and/or target power within a range of $0 \leq C \leq 1/2$ and is a value independent from a time and the rectified output $V_{out}$. When C=0, the basic duty ratio of each phase is 1/2 together. ω is an angular velocity and is expressed as $2\pi f$ using a frequency f.

In addition, t is a time, the U-phase basic duty ratio: $1/2 + C*\sin(\omega t)$ the V-phase basic duty ratio: $1/2 + C*\sin(\omega t - 2\pi/3)$ the W-phase basic duty ratio: $1/2 + C*\sin(\omega t - 4\pi/3)$ By setting the basic duty ratio $DR_B$ varying in the sinusoidal waveform in this way, the switching circuit 17 can output a voltage and a current of the sinusoidal waveform that has a frequency determined at ω to the output unit 13.

In the embodiment, the controller 19 calculates the modulation duty ratio DR by multiplying the amplitude C of the basic duty ratio $DR_B$ of the sinusoidal waveform expressed above by the modulation width $[\{(A*V_{ave})/V(t-t')\}+(1-A)]$ varying in accordance with the voltage measurement value of the smoothing capacitor SC, as described in the first embodiment. Accordingly, in Example 1, the modulation duty ratio DR of each phase is expressed as follows:

the U-phase modulation duty ratio: $1/2+[\{(A*V_{ave})/V(t-t')\}+(1-A)]*\{C*\sin(\omega t)\}$ the V-phase modulation duty ratio: $1/2+[\{(A*V_{ave})/V(t-t')\}+(1-A)]*\{C*\sin(\omega t-2\pi/3)\}$ the W-phase modulation duty ratio: $1/2+[\{(A*V_{ave})/V(t-t')\}+(1-A)]*\{C*\sin(\omega t-4\pi/3)\}$ For the modulation duty ratio DR of each phase expressed above, a considerable variation is not seen in the period of the variation, as illustrated in FIG. 13. On the other hand, in the modulation duty ratio DR, the amplitude of the sinusoidal waveform included in the basic duty ratio $DR_B$ is modulated by $C*[\{(A*V_{ave})/V(t-t')\}+(1-A)]$. Therefore, the waveform of the modulation duty ratio DR has a waveform slightly distorted from the sinusoidal waveform. Here, the modulation width of the amplitude of the sinusoidal waveform of the modulation duty ratio DR becomes the largest within a period until the rectified output $V_{out}$ becomes a maximum as in the first embodiment.

The method of setting the modulation duty ratio DR can be applied even when the frequency of the basic duty ratio $DR_B$ is different from the case illustrated in FIG. 11. Specifically, as illustrated in FIG. 14 and FIG. 15, even when the angular velocity ω of the basic duty ratio $DR_B$ is set to be large, the modulation width of the amplitude of the sinusoidal waveform portion of the modulation duty ratio DR of each phase is the largest within a period until the rectified output $V_{out}$ becomes a maximum as in the modulation duty ratio DR of the first embodiment. That is, the modulation duty ratio DR can be appropriately set for any angular velocity ω of the basic duty ratio $DR_B$, that is, any frequency.

Further, the modulation of the basic duty ratio $DR_B$ can also be applied similarly to the basic duty ratio $DR_B$ with any shape other than a sinusoidal waveform varying at a predetermined period, for example, a trapezoidal basic duty ratio.

2-3. Example 2

Figure 16:
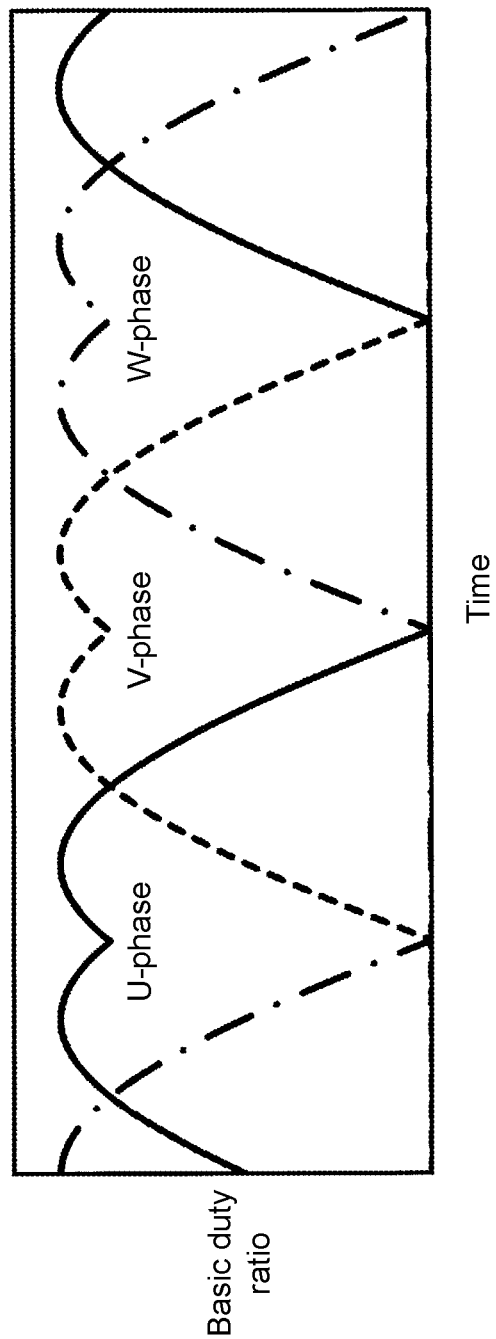
FIG. 16 is a diagram illustrating another example of the basic duty ratio set in each switching element.
Figure 17:
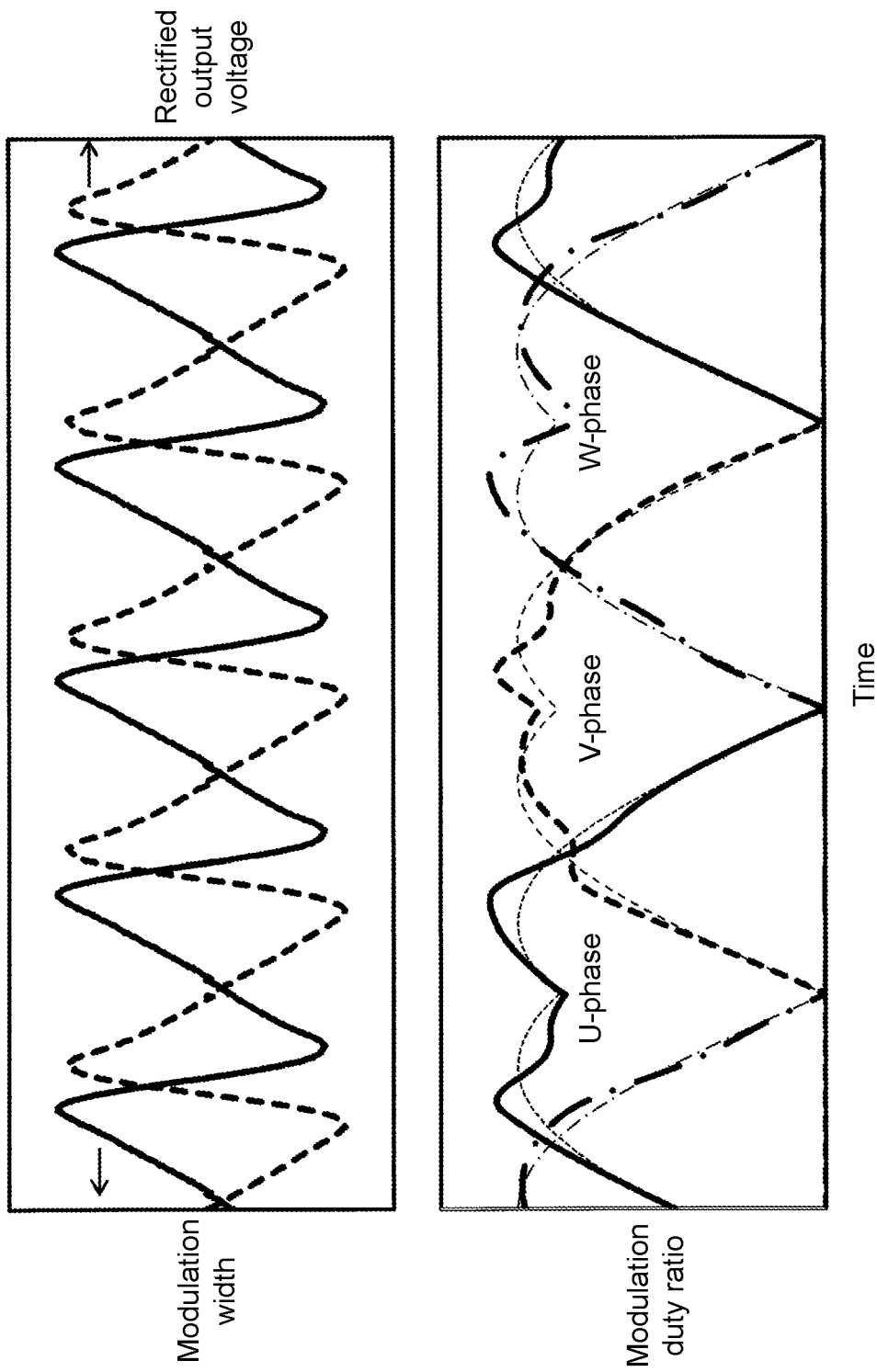
FIG. 17 is a diagram illustrating other examples of a modulation width of a modulation duty ratio and the modulation duty ratio of each switching element.
Figure 18:
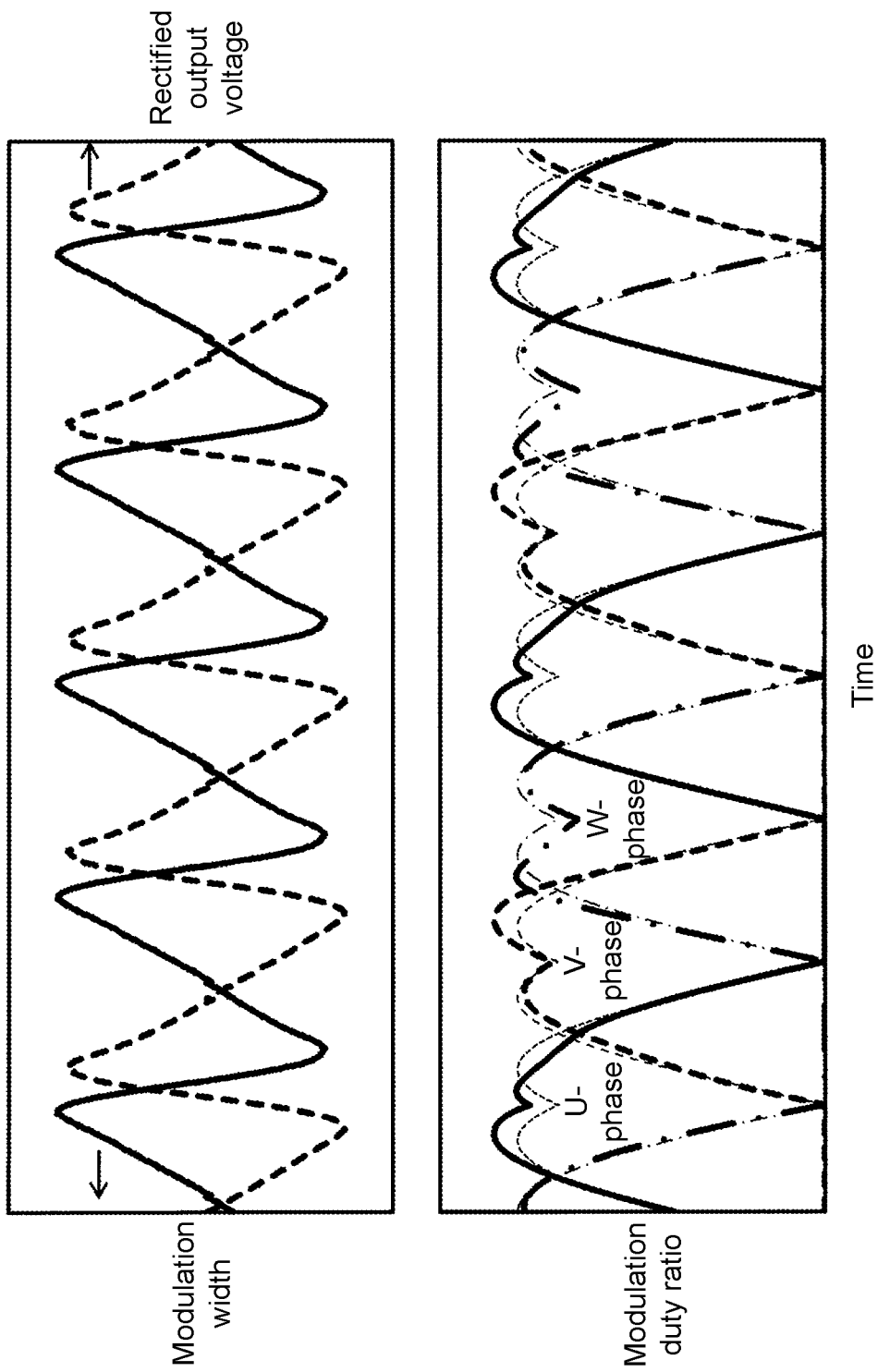
FIG. 18 is a diagram illustrating a modulation width of the modulation duty ratio and another example of the modulation duty ratio when the variation frequency of the basic duty ratio is more increased.
Figure 19:
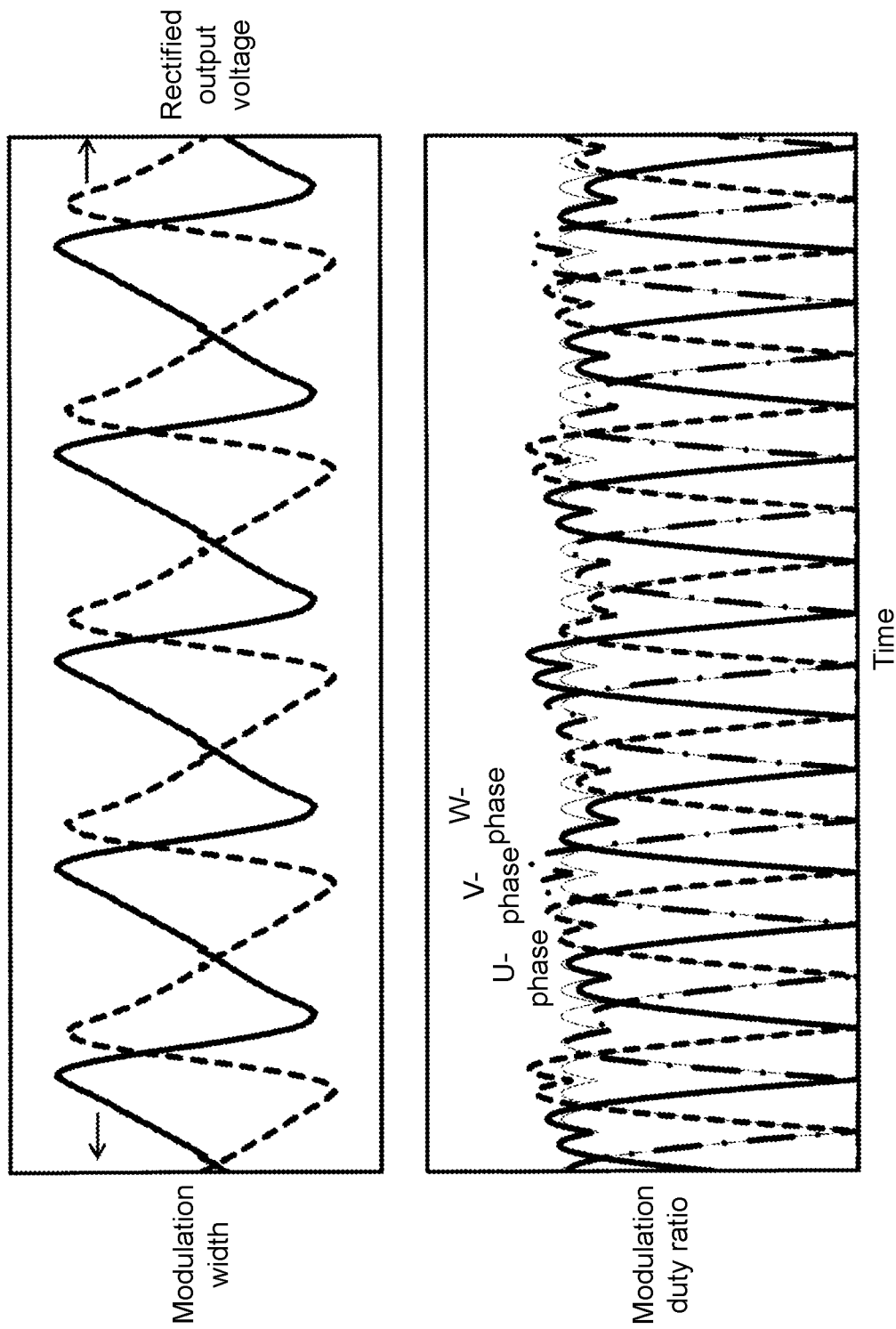
FIG. 19 is a diagram illustrating a modulation width of the modulation duty ratio and another example of the modulation duty ratio when the variation frequency of the basic duty ratio is further more increased.

Hereinafter, Example 2 in a case in which the basic duty ratio $DR_B$ of each of the switching elements SW1 to SW6 is modulated by a two-phase modulation scheme will be described with reference to FIG. 16 to FIG. 19. FIG. 16 is a diagram illustrating another example of the basic duty ratio set in each switching element. FIG. 17 is a diagram illustrating a modulation width of a modulation duty ratio and another example of the modulation duty ratio of each switching element. FIG. 18 is a diagram illustrating a modulation width of the modulation duty ratio and another example of the modulation duty ratio when the variation frequency of the basic duty ratio is more increased. FIG. 19 is a diagram illustrating a modulation width of the modulation duty ratio and another example of the modulation duty ratio when the variation frequency of the basic duty ratio is further more increased.

In FIG. 16 to FIG. 19, the basic duty ratio $DR_B$ and the modulation duty ratio DR indicated by a thick solid line are a U-phase duty ratio. The basic duty ratio $DR_B$ and the modulation duty ratio DR indicated by a thick dotted line are a V-phase duty ratio. The basic duty ratio $DR_B$ and the modulation duty ratio DR indicated by a thick one-dot chain line are a W-phase duty ratio. In the graphs of FIG. 17 to FIG. 19, a modulation width is indicated by a thick solid line and a value of the rectified output $V_{out}$ is indicated by a thick dotted line.

The two-phase modulation scheme is a modulation scheme of a duty ratio in which two switching elements SW1 and SW2 are subjected to the PWM modulation among three switching elements SW1 to SW3 and the remaining one of the switching elements SW1 to SW3 is in the OFF-state. The two-phase modulation scheme has the advantage of decreasing a switching damage compared to Example 1 since a period in which one of the switching elements SW1 to SW3 is in the OFF-state is provided.

A temporal variation of the basic duty ratio $DR_B$ set at each phase is illustrated in FIG. 16. The basic duty ratio $DR_B$ is expressed as the following expression. The following expression represents the U-phase basic duty ratio $DR_B$. The V-phase and W-phase basic duty ratios $DR_B$ delay the U-phase basic duty ratio $DR_B$ by 120 degrees and 240 degrees, respectively.

In the following expressions, D is an amplitude of the basic duty ratio which varies in accordance with a target rotation speed, target power, or the like and is a value independent from a time and the rectified output $V_{out}$. ω is an angular velocity. In addition, n is an integer. In addition, t is a time, (i) $D*\sin(\omega t)(2\pi n \leq \omega t < 2\pi n + 2\pi/3)$
(ii) $D*\sin(\omega t-\pi/3)(2\pi n+2\pi/3 \leq \omega t < 2\pi n+4\pi/3)$
(iii) $0(2\pi n+4\pi/3 \leq \omega t < 2\pi(n+1))$ In the embodiment, the controller 19 calculates the modulation duty ratio DR by multiplying the amplitude D of the foregoing basic duty ratio $DR_B$ by the modulation width $[\{(A*V_{ave})/V(t-t')\}+(1-A)]$ varying in accordance with the voltage measurement value of the smoothing capacitor SC, as described in the first embodiment. The modulation duty ratio DR of each phase calculated in this way varies in accordance with the foregoing variation width as in Example 1 described above, as illustrated in FIG. 17 to FIG. 19.

As illustrated in FIG. 17 to FIG. 19, the method of setting the modulation duty ratio DR of the embodiment can be applied to any frequency of the basic duty ratio $DR_B$, as in Example 1 described above, even when the basic duty ratio $DR_B$ modulated by the two-phase modulation scheme is used.

Even when the basic duty ratio $DR_B$ is arbitrarily varied as a function of a time, as described above in Examples 1 and 2, by further lengthening a state in which the input impedance viewed from the smoothing capacitor SC is low within a period from a time at which an input current input to the smoothing capacitor is generated to a time at which the voltage of the smoothing capacitor SC becomes a maximum, that is, within a period in which the smoothing capacitor SC is charged, it is possible to reduce a current amount flowing in the smoothing capacitor SC and suppress deterioration of the smoothing capacitor SC.

Third Embodiment

3-1. Overview of Third Embodiment

In the foregoing first embodiment, a current amount flowing in and out of the smoothing capacitor SC is reduced by setting a duty ratio which is a ratio to the switching period $T_{sw}$ during a time in which the switching circuit 17 is in the ON-state to a large set value within the charging period of the smoothing capacitor SC, that is, within the period in which the voltage of the smoothing capacitor SC increases from the minimum value $V_{rmin}$ to the maximum value $V_{rmax}$, and by supplying power to the load LO actively within the charging period of the smoothing capacitor SC.

When a brushless motor such as the three-phase brushless motor M is particularly used as the load LO, so-called advance angle control in which a start timing of the power supply period $T_{ps}$ which is a period in which power is supplied to the load LO is adjusted for efficient driving of the motor is performed.

In the advance angle control, a phase of a current flowing in a stator which is an electromagnet is adjusted with respect to rotation of a rotor of a brushless motor. The phase of the current flowing in the electromagnet of the stator is delayed with respect to the phase of the voltage applied to a coil of the stator mainly by an inductance component that the coil of the stator has. The delay is considerable particularly when a current flowing in the coil of the stator is increased and/or a period of the current is shortened in order to rotate the rotor at a high speed.

Therefore, as illustrated in FIG. 6, even when a voltage is applied to the U-phase, the V-phase, and the W-phase of the three-phase brushless motor M at a timing at which the rotor is detected in a rotor detection element, a timing at which a current starts to flow in the U-phase, the V-phase, and the W-phase is later than a timing at which the rotor is detected in the rotor detection element. Thus, a phase of a rotating magnetic field from the stator generated by the current flowing in the U-phase, the V-phase, and the W-phase is not an optimum phase for rotation of the rotor. As a result, for example, a rotation torque of the rotor is lowered, and thus the rotor may not be rotated efficiently.

Figure 20:
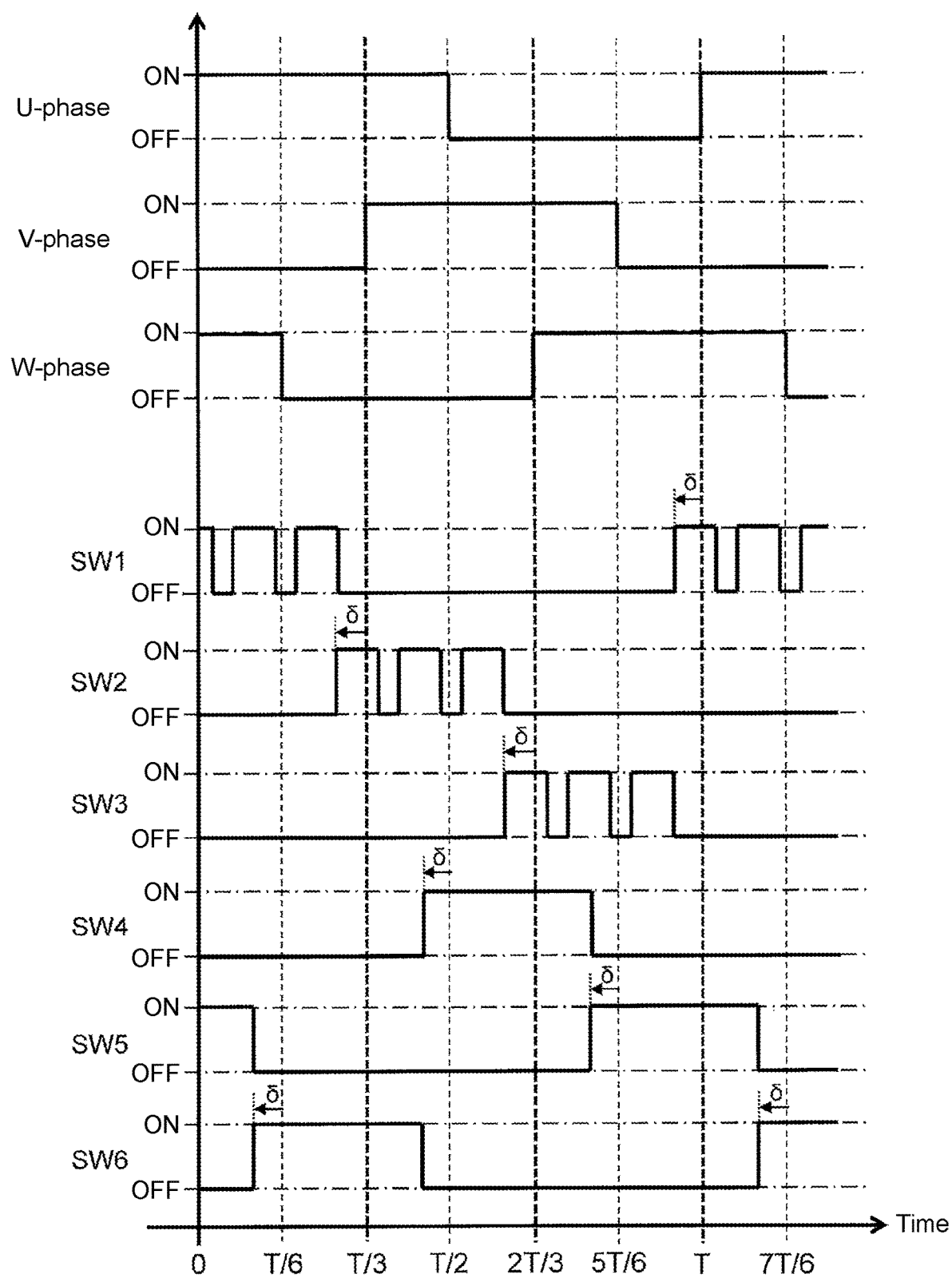
FIG. 20 is a diagram illustrating an example of a time chart schematically illustrating advance angle modulation.

Accordingly, in the third embodiment, a start timing of the power supply period $T_{ps}$, that is, a timing at which an output of the voltage of the rectified output $V_{out}$ starts, is set to be earlier than a timing at which the rotor is detected by a rotor detection element, as illustrated in FIG. 20. Thus, it is possible to start supplying a current to a coil of a stator at a timing at which the rotor is detected by the rotor detection element or a timing close to the detected timing.

Hereinafter, a magnitude when a start timing of the power supply period $T_{ps}$ is advanced temporally before is referred to as an "advance angle $\delta$". The advance angle $\delta$ that is 0 is assumed to mean that the start timing of the power supply period $T_{ps}$ is identical with a timing at which the rotor is detected by the rotor detection element.

In the third embodiment, further, to actively supply power to the three-phase brushless motor M which is the load LO within the charging period of the smoothing capacitor SC, that is, within the period in which the voltage of the smoothing capacitor SC increases from the minimum value $V_{rmin}$ to the maximum value $V_{rmax}$, a start timing of the power supply period $T_{ps}$ is set to a timing earlier than a timing adjusted to efficiently rotate rotor within the period. That is, the advance angle $\delta$ within the period is set to be greater than the advance angle $\delta$ for efficiently rotating the rotor.

For example, when a rotation speed of the rotor is not large and a phase of a current of the coil of the stator is not considerably delayed from a phase of an application voltage despite the advance angle $\delta$ of 0 and/or there is no considerable influence on rotation efficiency of the rotor despite deviation of the phase of the current of the coil of the stator from the phase of the application voltage, the advance angle $\delta$ may be 0.

In the third embodiment, only a method of actively supplying power (a current) to the load LO within the charging period of the smoothing capacitor SC differs from that of the first embodiment, and the configuration of the driving device 100, a function of each constituent element, and the like are the same as those of the driving device 100 according to the first embodiment.

Accordingly, hereinafter, only a control method for the driving device 100 according to the third embodiment will be described and description of the configuration and the like of the driving device 100 will be omitted.

3-2. Control Method for Driving Device According to Third Embodiment

Figure 21:
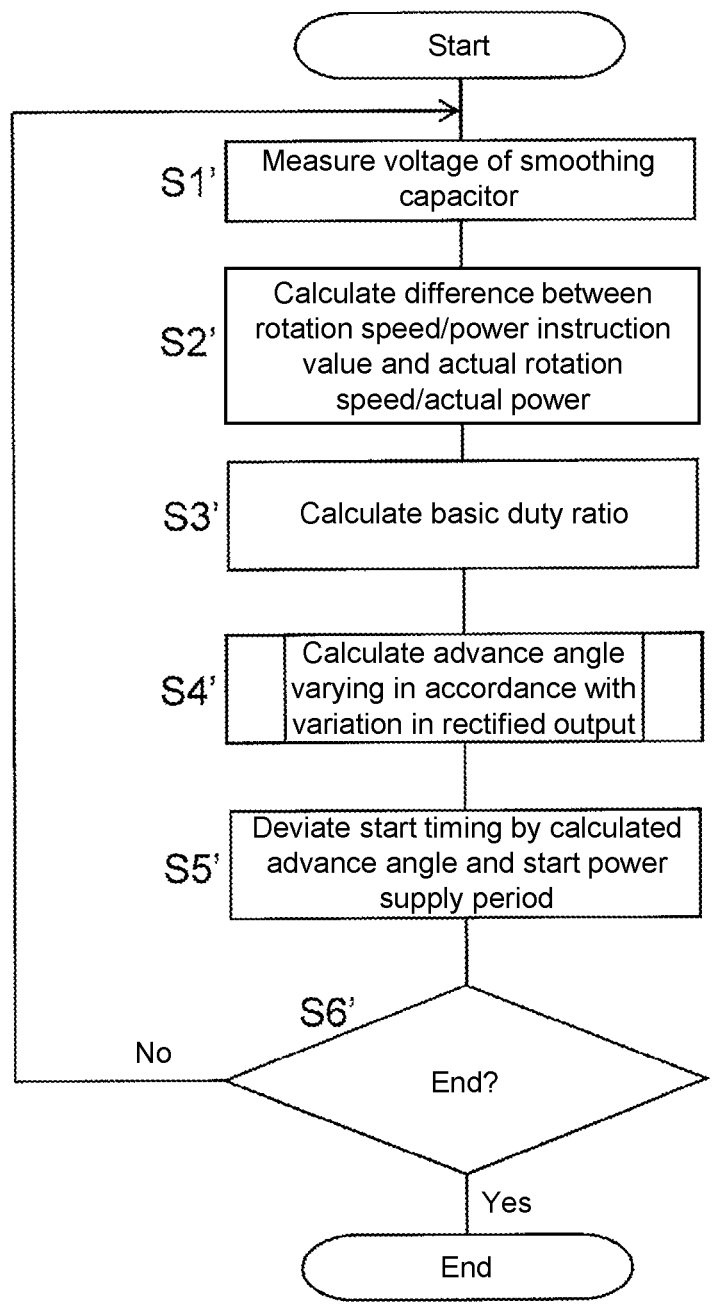
FIG. 21 is a flowchart illustrating a control method for a driving device according to a third embodiment.

Hereinafter, a control method for the driving device 100 according to a third embodiment will be described with reference to FIG. 21. FIG. 21 is a flowchart illustrating the control method for the driving device according to the third embodiment.

When the driving device 100 starts controlling the three-phase brushless motor M, the controller 19 measures a current voltage of the smoothing capacitor SC from the measurement unit 191 (step S1').

Subsequently, the controller 19 calculates a difference between an instruction value of the rotation speed of the three-phase brushless motor M set in the controller 19 or in an external device by a user and a current actual rotation speed of the rotor of the three-phase brushless motor M (step S2'). The instruction value of the rotation speed of the three-phase brushless motor M is referred to as a target rotation speed.

After the controller 19 calculates the difference between the target rotation speed and the actual rotation speed of the rotor, the controller 19 calculates a basic duty ratio $DR_B$ based on the difference (step S3').

For example, when the target rotation speed is greater than the actual rotation speed of the rotor, the controller 19 increases the currently set basic duty ratio $DR_B$ and calculates a new basic duty ratio $DR_B$. Conversely, when the target rotation speed is less than the actual rotation speed of the rotor, the controller 19 decreases the currently set basic duty ratio $DR_B$ and calculates a new basic duty ratio $DR_B$.

In step S2' described above, the user may set the target power. In this case, the controller 19 may calculate the difference between the target power and an actually measured value of the power actually input to the three-phase brushless motor M.

In this case, in step S3' described above, when the target power is greater than the power actually input to the three-phase brushless motor M, the controller 19 calculates the new basic duty ratio $DR_B$ by increasing the currently set basic duty ratio $DR_B$. Conversely, when the target power is less than the power actually input to the three-phase brushless motor M, the controller 19 calculates the new basic duty ratio $DR_B$ by decreasing the currently set basic duty ratio $DR_B$.

After the basic duty ratio $DR_B$ is calculated, the controller 19 calculates the advance angle $\delta$ varying in accordance with the variation in the voltage of the smoothing capacitor SC (step S4'). In the embodiment, specifically, for example, the advance angle $\delta$ is calculated in accordance with the flowchart illustrated in FIG. 22.

First, the controller 19 calculates an advance angle for rotating the rotor of the three-phase brushless motor M efficiently (step S41'). The advance angle for rotating the rotor of the three-phase brushless motor M efficiently is referred to as a basic advance angle $\delta_b$.

Specifically, for example, the basic advance angle $\delta_b$ is calculated based on an actually measured value of a rotation speed of the rotor measured when the basic duty ratio $DR_B$ is calculated.

More specifically, for example, with reference to a table in which the rotation speed of the rotor is associated with an basic advance angle $\delta_b$ optimum for the rotation speed of the rotor, the controller 19 can calculate the basic advance angle $\delta_b$ based on an actually measured value of a rotation speed of the rotor by searching for the basic advance angle $\delta_b$ with which the actually measured value of the rotation speed of the rotor is associated in the table.

Additionally, for example, the controller 19 can also calculate the basic advance angle $\delta_b$ based on the actually measured value of the rotation speed of the rotor by substituting the actually measured value of the rotation speed of the rotor into an expression in which the basic advance angle $\delta_b$ is represented as a function of the rotation speed of the rotor.

Subsequently, the controller 19 determines whether the newly calculated basic advance angle $\delta_b$ is corrected when the advance angle $\delta$ to be currently set is calculated. Specifically, the controller 19 reads a previous voltage measurement value of the smoothing capacitor SC a predetermined time before from the storage region and determines whether the voltage measurement value is less than the average voltage $V_{ave}$ of the voltage of the smoothing capacitor SC (step S42').

When the previous voltage measurement voltage of the smoothing capacitor SC the predetermined time before is equal to or greater than the average voltage $V_{ave}$ of the voltage of the smoothing capacitor SC ("No" in step S42'), the controller 19 sets the basic advance angle $\delta_b$ calculated in step S41' to the advance angle $\delta$ to be currently set (step S43').

Conversely, when the previous voltage measurement value of the smoothing capacitor SC the predetermined time before is less than the average voltage $V_{ave}$ of the voltage of the smoothing capacitor SC ("Yes" in step S42'), the controller 19 corrects the basic advance angle $\delta_b$ calculated in step S41' based on a reciprocal of the previous voltage measurement value of the smoothing capacitor SC before the predetermined time and sets the corrected basic advance angle to the advance angle $\delta$ to be currently set (step S44').

Specifically, for example, the controller 19 calculates the advance angle $\delta$ ($\delta(t)$) to be currently set using the following expression:

$$\delta(t)=\delta_b(t)*\{B*V_{ave}/V(t-t')-E\}$$

(B and E: a positive constant (where B≥E+1), $V_{ave}$: an average value of voltages of the smoothing capacitor SC (voltages of the rectified output $V_{out}$), V(t−t'): the voltage measurement value of the smoothing capacitor SC time t' previously, and $\delta_b(t)$: a basic advance angle at time t).

The values of the positive constant B and E can be appropriately determined in accordance with the magnitude or the like of the ripple voltage included in the rectified output $V_{out}$ when the foregoing condition, for example, B≥E+1, is satisfied.

For example, the previous voltage measurement value of the smoothing capacitor SC used in the foregoing expression may be a voltage measurement value previous by a predetermined number from the current voltage measurement value among the voltage measurement values stored in the storage region when the voltage measurement value is measured for each of predetermined times.

After the advance angle $\delta$ to be set in this way is calculated, the controller 19 determines the start timing of the power supply period $T_{ps}$ based on the calculated advance angle $\delta$ and starts the power supply period $T_{ps}$ at the determined start timing (step S5').

When the power supply period $T_{ps}$ starts, the controller 19 first calculates times of the ON-state and the OFF-state of a switching operation performed within the power supply period $T_{ps}$ based on the basic duty ratio $DR_B$ calculated in steps S1' to S3' described above.

For example, the controller 19 can calculate a time in which the switching circuit 17 is in the ON-state as $T_{sw}*DR_B$ using the switching period $T_{sw}$ and calculate a time in which the switching circuit 17 is in the OFF-state as $T_{sw}*(1-DR_B)$.

Subsequently, the controller 19 specifically determines a temporal timing at which the power supply period $T_{ps}$ starts based on the calculated advance angle $\delta$. Specifically, for example, the specific timing can be calculated as follows. In the following description, the controller 19 counts a time from a timing at which an output of the rotor detection element of a certain phase rises or falls and the detection result is changed to a timing at which the output of the rotor detection element of another phase rises or falls and the detection result is changed.

As illustrated in FIG. 20, a shortest time from a timing at which the detection result of the rotor detection element of a certain phase is changed to a timing at which the detection result of the rotor detection element of another phase is changed is constant at T/6. This means that the phase of the rotor is changed by a constant $\pi/3$ from the change in the detection result of the rotor detection element of a certain phase to the change in the detection result of the rotor detection element of another phase. Here, a time at which the phase of the rotor is changed by $\pi/3$ is defined as $T_a$.

Accordingly, for example, when the start timing of the power supply period $T_{ps}$ of the switching element SW1 is determined, the controller 19 starts counting the time after the signal of the rotor detection element of the V-phase is turned off, and starts the power supply period $T_{ps}$ of the switching element SW1 at a timing at which the time is counted as $\{1-\delta/(\pi/3)\}*T_a$.

That is, the controller 19 starts the power supply period $T_{ps}$ of the switching element SW1 at a timing the phase of the rotor is changed by $\pi/3-\delta$ after the signal of the rotor detection element of the V-phase is turned off.

At the start timing of the power supply period $T_{ps}$ of another phase, the calculation can also be performed in this way.

The time $T_a$ at which the phase of the rotor is changed by $\pi/3$ is changed in accordance with the rotation speed of the rotor. Accordingly, when the start timing of the power supply period $T_{ps}$ of the switching element SW1 is determined, the controller 19 counts a time from a time at which the signal of the rotor detection element of the W-phase is turned on to a time at which the signal of the rotor detection element of the V-phase is turned off as the time $T_a$ in advance, for example, immediately before the start timing is determined.

Conversely, the controller 19 can calculate an angular velocity of the rotor as $(\pi/3)/T_a=\pi/(3T_a)$ by counting the shortest time $T_a$ from a timing at which a detection of the rotor detection element of a certain phase to a timing at which the detection result of the rotor detection element of another phase.

Thereafter, the controller 19 repeatedly performs starting power supply period $T_{ps}$ at the start timing determined in this way in any one of the switching elements SW1 to SW3, outputting the ON-signal for turning on the switching circuit 17 by $T_{sw}*DR_B$ at the switching period $T_{sw}$ during the power supply period $T_{ps}$, and outputting the OFF-signal for turning off the switching circuit 17 by $T_{sw}*(1-DR_B)$.

By performing step S5' described above, the controller 19 can start switching between the ON-state and the OFF-state of the switching circuit 17 at the set start timing and continue the switching during the power supply period.

For example, the controller 19 receives an instruction to stop an operation of the driving device 100 or detects abnormality of the driving device 100 and repeatedly performs steps S1' to S5' as long as it is determined that the control of the driving device 100 does not end (as long as "No" in step S6'). That is, the control of the driving device 100 continues.

Conversely, when it is determined that the control of the driving device 100 ends (the case of "Yes" in step S6'), the controller 19 stops the control of the driving device 100.

Figure 23:
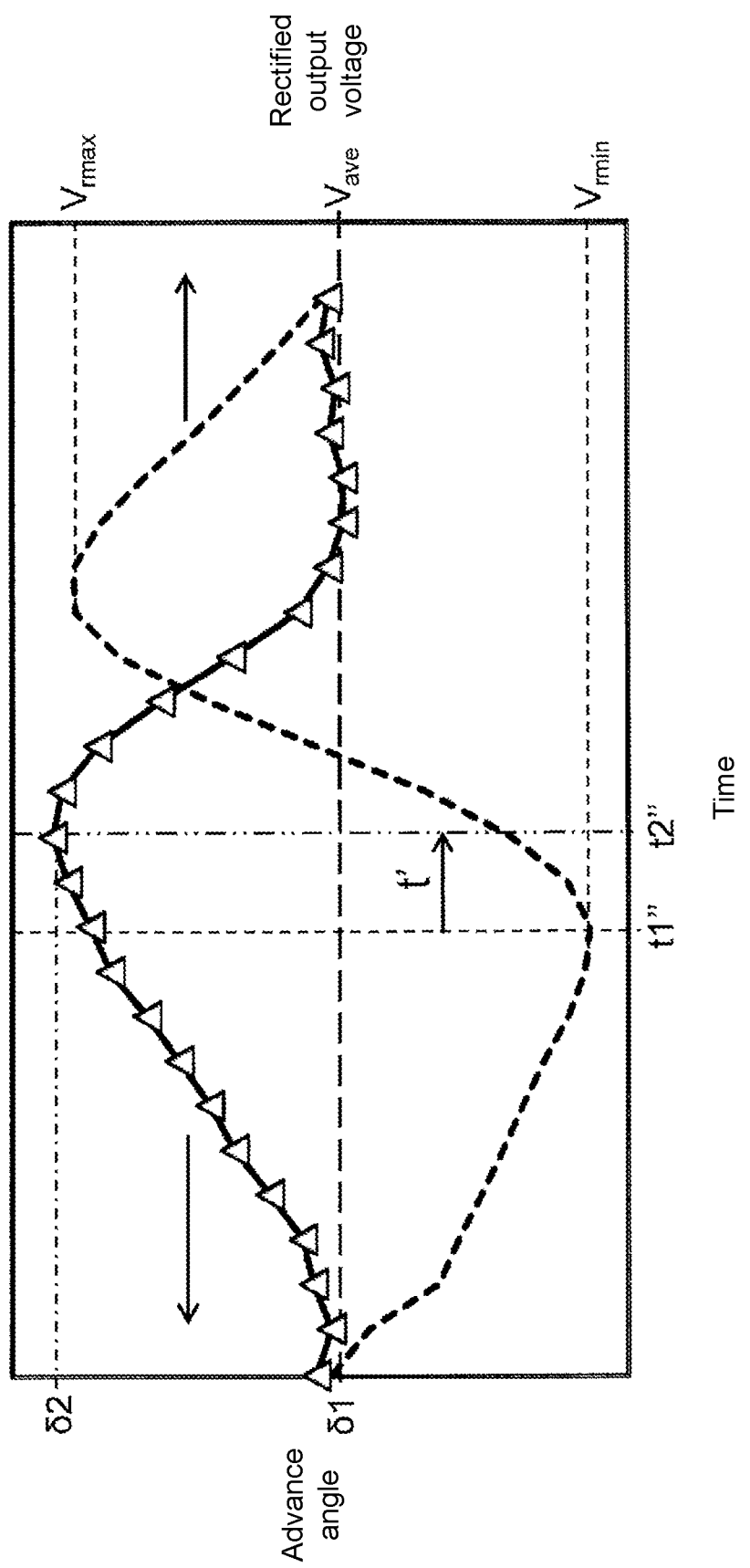
FIG. 23 is a diagram illustrating an example of a variation in the advance angle set in the driving device.

By repeatedly performing step S1' to S6' described above, the advance angle δ set in the controller 19 varies, for example, as illustrated in FIG. 23. In FIG. 23, the rectified output $V_{out}$ is indicated by a dotted line. On the other hand, the advance angle δ set at each time is indicated by white triangles and a solid line.

As illustrated in FIG. 23, the advance angle δ calculated in this way varies periodically between a first advance angle δ1 (an example of a first timing) and a second advance angle δ2 (an example of a second timing) greater than the first advance angle δ1 to correspond to a periodic voltage variation of the rectified output $V_{out}$. Here, the first advance angle δ1 is the same as the basic advance angle $δ_b$.

The second advance angle δ2 may be a maximum value of an advance angle which can be set in the driving device 100.

Here, a direction of a variation in the advance angle δ is opposite to that of a variation in the voltage of the rectified output $V_{out}$. This is because the advance angle δ is calculated based on a reciprocal of the voltage measurement value of the smoothing capacitor SC in the embodiment.

Additionally, a periodic variation in the advance angle δ deviates by a predetermined time from a periodic variation of the rectified output $V_{out}$. Specifically, a timing t2" at which the advance angle δ becomes the second advance angle δ2 is delayed by a time t' from a timing t1" at which the rectified output $V_{out}$ becomes a minimum value $V_{rmin}$ in FIG. 23.

A delay width of the variation in the advance angle δ with respect to the variation in the rectified output $V_{out}$ can be determined in accordance with, for example, V(t−t') in the foregoing expression for calculating the advance angle δ. That is, the delay width can be determined in accordance with a certain previous voltage measurement value used among the voltage measurement values of the smoothing capacitor SC (voltages of the rectified output $V_{out}$).

As in the first embodiment, the controller 19 may determine the time t' which is a specific deviation width between the variation in the advance angle δ and the variation in the rectified output $V_{out}$ based on an AC period of the AC input $V_{in}$. Thus, even when the AC period of the AC input $V_{in}$ is changed, it is possible to maintain an optimum value of the deviation of the variation of the advance angle δ with respect to the variation in the rectified output $V_{out}$.

Further, as illustrated in FIG. 23, a timing at which the advance angle δ calculated in this way becomes the second advance angle δ2 is included in a period in which the voltage of the rectified output $V_{out}$ increases from the minimum value $V_{rmin}$ to the maximum value $V_{rmax}$.

Thus, during the charging period of the smoothing capacitor SC, the start timing of the power supply period $T_{ps}$ can be advanced from a timing at which the rotation angle of the rotor becomes a predetermined angle, and more power and current can be supplied from the rectifier circuit 15 to the three-phase brushless motor M.

On the other hand, in a period other than the period in which the voltage of the rectified output $V_{out}$ increases from the minimum value $V_{rmin}$ to the maximum value $V_{rmax}$, the advance angle δ is almost constant as the first advance angle δ1, that is, the basic advance angle $δ_b$. Thus, during a discharging period of the smoothing capacitor SC, it is possible to reduce a discharge amount of the smoothing capacitor SC while maintaining high rotation efficiency of the rotor of the three-phase brushless motor M.

By reducing inflow and outflow of a current to and from the smoothing capacitor SC, it is possible to reduce heating of the smoothing capacitor SC caused due to a capacitor ripple current and improve reliability of the circuit. As the ripple current is less, an electrolytic capacitor with smaller capacitance can be used. Therefore, it is possible to reduce manufacturing cost of the circuit.

2-3. Experiment Results

Hereinafter, experiment results for verifying results of varying the advance angle δ with respect to a variation in a voltage of the smoothing capacitor SC and delaying a variation in the advance angle δ by a predetermined time with respect to a variation in the voltage of the smoothing capacitor SC will be described.

Figure 24:
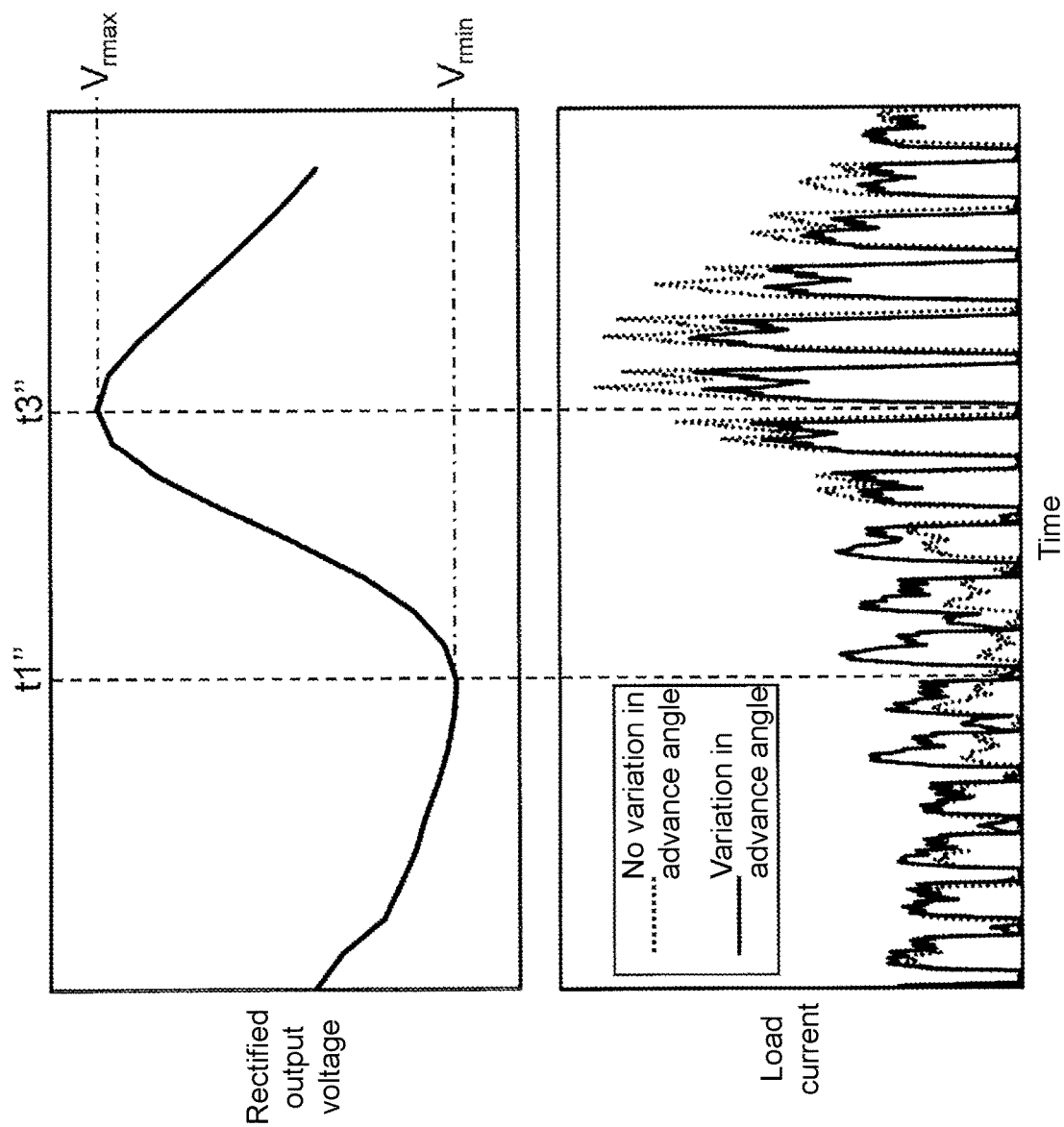
FIG. 24 is a diagram illustrating an example of a load current in accordance with presence or absence of advance angle modulation.

First, to verify the effect of varying the advance angle δ with respect to the variation in the voltage of the smoothing capacitor SC, results obtained by measuring a load current flowing in the U-phase of the three-phase brushless motor M when the advance angle δ is constant as the basic advance angle $δ_b$ and when the advance angle δ is varied and the variation is not delayed in the driving device 100 in the driving device 100 are illustrated in FIG. 24.

In the lower drawing of FIG. 24, a plot of a dotted line indicates an absolute value of a load current when the advance angle δ is not varied and a plot of a solid line indicates an absolute value of a load current when the advance angle δ is varied and the variation is not delayed.

As illustrated in FIG. 24, by varying the advance angle δ with respect to the variation in the voltage of the smoothing capacitor SC, it is possible to reduce a load current near time t3" at which the voltage of the smoothing capacitor SC particularly becomes the maximum value $V_{rmax}$ compared to when the advance angle δ is not varied.

Next, the effect of delaying the variation in the advance angle δ by the predetermined time with respect to the variation in the voltage of the smoothing capacitor SC will be described. To verify the effect, in the following experiment, the time t' which is a delay width of a timing at which the advance angle δ becomes the second advance angle δ2 with respect to a timing at which the voltage of the smoothing capacitor SC becomes the minimum value $V_{rmin}$ was set variously and a load current was measured.

First, how the load current changes depending on whether a variation in the advance angle δ is delayed by the predetermined time with respect to a variation in the voltage of the smoothing capacitor SC will be described with reference to FIG. 25.

Figure 25:
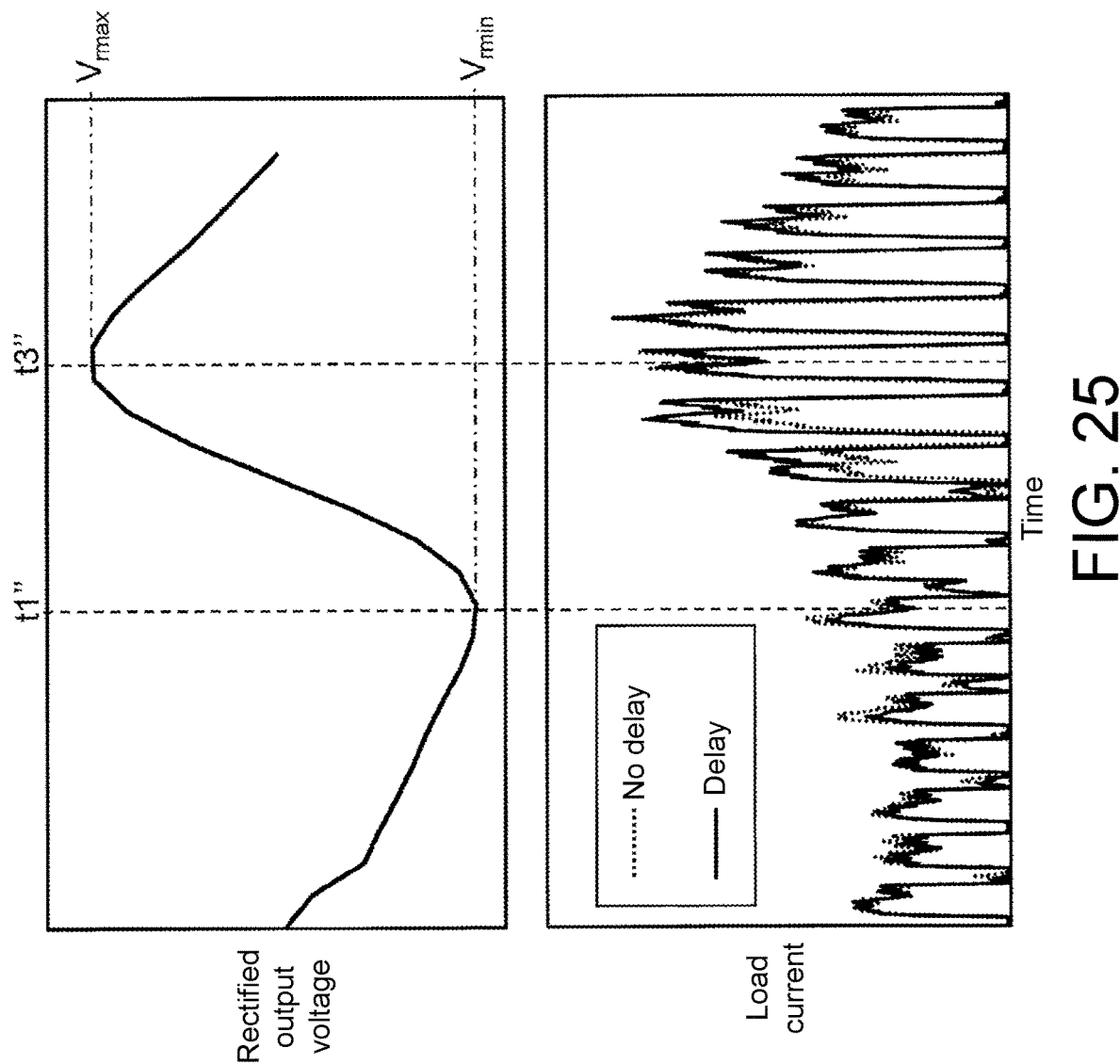
FIG. 25 is a diagram illustrating an example of a load current in accordance with presence or absence of delay of advance angle modulation.

In the lower drawing of FIG. 25, a plot of a dotted line indicates an absolute value of a load current when the variation in the advance angle δ is not delayed by the predetermined time with respect to the variation in the voltage of the smoothing capacitor SC and a plot of a solid line indicates an absolute value of a load current when the variation in the advance angle δ is delayed by the predetermined time with respect to the variation in the voltage of the smoothing capacitor SC.

As illustrated in FIG. 25, by delaying the variation in the advance angle δ with respect to the variation in the voltage of the smoothing capacitor SC, a larger load current flows within a period in which the voltage of the smoothing capacitor SC increases from the minimum value $V_{rmin}$ to the maximum value $V_{rmax}$ than when the variation in the advance angle δ is not delayed. That is, by delaying the advance angle δ, the current can flow to the load LO more actively during the charging period of the smoothing capacitor SC.

Next, how a current (ripple current) flowing in and out of the smoothing capacitor SC is changed when the time t' at which the variation in the advance angle δ is delayed with respect to the variation in the voltage of the smoothing capacitor SC is changed variously will be described with reference to FIG. 26.

Figure 26:
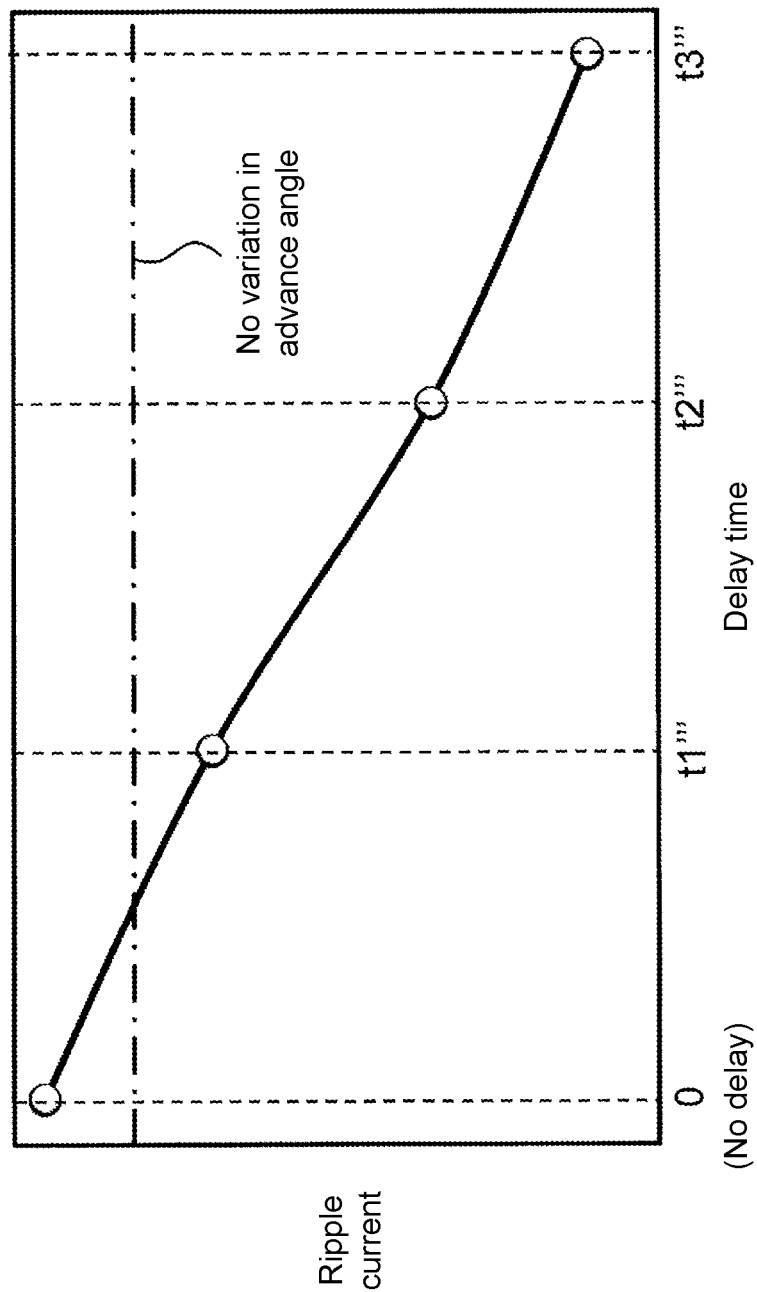
FIG. 26 is a diagram illustrating an example of dependency of a delay time of an advance angle of a ripple current.

In FIG. 26, the time t' at which the variation in the advance angle δ is delayed with respect to the variation in the voltage of the smoothing capacitor SC was set to 0, t1''', t2''', and t3''' (t1'''<t2'''<t3'''). The ripple current was set to an RMS value of the current flowing in and out of the smoothing capacitor SC. Further, the magnitude of the ripple current when the advance angle δ is not varied is indicated by a one-dot chain line as a reference.

As illustrated in FIG. 26, when the advance angle δ is varied and the variation in the advance angle δ is not delayed with respect to the variation in the voltage of the smoothing capacitor SC, a ripple current is slightly larger than when the advance angle δ is not varied. On the other hand, by delaying the variation in the advance angle δ with respect to the variation in the voltage of the smoothing capacitor SC, the ripple current is less than when the advance angle δ is not varied. The ripple current linearly decreases in a time of delay of the variation in the advance angle δ with respect to the variation in the voltage of the smoothing capacitor SC.

That is, by delaying the variation in the advance angle δ with respect to the variation in the voltage of the smoothing capacitor SC, a current amount flowing in and out of the smoothing capacitor SC is reduced. Thus, it is possible to reduce heating inside the smoothing capacitor SC and improve the reliability. Alternatively, since the capacitance of the smoothing capacitor SC can be reduced, cost can be reduced.

Further, how a maximum value of the absolute value of the load current, that is, a peak current, is changed when the time t' at which the variation in the advance angle δ is delayed with respect to the variation in the voltage of the smoothing capacitor SC is changed variously will be described with reference to FIG. 27.

Figure 27:
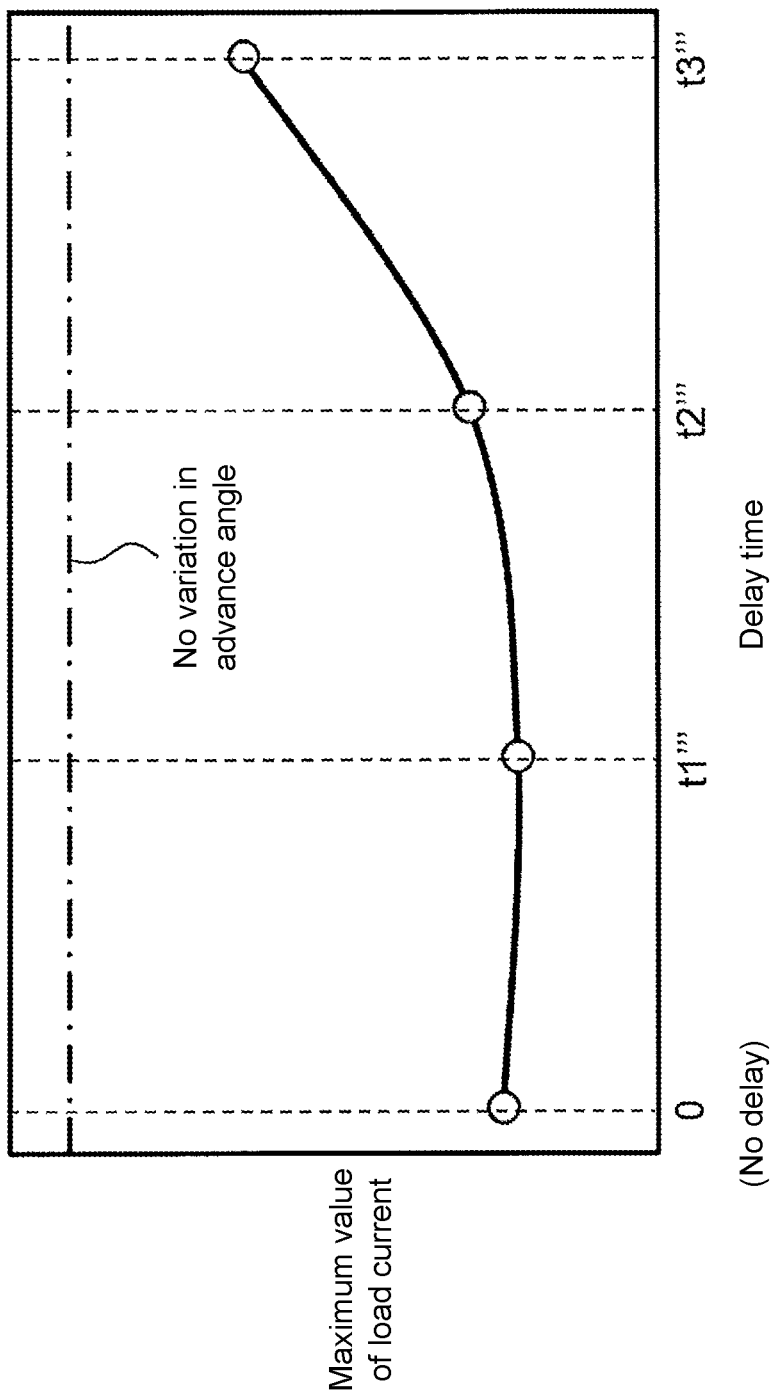
FIG. 27 is a diagram illustrating an example of dependency of a delay time of an advance angle at a maximum value of a load current.

As illustrated in FIG. 27, the maximum value of the absolute value of the load current is further reduced by varying the advance angle δ than when the advance angle δ is not varied. When a delay time of the variation in the advance angle δ with respect to the variation in the voltage of the smoothing capacitor SC is equal to or greater than the certain predetermined time t2''', the maximum value of the load current tends to increase. Conversely, by setting the delay time of the variation in the advance angle δ with respect to the variation in the voltage of the smoothing capacitor SC to be within a predetermined time range, it is possible to suppress an excessive load current.

From the above-described results, it can be understood that the current amount flowing in and out of the smoothing capacitor SC is reduced while suppressing the excessive current of the three-phase brushless motor M by varying the advance angle δ and setting the delay time of the variation in the advance angle δ with respect to the variation in the voltage of the smoothing capacitor SC to be within the predetermined range.

OTHER EMBODIMENTS

As described above, the foregoing embodiments have been described as examples of technologies disclosed in the present specification. However, the technology in the disclosure is not limited thereto and changes, substitutions, additions, omissions, and the like can be appropriately made. Accordingly, other embodiments will be exemplified below.

[1]

Figure 22:
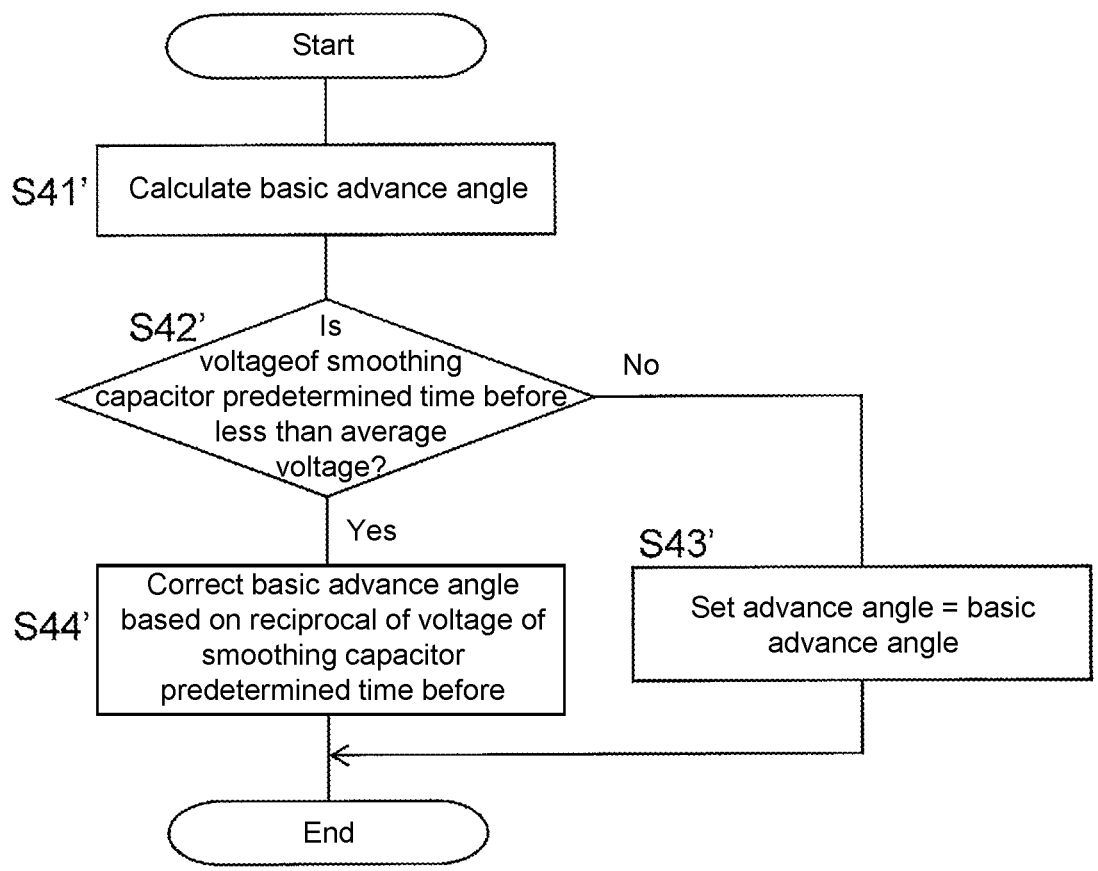
FIG. 22 is a flowchart illustrating a method of calculating an advance angle.

The procedures and/or processing content of the processes of the flowcharts illustrated in FIG. 7, FIG. 21, and FIG. 22 can be appropriately changed within the scope of the technology in the disclosure. For example, a procedure of the measurement of the voltage of the smoothing capacitor SC and the calculation of the duty ratio and/or the advance angle δ in the flowcharts may be reversed. That is, the calculation of the duty ratio and/or the advance angle δ may first be performed. Thereafter, the measurement of the voltage of the smoothing capacitor SC may be performed.

[2]

The foregoing first to third embodiments can be combined. That is, the controller 19 may calculate the modulation duty ratio DR at which at least a period in which the modulation width of the modulation duty ratio DR becomes the maximum value is included in the period from a time at which the input current input to the smoothing capacitor SC is generated to a time at which the voltage of the smoothing capacitor SC becomes the maximum value $V_{rmax}$ and the advance angle δ at which at least a period in which the advance angle δ becomes the second advance angle δ2 which is the maximum value of the variation is included in that period.

In this case, the controller 19 may switch between delay of only the modulation duty ratio DR with respect to the variation in the voltage of the smoothing capacitor SC and delay of only the advance angle δ or delay of both the modulation duty ratio DR and the advance angle δ in accordance with a predetermined condition.

The controller 19 may change the extent of the effect of delaying the modulation duty ratio DR with respect to the variation in the voltage of the smoothing capacitor SC and the extent of the effect of delaying the advance angle δ in accordance with a predetermined condition. For example, by changing the values of the constants A to E of the above-described expressions for calculating the modulation duty ratio DR and the advance angle δ in accordance with a predetermined condition, it is possible to achieve a change in the extent of the effect.

[3]

In the foregoing first to third embodiments, as described above, the modulation duty ratio DR and the advance angle δ are calculated based on the previous measurement value of the voltage of the smoothing capacitor SC the predetermined time before. The disclosure is not limited thereto and the modulation duty ratio DR and the advance angle δ can also be calculated based on another parameter.

For example, the controller 19 may periodically vary the modulation duty ratio DR and/or the advance angle δ in a triangular waveform and may set the timing at which the modulation duty ratio DR and/or the advance angle δ of the triangular waveform becomes the maximum value to a timing later than a timing at which the absolute value of the voltage of the rectified output $V_{out}$ becomes a minimum.

Figure 28:
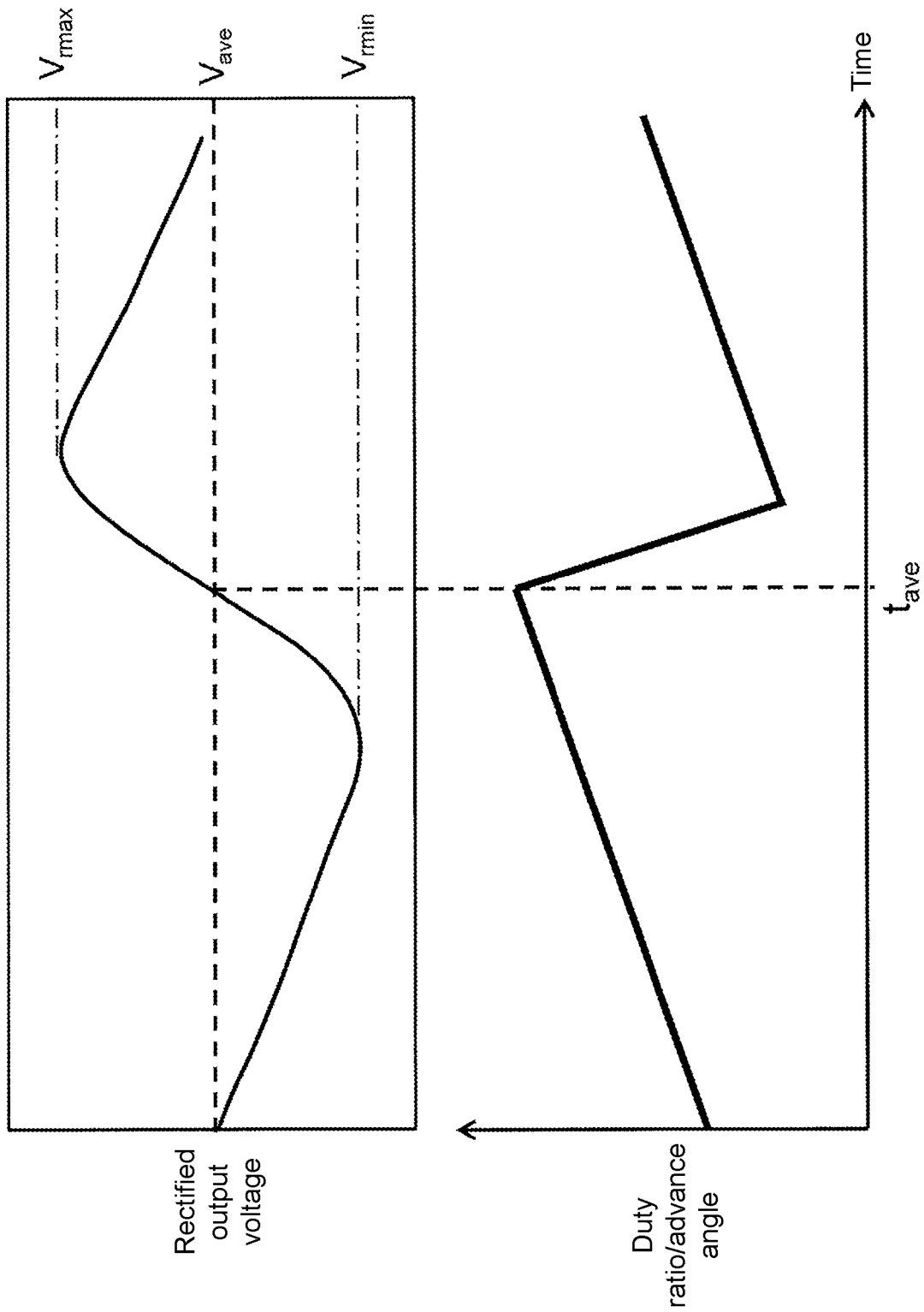
FIG. 28 is a diagram illustrating another embodiment (part 1) of a method of calculating a duty ratio/advance angle.

Specifically, for example, as illustrated in FIG. 28, the controller 19 may set the timing of the maximum value of the variation width of the modulation duty ratio DR and/or the advance angle δ varied periodically in the triangular waveform to a timing $t_{ave}$ at which the voltage of the smoothing capacitor SC becomes an average voltage $V_{ave}$ or a timing slightly delayed from the timing $t_{ave}$.

An increase ratio and/or a decrease ratio of the modulation width of the modulation duty ratio DR and/or the advance angle δ over time in the variation in the modulation duty ratio DR and/or the advance angle δ of the triangular waveform can be adjusted appropriately in accordance with a predetermined condition.

A period in which the modulation width of the modulation duty ratio DR and/or the advance angle δ is the minimum value of the modulation width of the modulation duty ratio DR and/or the first advance angle δ1 by a predetermined length in the variation in the modulation width of the modulation duty ratio DR and/or the advance angle δ of the triangular waveform may continue.

[4]

The controller 19 may set the modulation width of the modulation duty ratio DR and/or the advance angle δ to the maximum value of the modulation width of the modulation duty ratio DR and/or the second advance angle δ2 from a time at which the absolute value of the voltage of the rectified output $V_{out}$ becomes the first voltage V1 set near the minimum value $V_{rmin}$ of the absolute value of the voltage of the rectified output to a time at which the absolute value of the voltage of the rectified output $V_{out}$ becomes the second voltage V2 set near the maximum value $V_{rmax}$ of the absolute value of the voltage of the rectified output $V_{out}$.

Figure 29:
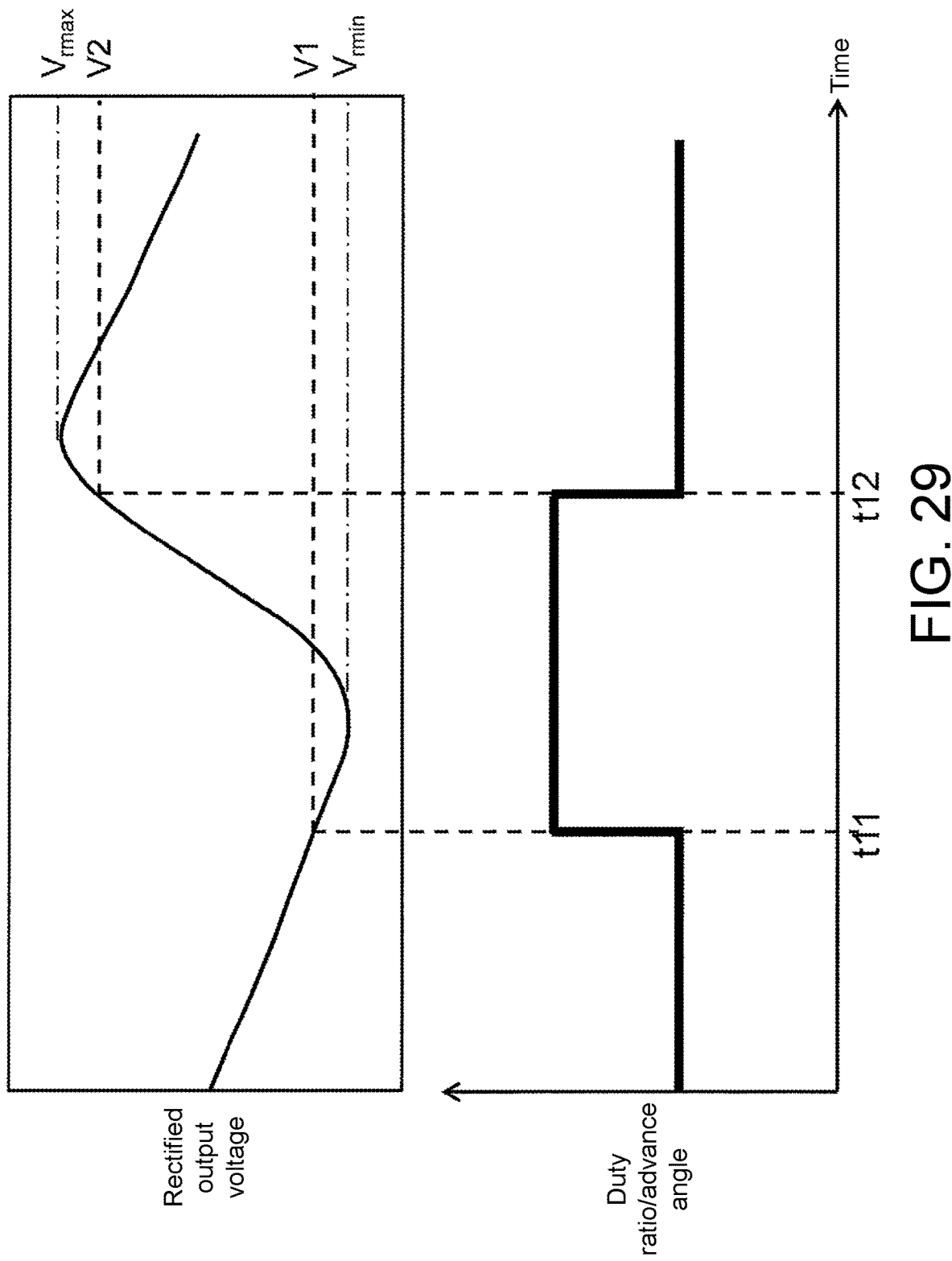
FIG. 29 is a diagram illustrating another embodiment (part 2) of the method of calculating the duty ratio/advance angle.

Specifically, for example, as illustrated in FIG. 29, the controller 19 may set the modulation width of the modulation duty ratio DR and/or the advance angle δ to the maximum value of the modulation duty ratio DR and/or the second advance angle δ2 during a period of a timing t11 at which the voltage of the smoothing capacitor SC becomes the first voltage V1 in a period in which the voltage of the smoothing capacitor SC decreases and a timing t12 at which the voltage of the smoothing capacitor SC becomes the second voltage V2 in a period in which the voltage of the smoothing capacitor SC increases, and may set the modulation width of the modulation duty ratio DR and/or the advance angle δ to the minimum value of the modulation duty ratio DR and/or the first advance angle δ1 during the other period.

[5]

Further, as illustrated in FIG. 30, the controller 19 may set the modulation duty ratio DR and/or the advance angle δ to the maximum value of the modulation width of the modulation duty ratio DR and/or the second advance angle δ2 during a period of a timing t13 at which the voltage of the smoothing capacitor SC becomes the first voltage V1 in a period in which the voltage of the smoothing capacitor SC increases and the timing t12 at which the voltage of the smoothing capacitor SC becomes the second voltage V2 in a period in which the voltage of the smoothing capacitor SC increases, and may set the modulation duty ratio DR and/or the advance angle δ to the minimum value of the modulation width of the modulation duty ratio DR and/or the first advance angle δ1 during the other period.

In this case, as illustrated in FIG. 30, the modulation duty ratio DR and/or the advance angle δ becomes the maximum value of the modulation width of the modulation duty ratio DR and/or the second advance angle δ2 during the period in which the absolute value of the voltage of the rectified output $V_{out}$ increases.

The modulation duty ratio DR and/or the advance angle δ that becomes the maximum value of the modulation width of the modulation duty ratio DR and/or the second advance angle δ2 during the period in which the absolute value of the voltage of the rectified output $V_{out}$ increases can also be calculated by setting the modulation width of the modulation duty ratio DR and/or the advance angle δ to the maximum value of the modulation duty ratio DR and/or the second advance angle δ2, for example, when a current measurement value of the voltage of the smoothing capacitor SC is greater than a previous measurement value near the current measurement value.

According to the methods described in [3] to [5], the controller 19 can calculate the modulation duty ratio DR and/or the advance angle δ at which at least a portion of the period in which the variation width of the modulation duty ratio DR and/or the advance angle δ becomes the maximum value of the variation width of the modulation duty ratio DR and/or the second advance angle δ2 is included in the period from the time at which the input current input to the smoothing capacitor SC is generated to the time at which the voltage of the smoothing capacitor SC becomes the maximum value $V_{rmax}$.

[6]

When the switching circuit 17 is particularly a converter such as a critical-mode boosting chopper type converter, a critical-mode step-down chopper type converter, an LLC converter, or a pseudo-resonant flyback converter, the controller 19 may vary the switching period $T_{sw}$ between a first period $T1_{sw}$ and a second period $T2_{sw}$ greater than the first period $T1_{sw}$.

Specifically, the controller 19 may set the switching period $T_{sw}$ such that at least a portion of a period in which the switching period $T_{sw}$ becomes a second period is included in a period from the time at which the input current input to the smoothing capacitor SC is generated to the time at which the voltage of the smoothing capacitor SC becomes the maximum value $V_{rmax}$. The variation in the switching period $T_{sw}$ can be realized similarly to the above-described method of varying the modulation duty ratio DR and the advance angle δ.

Thereafter, the controller 19 can performs a switching operation of the switching circuit 17 by switching between the ON-state and the OFF-state of the switching circuit 17 at the switching period $T_{sw}$ set in this way and varying the switching period $T_{sw}$ between the first period $T1_{sw}$ and the second period $T2_{sw}$ greater than the first period $T1_{sw}$.

[7]

The controller 19 may detect a period from a time at which the input current input to the smoothing capacitor SC is generated to a time at which the voltage of the smoothing capacitor SC become the maximum value $V_{rmax}$ based on the voltage value and/or the phase of the AC input $V_{in}$.

The input current with which the smoothing capacitor SC is charged is generated when the absolute value of the voltage of the AC input $V_{in}$ is greater than the voltage of the smoothing capacitor SC. The voltage of the smoothing capacitor SC increases slightly later due to an influence of an inductor component or the like in the circuit.

After the absolute value of the voltage of the AC input $V_{in}$ becomes the maximum value (the phase of the AC input $V_{in}$ is $(2n+1)\pi/2$ (where n is an integer)), the decrease in the input current starts near at timing at which the absolute value of the voltage of the AC input $V_{in}$ decreases and becomes less than the voltage of the smoothing capacitor SC, and the input current finally becomes 0. The voltage of the smoothing capacitor SC starts to decrease slightly before the decrease in the input current starts.

Accordingly, the controller 19 can detect a period from a time at which the input current input to the smoothing capacitor SC is generated to a time at which the voltage of the smoothing capacitor SC becomes the maximum value $V_{rmax}$ based on the voltage value and/or the phase of the AC input $V_{in}$ in consideration of a factor causing deviation between a timing at which the input current is generated and decreases and a timing at which the voltage of the smoothing capacitor SC increases and decreases.

Examples of the factor causing the deviation between the timing at which the input current is generated and decreases and the timing at which the voltage of the smoothing capacitor SC increases and decreases include an inductor component in the circuit, power to the load LO, and a ripple voltage of the smoothing capacitor SC.

[8]

When the start timing of the power supply period $T_{ps}$ is adjusted in the foregoing third embodiment, an end timing of the power supply period $T_{ps}$ is also moved with adjustment of the start timing. That is, even when the start timing is adjusted, the length of the power supply period $T_{ps}$ is constant.

However, the present invention is not limited thereto and the controller 19 may adjust the start timing by increasing or decreasing the power supply period $T_{ps}$. Adjustment of the start timing by increasing or decreasing the power supply period $T_{ps}$ is also referred to as conduction angle modulation.

For example, by fixing the end timing of the power supply period $T_{ps}$ before and after adjustment of the start timing and increasing the power supply period $T_{ps}$, the start timing can be moved temporally backward, that is, the advance angle δ can be increased. On the other hand, by fixing the end timing of the power supply period $T_{ps}$ before and after adjustment of the start timing and decreasing the power supply period $T_{ps}$, the start timing can be moved temporally forward, that is, the advance angle δ can be decreased.

In addition, for example, by fixing a predetermined timing in the power supply period $T_{ps}$ before and after adjustment of the start timing and increasing the power supply period $T_{ps}$, it is possible to move the start timing temporally backward and move the end timing temporally forward. On the other hand, by fixing the predetermined timing in the power supply period $T_{ps}$ before and after adjustment of the start timing and decreasing the power supply period $T_{ps}$, it is possible to move the start timing temporally forward and move the end timing temporally backward.

[9]

In the foregoing first to third embodiments, the PWM control of the switching elements SW1 to SW3 of the switching circuit 17 which is an inverter is performed. On the other hand, the switching elements SW4 to SW6 repeat a low-speed switching operation in which the ON-state continues for only T/3 and the OFF-state continues for only 2T/3, as illustrated in FIG. 6 and FIG. 20.

However, the present invention is not limited thereto. While performing the PWM control of the switching elements SW4 to SW6, the switching elements SW1 to SW3 may be caused to perform the switching operation at a low speed as in the switching elements SW4 to SW6 in the first to third embodiments.

[10]

In the foregoing first to third embodiments, for power factor improvement of the input current, a power factor improvement circuit including the inductor element L and the smoothing capacitor SC, a so-called passive power factor correction (PFC) circuit, is used. However, a power factor improvement circuit including a switching circuit such as a chopper circuit, a so-called active PFC circuit, may be used. In this case, a higher power factor can be obtained and a ripple current generated with an AC period can be reduced, and thus it is possible to obtain the advantage of reducing the cost because of suppression of deterioration and miniaturization of the electrolytic capacitor.

The invention claimed is:

1. A power supply device comprising:
an output unit configured to connect a load;
an input unit configured to input an AC input varying at a predetermined period between a positive voltage and a negative voltage;
a rectifier circuit configured to convert the AC input input from the input unit into a rectified output which is one of the positive voltage and a negative voltage and include a smoothing capacitor that smoothes the rectified output;
a switching circuit configured to parallelly connect the smoothing capacitor as an input, connect the output unit as an output, and switch between an ON-state in which an input impedance viewed from the smoothing capacitor is low and an OFF-state in which an input impedance is higher than the input impedance in the ON-state at a switching period shorter than the predetermined period; and
a controller configured to set a modulation duty ratio such that at least a portion of a period in which a modulation width of the modulation duty ratio becomes a maximum value is included in a period from a time at which an input current from the AC input input to the smoothing capacitor is generated to a time at which a voltage of the smoothing capacitor becomes a maximum when the switching circuit is controlled to switch between the ON-state and the OFF-state while outputting the modulation duty ratio at which a duty ratio which is a ratio of a period in which the ON-state is maintained to the switching period is modulated in accordance with a variation in the rectified output.

2. The power supply device according to claim 1, wherein the controller includes a measurement unit that measures a voltage of the rectified output.

3. The power supply device according to claim 1, wherein the smoothing capacitor is an electrolytic capacitor.

4. The power supply device according to claim 1, wherein the controller sets the modulation duty ratio such that at least the portion of the period in which the modulation width of the modulation duty ratio becomes the maximum value is included in a period in which an absolute value of a voltage of the rectified output increases.

5. The power supply device according to claim 1, wherein the controller sets a modulation width of the modulation duty ratio as a periodic variation deviating by a predetermined time from a periodic variation of the rectified output.

6. The power supply device according to claim 5, wherein the predetermined time is determined based on a frequency of the AC input.

7. The power supply device according to claim 5, wherein the controller sets the modulation width of the modulation duty ratio based on a reciprocal of an absolute value of a previous voltage of the rectified output before the predetermined time.

8. The power supply device according to claim 5, wherein the controller periodically varies the modulation width of the modulation duty ratio in a triangular waveform and sets a timing at which the modulation width of the modulation duty ratio of a triangular waveform becomes a maximum value to a timing later than a timing at which an absolute value of a voltage of the rectified output becomes a minimum.

9. The power supply device according to claim 1, wherein the controller sets the modulation width of the modulation duty ratio to the maximum value from a time at which an absolute value of a voltage of the rectified output becomes a first voltage set near a minimum value of the absolute value of the voltage of the rectified output to a time at which an absolute value of a voltage of the rectified output becomes a second voltage set near a maximum value of the absolute value of the voltage of the rectified output.

10. The power supply device according to claim 1, wherein the controller sets the modulation width of the modulation duty ratio to the maximum value during a period in which an absolute value of a voltage of the rectified output increases.

11. The power supply device according to claim 1, wherein the switching circuit is an inverter circuit.

12. The power supply device according to claim 1, wherein the controller sets the modulation duty ratio based on a difference between a target power output to the output unit and an actual power output to the output unit.

13. The power supply device according to claim 1, wherein the controller calculates the modulation duty ratio based on a basic duty ratio set independently from a variation in the rectified output and the variation of the rectified output.

14. The power supply device according to claim 13, wherein the basic duty ratio is set based on a difference between a target power output to the output unit and an actual power output to the output unit.

15. The power supply device according to claim 13, wherein the basic duty ratio varies at a predetermined period.

16. The power supply device according to claim 13,
wherein the switching circuit includes a plurality of switching elements having mutually different phases and switches between the ON-state and the OFF-state at the switching period, and
wherein the basic duty ratio is set as a ratio of a period in which the ON-state of each switching element is maintained to the switching period independently from the variation in the rectified output.

17. The power supply device according to claim 16, wherein the basic duty ratio of each switching element is set based on a difference between a target power output to the output unit and an actual power output to the output unit.

18. The power supply device according to claim 16, wherein the basic duty ratio of each switching element varies at a predetermined period of which a phase is different from the basic duty ratio of the other switching elements.

19. The power supply device according to claim 18, wherein the controller modulates the basic duty ratio of each switching element by a two-phase modulation scheme.

20. A driving device comprising:
the power supply device according to claim 1; and
a motor connected to the output unit.

21. The driving device according to claim 20, wherein the controller sets the modulation duty ratio based on a difference between a target rotation speed of the motor and an actual rotation speed of the motor.

22. A power supply device comprising:
an output unit configure to connect a load;
an input unit configured to input an AC input varying at a predetermined period between a positive voltage and a negative voltage;
a rectifier circuit configured to convert the AC input input from the input unit into a rectified output which is one of the positive voltage and the negative voltage and include a smoothing capacitor that smoothes the rectified output;
a switching circuit configured to connect the smoothing capacitor as an input, connect the output unit as an output, and switch between an ON-state in which an input impedance viewed from the smoothing capacitor is low and an OFF-state in which an input impedance is higher than the input impedance in the ON-state at a switching period shorter than the predetermined period; and
a controller configured to set the switching period such that at least a portion of a period in which the switching period is a second period is included in a period from a time at which an input current input to the smoothing capacitor is generated to a time at which a voltage of the smoothing capacitor becomes a maximum when the switching circuit is controlled to switch between the ON-state and the OFF-state by varying the switching period between a first period and the second period greater than the first period.

23. A control method for a power supply device including:
an output unit that connects a load, an input unit that inputs an AC input varying at a predetermined period between a positive voltage and a negative voltage, and a rectifier circuit that converts the AC input input from the input unit into a rectified output which is one of the positive voltage and the negative voltage and includes a smoothing capacitor that smoothes the rectified output, and a switching circuit that connects the smoothing capacitor as an input, connects the output unit as an output, and switches between an ON-state in which an input impedance viewed from the smoothing capacitor is low and an OFF-state in which an input impedance is higher than the input impedance in the ON-state at a switching period shorter than the predetermined period, the control method comprising steps of:
setting a modulation duty ratio such that at least a portion of a period in which a modulation width of the modulation duty ratio becomes a maximum value is included in a period from a time at which an input current input to the smoothing capacitor is generated to a time at which a voltage of the smoothing capacitor becomes a maximum when outputting a modulation duty ratio at which a duty ratio which is a ratio of a period in which the ON-state is maintained to the switching period is modulated in accordance with a variation in the rectified output; and
controlling the switching between the ON-state and the OFF-state of the switching circuit by adjusting a length in which the ON-state is maintained and a length in which the OFF-state is maintained in accordance with the set modulation duty ratio.

24. The control method according to claim 23, wherein the step of setting the modulation duty ratio includes a step of calculating the modulation duty ratio based on a basic duty ratio set independently from the variation in the rectified output and the variation of the rectified output.

25. The control method according to claim 24,
wherein the switching circuit includes a plurality of switching elements having mutually different phases and switches between the ON-state and the OFF-state at the switching period, and
wherein the basic duty ratio is set as a ratio of a period in which the ON-state of each switching element is maintained to the switching period independently from the variation in the rectified output.

26. The control method according to claim 25, wherein, in the step of setting the modulation duty ratio, the basic duty ratio of each switching element is set based on a difference between a target power output to the output unit and an actual power output to the output unit.

27. The control method according to claim 25, wherein the basic duty ratio of each switching element varies at a predetermined period of which a phase is different from the basic duty ratio of the other switching elements.

28. The control method according to claim 27, wherein, in the step of setting the modulation duty ratio, the basic duty ratio is modulated by a two-phase modulation scheme.

29. A control method for a power supply device including an output unit that connects a load, an input unit that inputs an AC input varying at a predetermined period between a positive voltage and a negative voltage, a rectifier circuit that converts the AC input input from the input unit into a rectified output which is one of the positive voltage and the negative voltage and includes a smoothing capacitor that smoothes the rectified output, and a switching circuit that connects the smoothing capacitor as an input, connects the output unit as an output, and switches between an ON-state in which an input impedance viewed from the smoothing capacitor is low and an OFF-state in which an input impedance is higher than the input impedance in the ON-state at a switching period shorter than the predetermined period, the control method comprising steps of:
    setting the switching period such that at least a portion of a period in which the switching period is a second period is included in a period from a time at which an input current input to the smoothing capacitor is generated to a time at which a voltage of the smoothing capacitor becomes a maximum when the switching circuit is controlled to switch between the ON-state and the OFF-state by varying the switching period between a first period and the second period greater than the first period; and
    switching between the ON-state and the OFF-state of the switching circuit at the set switching period.

30. A storage medium storing a program, wherein the program causes a computer to perform the control method according to claim 23.

31. A power supply device comprising:
    an output unit configured to connect a load;
    an input unit configured to input an AC input varying at a predetermined period between a positive voltage and a negative voltage;
    a rectifier circuit configured to convert the AC input input from the input unit into a rectified output which is one of the positive voltage and a negative voltage and include a smoothing capacitor that smoothes the rectified output;
    a switching circuit configured to connect the smoothing capacitor as an input, connect the output unit as an output, and switch between an ON-state in which an input impedance viewed from the smoothing capacitor is low and an OFF-state in which an input impedance is higher than the input impedance in the ON-state at a switching period shorter than the predetermined period; and
    a controller configured to set a modulation duty ratio such that at least a portion of a period in which a modulation width of the modulation duty ratio becomes a maximum value is included in a period from a time at which an input current input to the smoothing capacitor is generated to a time at which a voltage of the smoothing capacitor becomes a maximum when the switching circuit is controlled to switch between the ON-state and the OFF-state while outputting the modulation duty ratio at which a duty ratio which is a ratio of a period in which the ON-state is maintained to the switching period is modulated in accordance with a variation in the rectified output,
    wherein the controller sets the modulation duty ratio such that at least the portion of the period in which the modulation width of the modulation duty ratio is the maximum value, is included in a period in which an absolute value of a voltage of the rectified output increases.

32. A power supply device comprising:
    an output unit configured to connect a load;
    an input unit configured to input an AC input varying at a predetermined period between a positive voltage and a negative voltage;
    a rectifier circuit configured to convert the AC input input from the input unit into a rectified output which is one of the positive voltage and a negative voltage and include a smoothing capacitor that smoothes the rectified output;
    a switching circuit configured to connect the smoothing capacitor as an input, connect the output unit as an output, and switch between an ON-state in which an input impedance viewed from the smoothing capacitor is low and an OFF-state in which an input impedance is higher than the input impedance in the ON-state at a switching period shorter than the predetermined period; and
    a controller configured to set a modulation duty ratio such that at least a portion of a period in which a modulation width of the modulation duty ratio becomes a maximum value is included in a period from a time at which an input current input to the smoothing capacitor is generated to a time at which a voltage of the smoothing capacitor becomes a maximum when the switching circuit is controlled to switch between the ON-state and the OFF-state while outputting the modulation duty ratio at which a duty ratio which is a ratio of a period in which the ON-state is maintained to the switching period is modulated in accordance with a variation in the rectified output,
    wherein the controller sets a modulation width of the modulation duty ratio as a periodic variation deviating by a predetermined time from a periodic variation of the rectified output.

* * * * *